US008804051B2

(12) United States Patent
Matsuura et al.

(10) Patent No.: US 8,804,051 B2
(45) Date of Patent: Aug. 12, 2014

(54) DIGITAL BROADCAST RECEIVING APPARATUS AND CHANNEL SWITCHING METHOD

(75) Inventors: Daiki Matsuura, Tokyo (JP); Satoru Tokuyama, Tokyo (JP); Jun Yukawa, Tokyo (JP); Satoko Miki, Tokyo (JP); Kensuke Ueda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 123 days.

(21) Appl. No.: 13/395,851

(22) PCT Filed: Nov. 25, 2010

(86) PCT No.: PCT/JP2010/006882
§ 371 (c)(1),
(2), (4) Date: Mar. 13, 2012

(87) PCT Pub. No.: WO2011/161739
PCT Pub. Date: Dec. 29, 2011

(65) Prior Publication Data
US 2012/0176551 A1   Jul. 12, 2012

(30) Foreign Application Priority Data

Nov. 26, 2009 (JP) ................................. 2009-268920
Nov. 16, 2010 (JP) ................................. 2010-256023

(51) Int. Cl.
*H04N 5/44* (2011.01)
*H04N 5/50* (2006.01)

(52) U.S. Cl.
USPC ............................ 348/731; 348/725; 348/553

(58) Field of Classification Search
USPC ........................................................ 348/731
See application file for complete search history.

(56) References Cited

U.S. PATENT DOCUMENTS

| 6,016,172 A | * | 1/2000 | Huh | 375/240.27 |
| 6,985,188 B1 | * | 1/2006 | Hurst, Jr. | 348/553 |
| 2007/0030969 A1 | | 2/2007 | Won | |
| 2007/0200949 A1 | * | 8/2007 | Walker et al. | 348/412.1 |
| 2010/0246673 A1 | | 9/2010 | Tanaka et al. | |

FOREIGN PATENT DOCUMENTS

| JP | 2002-176599 A | 6/2002 |
| JP | 2004-112504 A | 4/2004 |

(Continued)

*Primary Examiner* — Jefferey Harold
*Assistant Examiner* — Michael Teitelbaum
(74) *Attorney, Agent, or Firm* — Birch, Stewart, Kolasch & Birch, LLP

(57) ABSTRACT

An apparatus to start channel switchover processing with reliability and to shorten an image non-displaying period. The apparatus stores a second channel-selection control information for each channel, including an I-picture appearance time which is a time when a packet including an I-picture is received and an I-pictures appearance interval-time which is an interval between times when a packet including an I-picture is received; and a control unit obtains, after an input of switching of the channel-selection is received, the I-picture appearance time and the I-pictures appearance interval-time corresponding to the switched channel from the channel-selection control information, adds the obtained I-pictures appearance interval-time to the obtained I-picture appearance time, calculates an I-picture appearance estimated-time which is a time when a packet including an I-picture is obtained subsequently, and delays a channel switchover until a time earlier than the I-picture appearance estimated-time by a switchover period-of-time required for the switching of the channel-selection.

12 Claims, 28 Drawing Sheets

(56) References Cited

FOREIGN PATENT DOCUMENTS

| JP | 2005-184457 A | 7/2005 |
| JP | 2006-310977 A | 11/2006 |
| JP | 2007-043670 A | 2/2007 |
| JP | 2008-199224 A | 8/2008 |
| JP | 2009-088926 A | 4/2009 |

* cited by examiner

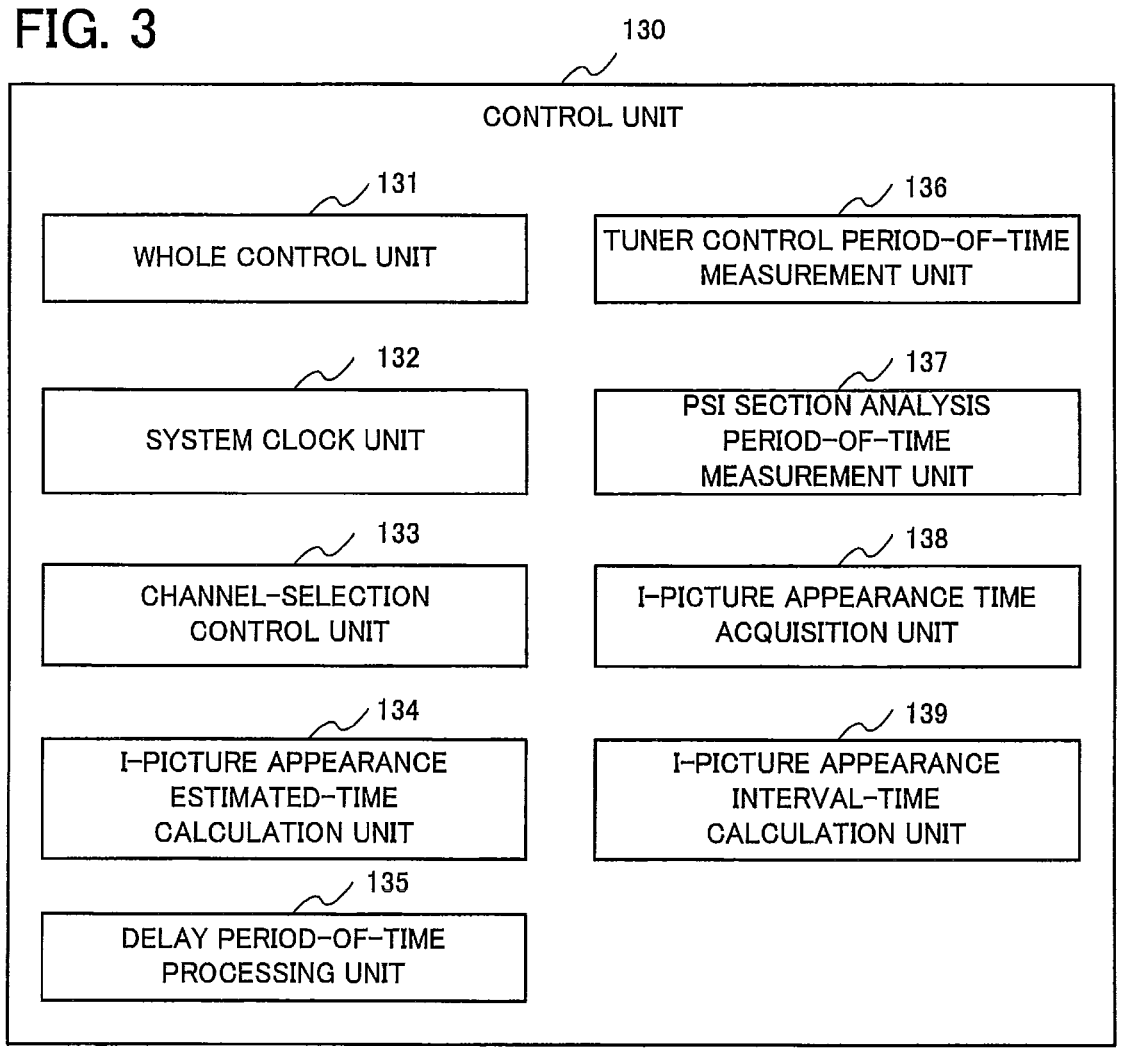

FIG. 7

| SYNCHRONIZATION BITE (0x47) | TRANSPORT ERROR INDICATOR | PAYLOAD UNIT START INDICATOR | TRANSPORT PRIORITY | PID | TRANSPORT SCRAMBLE CONTROL | ADAPTATION FIELD CONTROL | CONTINUITY INDICATOR |
|---|---|---|---|---|---|---|---|
| 8bit | 1bit | 1bit | 1bit | 13bit | 2bit | 2bit | 4bit |

| CH1 | CH2 | ... | CH10 | ... |
|---|---|---|---|---|
| 9:00 | 9:00<br>9:30 | ... | 9:50 | ... |
| 10:30<br>10:40 | 10:00<br>10:30 | ... | 10:00<br>10:55 | ... |
| 11:00 | 11:00 | ... | 11:00<br>11:10 | ... |
| 12:00 | 12:00 | ... | 12:30 | ... |
| ⋮ | ⋮ | ⋮ | ⋮ | ⋮ |
| 23:00 | 23:10 | ... | 23:00<br>23:55 | ... |

| ITEM | CH1 | CH2 | ... | CH10 | ... |
|---|---|---|---|---|---|
| TUNER CONTROL PERIOD-OF-TIME | A1 | A2 | ... | A10 | ... |
| PROGRAM-SPECIFIC-INFORMATION ANALYSIS PERIOD-OF-TIME | E1 | E2 | ... | E10 | ... |
| KEY-PICTURE APPEARANCE TIME | F1 | F2 | ... | F10 | ... |
| KEY-PICTURES APPEARANCE INTERVAL-TIME | G1 | G2 | ... | G10 | ... |

| ITEM | CH1 | CH2 | ... | CH10 | ... |
|---|---|---|---|---|---|
| TUNER CONTROL PERIOD-OF-TIME | A1 | A2 | ... | A10 | ... |
| PROGRAM-SPECIFIC-INFORMATION ANALYSIS PERIOD-OF-TIME | E1 | E2 | ... | E10 | ... |
| KEY-PICTURE APPEARANCE TIME | F1 | F2 | ... | F10 | ... |
| KEY-PICTURES APPEARANCE INTERVAL-TIME | G1 | G2 | ... | G10 | ... |
| DESCRAMBLE STARTUP PERIOD-OF-TIME | I1 | I2 | ... | I10 | ... | ically, the appearance time of I-picture is a
DIGITAL BROADCAST RECEIVING APPARATUS AND CHANNEL SWITCHING METHOD

TECHNICAL FIELD

The present invention relates to a technique of switching a channel in digital broadcasting.

BACKGROUND ART

In digital broadcasting, MPEG (Moving Picture Experts Group) 2 method is adopted as a video data encoding method. In MPEG-2 encoding, video data is divided into three kinds of data including an I-picture, a P-picture and a B-picture, and these data are grouped in units of a GOP (Group Of Picture).

The I-picture is formed by compressing one frame of image itself just as it is, and it has a low compression ratio and a high degree of accuracy. The P-picture is formed by prediction (forward direction prediction) from a previous I-picture and/or a previous P-picture, and it has a higher compression ratio than that of the I-picture and a similar degree of accuracy to that of the I-picture. The B-picture is formed by prediction (bidirectional prediction) from a previous or future I-picture and/or a previous or future P-picture, and it has a higher compression ratio than that of the P-picture and a similar degree of accuracy to that of the P-picture.

In this MPEG-2 method, since the I-picture has all information by itself, it is possible to be decoded from itself. However, since the P-picture and the B-picture have only difference information, it is impossible to decode them without using a prediction image.

In other words, when a channel is switched in a conventional digital broadcast receiving apparatus, decoding of the video data begins after an I-picture included in video data of the switched channel appears. Since an I-picture is located at a beginning portion in a GOP and the GOP is formed from 15 frames, it is necessary to wait approximately 0.5seconds at the maximum for appearance of an I-picture and this interval is an image non-displaying period, during which no image is displayed.

As a technique of shortening such image non-displaying period, for example, Patent Document 1 describes a technique of switching a display in synchronization with appearance timing of an I-picture of video data after channel switching.

For example, in Patent Document 1, when the channel switching is operated, the image non-displaying period is shortened by displaying an image of a channel before channel switching until a switching time satisfying the following equation (1).

$$\text{(appearance time of } I\text{-picture)} + \text{(interval between } I\text{-pictures)} - \text{(period-of-time for tuner setting)} - \text{(current time)} < \tfrac{1}{30} \text{ seconds} \quad (1)$$

In this connection, the appearance time of I-picture is a time when a preceding I-picture was obtained, the interval between I-pictures is a time interval between times at which the I-picture is obtained, and the period-of-time for tuner setting is a period of time required for setting a tuner.

PRIOR ART DOCUMENT

Patent Document

Patent Document 1: Japanese Patent Kokai Publication No. 2005-184457 (page 1, page 3 and FIG. 3)

SUMMARY OF THE INVENTION

Problems To Be Solved by the Invention

In the technique described in Patent Document 1, when equation (1) is not satisfied, that is, when no I-picture appears within one frame even after the channel is switched, a transport stream before channel switching is output, outputting of a transport stream of a channel before channel switching, transforming of a video elementary stream and processing of video decode are executed. Since such processing needs time to some extent, if it takes $\tfrac{1}{30}$ seconds or more until the next determination processing of equation (1) is executed, appearance of the one after next I-picture has to be waited for, and in some cases it takes long time until the channel switchover processing starts.

Furthermore, in the technique described in Patent Document 1, even when equation (1) is satisfied and the channel switchover processing starts, since a video PID and an audio PID stored in a channel switching control table are used for extracting a video transport stream and an audio transport stream, if the video PID and the audio PID are changed by channel switching and so on, it is necessary to newly analyze PSI (Program Specific Information) section data to obtain a video PID and an audio PID and then extract the video transport stream and the audio transport stream. For this reason, if it takes $\tfrac{1}{30}$ seconds or more to execute such processing, the one after next appearance of I-picture has to be waited for in order to switch a channel and there are some cases where the image non-displaying period increases.

For these reasons, an object of the present invention is to start channel switchover processing with reliability and to shorten an image non-displaying period.

Means for Solving the Problem

In order to solve the above problems, the present invention is characterized by including: a tuner for receiving and demodulating a digital broadcast signal; a storage for storing channel-selection control information for each channel, the channel-selection control information including information for specifying an I-picture appearance time which is a time when a packet including an I-picture on a channel in question is received and information for specifying an I-pictures appearance interval-time which is an interval between times when a packet including an I-picture on the channel in question is received; an I-picture appearance estimated-time calculation unit for obtaining, after an input of switching of the channel-selection is received, the I-picture appearance time and the I-pictures appearance interval-time corresponding to the switched channel from the channel-selection control information, and for adding the obtained I-pictures appearance interval-time to the obtained I-picture appearance time, thereby calculating an I-picture appearance estimated-time which is a time when a packet including an I-picture is obtained subsequently; and a delay period-of-time processing unit for delaying a channel switchover in the tuner until a time earlier than the I-picture appearance estimated-time calculated by the I-picture appearance estimated-time calculation unit by a switchover period-of-time required for the switching of the channel-selection.

Effects of the Invention

As described above, according to the present invention, it is possible to start channel switchover processing with reliability and to shorten an image non-displaying period.

BRIEF DESCRIPTION OF THE DRAWINGS

FIG. 2 is a schematic diagram of a first channel-selection control information table in the first embodiment;

FIG. 3 is a schematic diagram of a control unit in the first embodiment;

FIG. 7 is a schematic diagram of a transport stream header;

FIG. 12 is a schematic diagram of a program time information table in the third embodiment;

Figure 1:
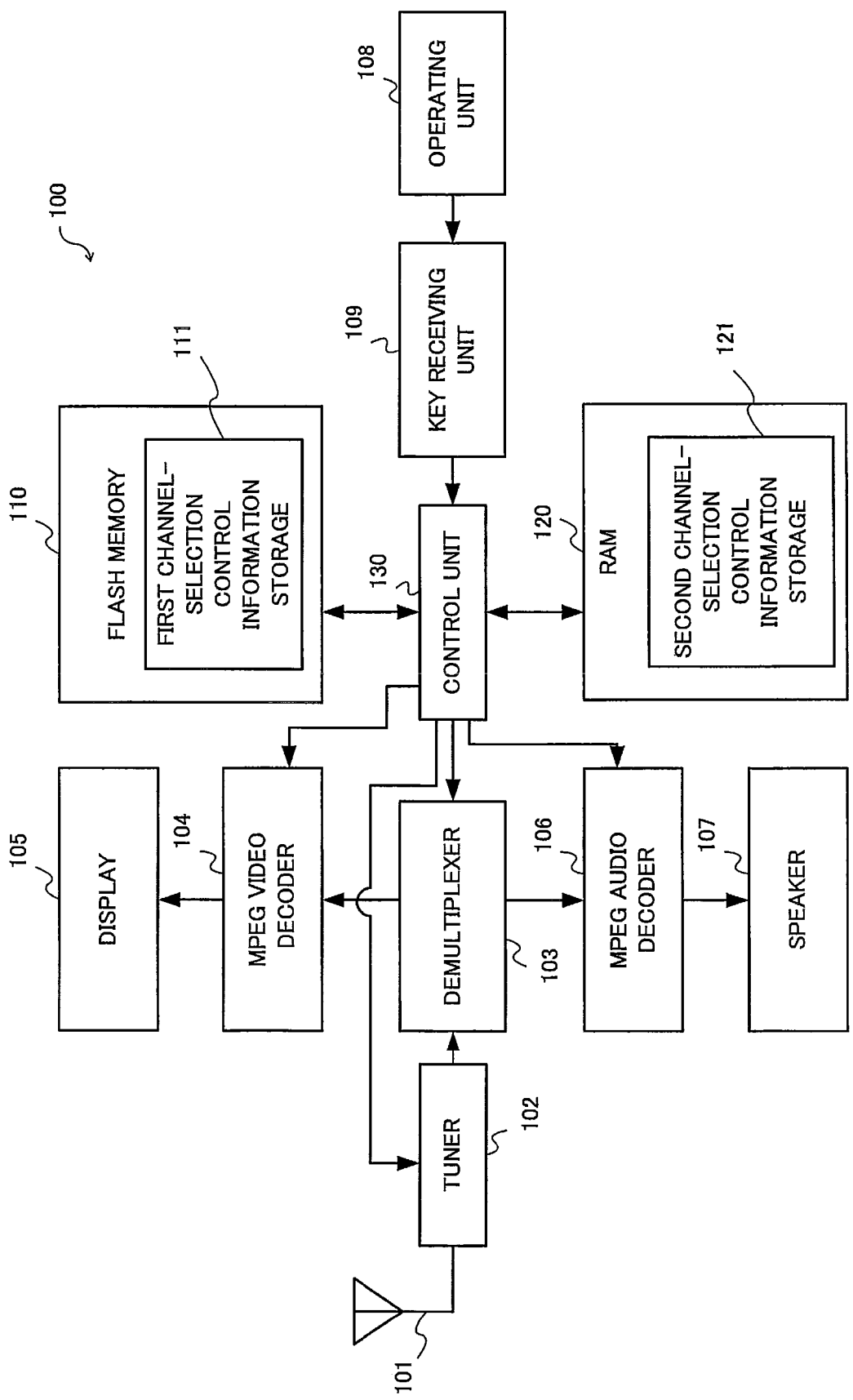
FIG. 1 is a schematic block diagram illustrating a configuration of a digital broadcast receiving apparatus according to a first embodiment.

REFERENCE CHARACTERS 100, 200, 300 digital broadcast receiving apparatus; 101 antenna; 102 tuner; 103 demultiplexer; 104 MPEG video decoder; 105 display; 106 MPEG audio decoder; 107 speaker; 10B operating unit; 109 key receiving unit; 110 flash memory; 111 first channel-selection control information storage; 120, 320 RAM; 121 second channel-selection control information storage; 322 program time information storage; 130, 230, 330 control unit; 131 whole control unit; 132 system clock unit; 133 channel-selection control unit; 134 I-picture appearance estimated-time calculation unit; 135 delay period-of-time processing unit; 136 tuner control period-of-time measurement unit; 137 PSI-section analysis period-of-time measurement unit; 138 I-picture appearance time acquisition unit; 139 I-pictures appearance interval-time calculation unit; 240 packet extraction unit; 241, 341 channel-selection control information update unit; 242 auxiliary tuner control period-of-time measurement unit; 243 auxiliary PSI-section analysis period-of-time measurement unit; 244 auxiliary I-picture appearance time acquisition unit; 245 auxiliary I-pictures appearance interval-time calculation unit; 346 program time information creation unit; 347 program switching detection unit; 260 auxiliary tuner; 261 memory buffer; 401 tuner; 402 demultiplexer; 403 video decoder; 404 audio decoder; 405, 409 first channel-selection control information storage; 406, 410 second channel-selection control information storage; 407, 411, 418 control unit; 408 descrambler; 412 GUI synthesizer; 413 auxiliary antenna; 414 auxiliary tuner; 415 auxiliary descrambler; 416 auxiliary demultiplexer; 417 memory buffer; 501 whole control unit; 502 system clock unit; 503 channel-selection control unit; 504 key-picture appearance estimated-time calculation unit; 505 delay period-of-time processing unit; 506 tuner control period-of-time measurement unit; 507 program-specific-information analysis period-of-time calculation unit; 508 key-picture appearance time acquisition unit; 509 key-pictures appearance interval-time calculation unit; 510 descramble startup period-of-time measurement unit; 511 auxiliary tuner control period-of-time measurement unit; 512 auxiliary program-specific-information analysis period-of-time calculation unit; 513 auxiliary key-picture appearance time acquisition unit; 514 auxiliary key-pictures appearance interval-time calculation unit; 515 auxiliary descramble startup period-of-time measurement unit; 516 channel-selection control information update unit.

MODE FOR CARRYING OUT THE INVENTION

First Embodiment

FIG. 1 is a schematic block diagram illustrating a configuration of a digital broadcast receiving apparatus 100 according to a first embodiment of the present invention. As illustrated in this figure, the digital broadcast receiving apparatus 100 includes an antenna 101, a tuner 102, a demultiplexer 103, an MPEG video decoder 104, a display 105, an MPEG audio decoder 106, a speaker 107, an operating unit 108, a key receiving unit 109, a flash memory 110, a RAM (Random Access Memory) 120, and a control unit 130.

The antenna 101 receives a digital broadcast signal and supplies the received digital broadcast signal to the tuner 102.

The tuner 102 demodulates the digital broadcast signal received from the antenna 101 to generate a transport stream (hereinafter referred to as TS) and supplies the generated TS to the demultiplexer 103.

The demultiplexer 103 separates the TS received from the tuner 102 to obtain a video packet, an audio packet, PSI (Program Specific Information) section data, SI (Service Information) section data and so on. Thereafter, the video packet is supplied to the MPEG video decoder 104, the audio packet is supplied to the MPEG audio decoder 106, and the PSI section data and the SI section data are supplied to the control unit 130.

The MPEG video decoder 104 decodes data obtained from the video packet received from the demultiplexer 103, thereby generating video data, and supplies the generated video data to the display 105. The display 105 displays the video data received from the MPEG video decoder 104.

The MPEG audio decoder 106 decodes data obtained from the audio packet received from the demultiplexer 103, thereby generating audio data, and supplies the generated audio data to the speaker 107. The speaker 107 outputs the audio data received from the MPEG audio decoder 106.

The operating unit 108 receives an operational input to the digital broadcast receiving apparatus 100 by a user of the digital broadcast receiving apparatus 100, and outputs an operation key signal corresponding to the operational input. The key receiving unit 109 receives the operation key signal output from the operating unit 108, and supplies an operation signal corresponding to the operation key signal to the control unit 130.

The flash memory 110, in which an application program for realizing processing executed by the digital broadcast receiving apparatus 100 is stored, has a first channel-selection control information storage 111 in the present embodiment.

The first channel-selection control information storage 111 stores first channel-selection control information for each channel specifying a tuner control period-of-time, a PSI section analysis period-of-time, an I-picture appearance time, and an I-pictures appearance interval-time. In the present embodiment, a first channel-selection control information table 111*a* illustrated in FIG. 2 is stored, for example.

As illustrated in the figure, the first channel-selection control information table 111*a* includes an item column 111*b* and channel columns 111*c*.

The item column 111*b* stores information for specifying names of values stored in the channel columns 111*c*. In the present embodiment, character strings of the tuner control period-of-time, the PSI section analysis period-of-time, the I-picture appearance time and the I-pictures appearance interval-time are stored as the information for specifying names of values stored in the channel columns 111*c*.

Values corresponding to names specified by the item column 111*b* for each channel are stored in the channel columns 111*c*. Further, the values stored in the channel columns 111*c*, as will be described later, are updated by the control unit 130. Furthermore, in the present embodiment, values 0 are stored as initial values in the channel columns 111*c*, but they are not limited to these examples.

In this connection, the tuner control period-of-time is a period of time, in a case where the digital broadcast signal received by the tuner 102 is tuned to a channel specified in the channel columns 111*c*, from when an instruction for switching is supplied to the tuner 102 to when the digital broadcast signal on the channel switched by the tuner 102 becomes receivable. Further, the PSI section analysis period-of-time is a period of time from when the PSI section data is supplied to the control unit 130 to when the PID of a video packet and an audio packet is obtained. Furthermore, the I-picture appearance time is a time at which a video packet including an I-picture was obtained lastly in the MPEG video decoder 104. Moreover, the I-pictures appearance interval-time is an interval between the I-picture appearance times when video packets each including an I-picture are obtained successively by the MPEG video decoder 104.

In addition to storing data necessary for realizing processing to be executed in the digital broadcast receiving apparatus 100, the RAM 120 includes a second channel-selection control information storage 121 in the present embodiment.

The second channel-selection control information storage 121 stores the first channel-selection control information table 111*a* obtained from the first channel-selection control information storage 111 in the flash memory 110 as a second channel-selection control information table 121*a*. In the following description, the second channel-selection control information table 121*a* is a table having a similar structure to the first channel-selection control information table 111*a* shown in FIG. 2, an item column 121*b* of the second channel-selection control information table 121*a* is a similar item to the item column 111*b* of the first channel-selection control information table 111*a*, and a channel columns 121*c* of the second channel-selection control information table 121*a* is a similar item to the channel columns 111*c* of the first channel-selection control information table 111*a*.

FIG. 3 is a schematic diagram of the control unit 130 according to the first embodiment. As illustrated in this figure, the control unit 130 includes a whole control unit 131, a system clock unit 132, a channel-selection control unit 133, an I-picture appearance estimated-time calculation unit 134, a delay period-of-time processing unit 135, a tuner control period-of-time measurement unit 136, a PSI-section analysis period-of-time measurement unit 137, an I-picture appearance time acquisition unit 138, and an I-pictures appearance interval-time calculation unit 139.

The whole control unit 131 controls the whole of processing in the digital broadcast receiving apparatus 100. The system clock unit 132 performs a clocking operation to calculate a time. The system clock unit 132 is a unit for calculating a time.

When the channel-selection is conducted through the operating unit 108, the channel-selection control unit 133 executes channel-selection processing such as tuning the tuner 102 to a frequency band of the selected channel.

The I-picture appearance estimated-time calculation unit 134 calculates an I-picture appearance estimated-time in the future nearest to a current time by adding an I-pictures appearance interval to an I-picture appearance time.

The delay period-of-time processing unit 135 subtracts a tuner control period-of-time, a period of time required for obtaining and analyzing a PSI section and a current time from the I-picture appearance estimated-time calculated by the I-picture appearance estimated-time calculation unit 134, thereby calculating a delay period-of-time, by which the starting time of the channel switchover processing is delayed.

The tuner control period-of-time measurement unit 136 measures the tuner control period-of-time from when the tuner 102 receives an instruction for switching the channel to when a broadcasting signal on the switched channel becomes receivable.

The PSI-section analysis period-of-time measurement unit 137 analyzes the PSI section in the whole control unit 131, thereby measuring a period of time required for obtaining the PID of the video packet and the audio packet.

If the video packet separated by the demultiplexer 103 is a packet including an I-picture, the I-picture appearance time acquisition unit 138 regards a time read from the system clock unit 132 as the I-picture appearance time.

The I-pictures appearance interval-time calculation unit 139 calculates the I-pictures appearance interval-time from a difference between an I-picture appearance time obtained by the I-picture appearance time acquisition unit 138 and an I-picture appearance time of corresponding channel, being stored in the second channel-selection control information storage 121.

Figure 4:
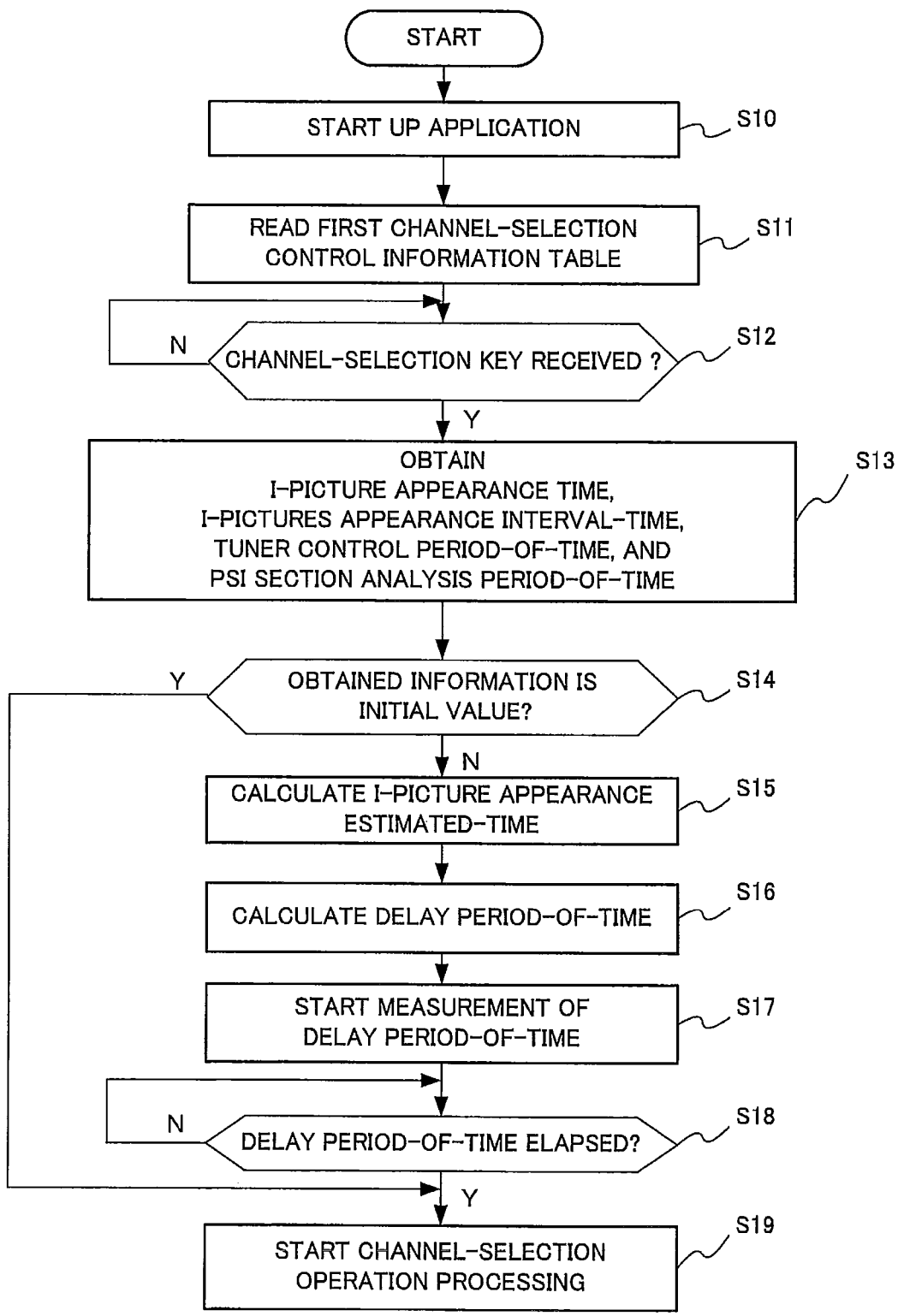
FIG. 4 is a flowchart showing channel-selection processing in the digital broadcast receiving apparatus according to the first embodiment.

FIG. 4 is a flowchart showing channel-selection processing in the digital broadcast receiving apparatus 100 according to the first embodiment.

First, the digital broadcast receiving apparatus 100 is powered on, the control unit 130 starts up an application stored in the flash memory 110 (S10). The whole control unit 131 in the control unit 130 then reads the first channel-selection control information table 111a stored in the first channel-selection control information storage 111 of the flash memory 110 and stores the read first channel-selection control information table 111a as a second channel-selection control information table 121a in the second channel-selection control information storage 121 of the RAM 120 (S11).

Next, when the user of the digital broadcast receiving apparatus 100 presses a channel-selection key of the operating unit 108 in order to switch a channel to be viewed/listened to, the key receiving unit 109 receives a channel-selection key signal corresponding to the channel-selection key (Yes in S12) and supplies a channel-selection signal corresponding to the received channel-selection key signal to the control unit 130. In this one example, the user of the digital broadcast receiving apparatus 100 switches the selected-channel from channel 1 (CH1) to channel 2 (CH2).

In the control unit 130 that received the channel-selection signal, the delay period-of-time processing unit 135 and the I-picture appearance estimated-time calculation unit 134 obtain information for specifying the tuner control period-of-time (in this case, a tuner control period-of-time A2), the PSI section analysis period-of-time (in this case, a PSI section analysis period-of-time B2), the I-picture appearance time (in this case, an I-picture appearance time C2) and the I-pictures appearance interval-time (in this case, an I-pictures appearance interval-time D2) from a column corresponding to the channel columns 121c in the second channel-selection control information table 121a (S13).

Next, the channel-selection control unit 133 and the I-picture appearance estimated-time calculation unit 134 checks whether or not the tuner control period-of-time A2, the PSI section analysis period-of-time B2, the I-picture appearance time C2 and the I-pictures appearance interval-time D2 obtained in step S13 have initial values (S14). In the present embodiment, whether those have a value of 0 as the initial value is checked, but the embodiment is not limited to this example. If those do not have the initial values (No in step S14), processing proceeds to step S15, whereas if those have the initial values (Yes in step S14), processing proceeds to step S19.

In step S15, the I-picture appearance estimated-time calculation unit 134 calculates the I-picture appearance estimated-time. For example, first, the I-picture appearance estimated-time calculation unit 134 obtains a time T as a current time from the system clock unit 132, and calculates an integer N that satisfies the following equation (2) using the I-picture appearance time C2 and the I-pictures appearance interval-time D2 obtained in step S13.

$$C2 + D2 \times N - T < D2 \qquad (2)$$

In this connection, a left side of equation (2) has a positive value.

Next, the I-picture appearance estimated-time calculation unit 134 calculates an I-picture appearance estimated-time R using the integer N calculated by equation (2) from the following equation (3).

$$R = C2 + D2 \times N \qquad (3)$$

Next, the delay period-of-time processing unit 135 calculates a delay period-of-time L, by which the channel-selection control unit 133 delays start of the channel-selection processing (S16). For example, the delay period-of-time processing unit 135 calculates the delay period-of-time L using the I-picture appearance estimated-time R calculated in step S15, the tuner control period-of-time A2 and PSI section analysis period-of-time B2 obtained in step S13, and the current time T, from the following equation (4).

$$L = R - A2 - B2 - 100 \text{ (ms)} - T \qquad (4)$$

In this connection, since the PSI section data are transmitted for a cycle of 100 (ms), in some cases, a waiting period of time from completion of the tuner control to start of the analysis of the PSI section data reaches approximately 100 (ms) at the maximum. For this reason, equation (4) includes the maximum value (100 (ms)) of a cycle time of the PSI section data.

Furthermore, when the delay period-of-time L calculated by the delay period-of-time processing unit 135 is less than a value of 0, even if the channel-selection processing starts, the channel-selection processing is not completed until the I-picture appearance estimated-time R and the image non-displaying period undesirably increases by the next I-picture appearance waiting time. Therefore, the delay period-of-time L is a value obtained by adding the I-pictures appearance interval-time D2 once or several times so that the delay period-of-time L calculated by equation (4) becomes the minimum value of positive values.

After the delay period-of-time L is calculated in step S17, the delay period-of-time processing unit 135 starts time measuring of the delay period-of-time L and waits until the delay period-of-time L elapses. If the delay period-of-time L elapsed (Yes in S18), processing of the delay period-of-time processing unit 135 proceeds to step S19.

In step S19, the delay period-of-time processing unit 135 instructs the channel-selection control unit 133 to start the channel-selection operation processing, and then the channel-selection control unit 133 starts the channel-selection operation processing.

As described above, in the flowchart illustrated in FIG. 4, since an image of channel 1 is being displayed for the delay period-of-time L (in the delay period-of-time L, appearance of I-picture has to be waited for in conventional devices), it is possible to shorten the image non-displaying period. Furthermore, since the channel-selection operation starts when the delay period-of-time has elapsed, it is possible to start the channel-selection operation with reliability.

Figure 5:
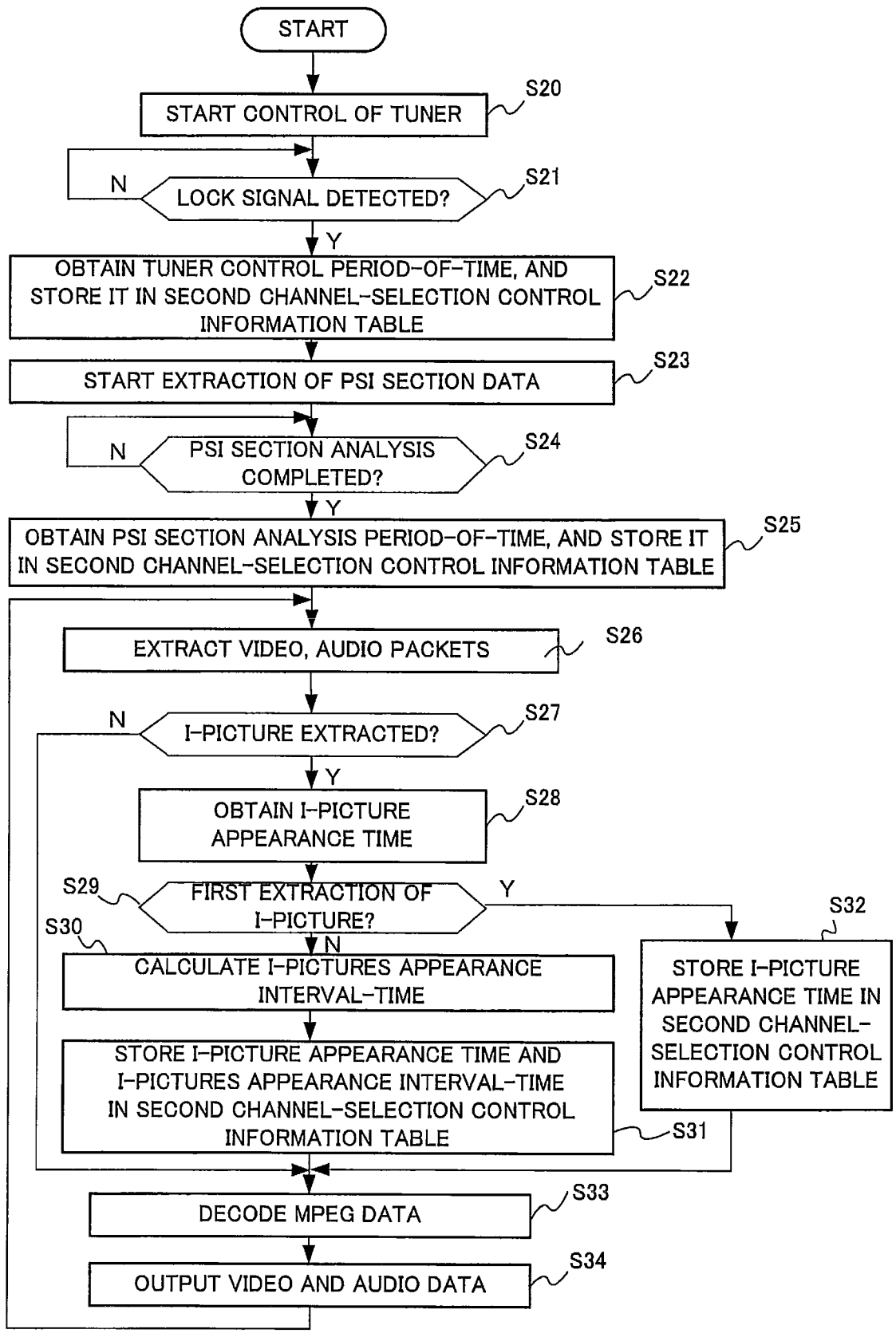
FIG. 5 is a flowchart showing channel-selection operation processing in the first embodiment.

FIG. 5 is a flowchart showing channel-selection operation processing in the first embodiment. In this flowchart, a channel is switched from channel 1 to channel 2.

First, when the channel-selection operation starts, the channel-selection control unit 133 gives an instruction for switching a frequency band to the tuner 102, thereby starting the tuner control (S20), in order to receive and demodulate a digital broadcast signal of channel 2. In this connection, when the channel-selection control unit 133 starts the tuner control, the tuner control period-of-time measurement unit 136 reads a time from the system clock unit 132 and obtains the read time as a tuner control starting time.

When starting the tuner control, the channel-selection control unit 133 waits for detection of a lock signal which is generated when the tuner 102 becomes able to receive channel 2 (S21), whereas if it detects such lock signal (Yes in S21), processing proceeds to step S22.

In step S22, the tuner control period-of-time measurement unit 136 reads a time from the system clock unit 132 and regard it as a tuner lock time, obtains a difference value by subtracting the tuner control starting time obtained in step S20 from the tuner lock time, thereby calculating a tuner control period-of-time, and stores the calculated tuner control period-of-time in the second channel-selection control information table 121a corresponding to channel 2 (S22).

In the tuner 102, when the digital broadcast signal of channel 2 becomes receivable, the demultiplexer 103 starts extracting the PSI section data from a TS output from the tuner 102 (S23). In this connection, when the extraction of the PSI section data starts, the PSI-section analysis period-of-time measurement unit 137 reads a time from the system clock unit 132 and obtains the read time as a PSI section analysis starting time.

The PSI section data is a packet including program-specific-information necessary for specifying a program such as a PAT (Program Association Table), a PMT (Program Map Table) and so on.

In order to extract the PMT, the whole control unit 131 first needs to extract and analyze the PAT. After analyzing the PAT, the whole control unit 131 extracts and analyzes the PMT. The PSI-section analysis period-of-time measurement unit 137 determines that the analysis of the PSI section is completed by obtaining a video PID and an audio PID necessary for extracting a video packet and an audio packet.

After that, when the whole control unit 131 analyzes the PMT and obtains the video PID and the audio PID (Yes in S24), the PSI-section analysis period-of-time measurement unit 137 reads a time from the system clock unit 132 and obtains the read time as a PSI section analysis ending time, calculates a PSI section analysis period-of-time which is a difference value obtained by subtracting the PSI section analysis starting time obtained in step S23 from the PSI section analysis ending time, and stores the calculated PSI section analysis period-of-time in the second channel-selection control information table 121a corresponding to channel 2 (S25).

Next, the demultiplexer 103 extracts a video packet and an audio packet from the TS output from the tuner 102 (S26). The extracted video packet is supplied to the MPEG video decoder 104 and the extracted audio packet is supplied to the MPEG audio decoder 106.

When the demultiplexer 103 starts extracting the video packet, the I-picture appearance time acquisition unit 138 judges whether or not the video packet extracted by the demultiplexer 103 is a packet including an I-picture (S27). If the video packet is a packet including an I-picture (Yes in step S27), processing proceeds to step S28, whereas if the video packet is not a packet including an I-picture (No in step S27), processing proceeds to step S33.

In step S28, the I-picture appearance time acquisition unit 138 reads a time from the system clock unit 132 and obtains the read time as an I-picture appearance time.

After that, the I-picture appearance time acquisition unit 138 judges whether or not acquisition of the I-picture appearance time is the first one counted from the start of control of the tuner 102 performed in step S20 (S29). If the acquisition of the I-picture appearance time is not the first one (No in step S29), processing proceeds to step S30, whereas if the acquisition of the I-picture appearance time is the first one (Yes in step S29), processing proceeds to step S32.

In step S30, the I-pictures appearance interval-time calculation unit 139 obtains the I-picture appearance time corresponding to channel 2 from the second channel-selection control information table 121a, and calculates the I-pictures appearance interval-time from a difference value obtained by subtracting the obtained I-picture appearance time from the I-picture appearance time obtained in step S28.

The I-picture appearance time acquisition unit 138 stores the I-picture appearance time obtained in step S28 at a section corresponding to channel 2 of the second channel-selection control information table 121a, and the I-pictures appearance interval-time calculation unit 139 stores the I-pictures appearance interval-time calculated in step S30 at a section corresponding to channel 2 of the second channel-selection control information table 121a (S31).

On the other hand, in step S32, the I-picture appearance time acquisition unit 138 stores the I-picture appearance time obtained in step S28 at a section corresponding to channel 2 of the second channel-selection control information table 121a.

Next, the MPEG video decoder 104 and the MPEG audio decoder 106 execute decode processing (S33) to supply the decoded video data and decoded audio data to the display 105 and the speaker 107 respectively (S34).

After that, processing returns to step S26, processes of step S26 and after that are repeated every time the demultiplexer 103 extracts a video packet.

Furthermore, when the second channel-selection control information table 121a is updated in step S31, the whole control unit 131 reads the second channel-selection control information table 121a from the RAM 120 and stores it as the first channel-selection control information table 111a in the first channel-selection control information storage 111 of the flash memory 110, thereby synchronizing these tables with each other.

Figure 6:
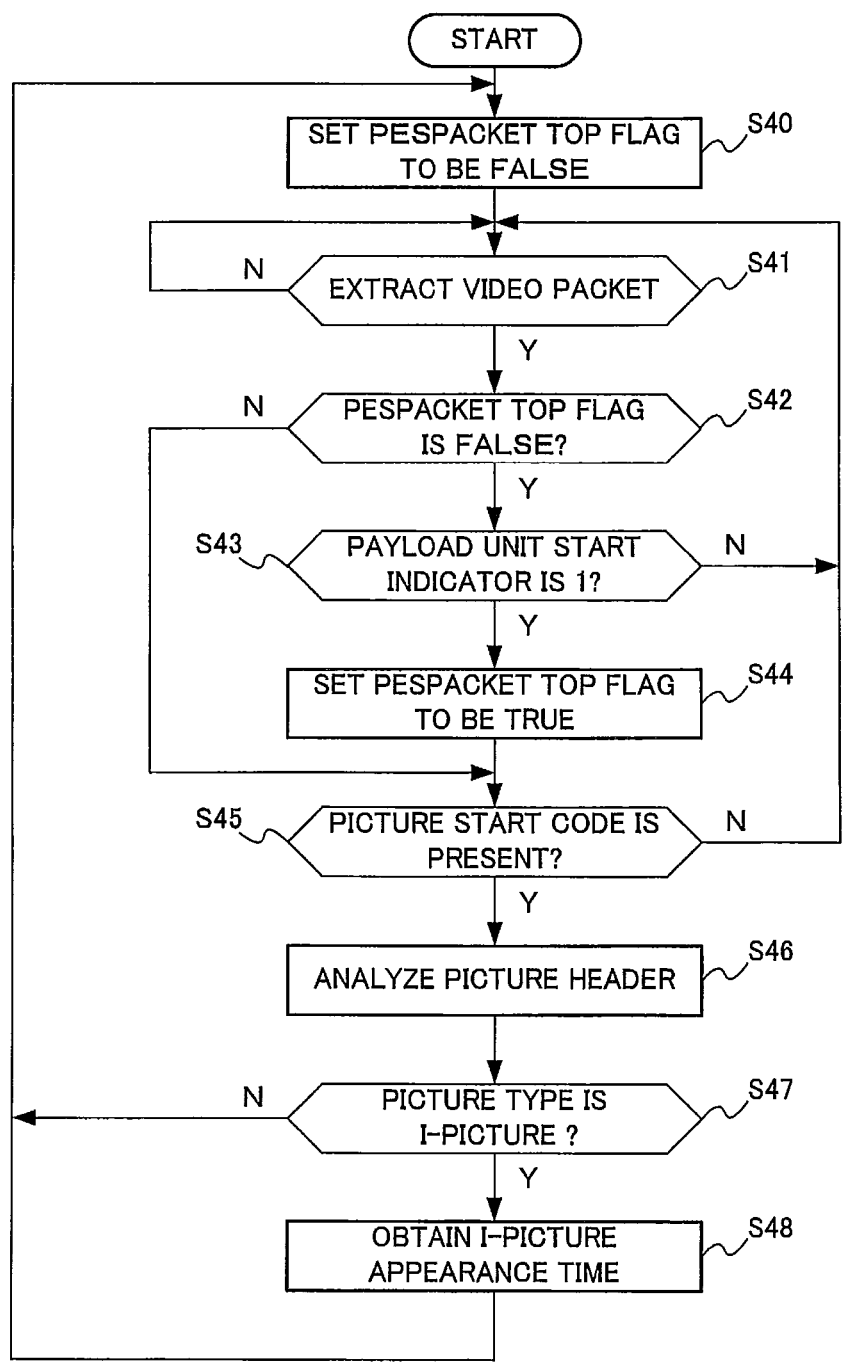
FIG. 6 is a flowchart showing details of I-picture appearance time acquisition processing performed by an I-picture appearance time acquisition unit in the first embodiment.

FIG. 6 is a flowchart showing details of appearance time acquisition processing for an I-picture performed by the I-picture appearance time acquisition unit 138.

First, the I-picture appearance time acquisition unit 138 sets a PES packet top flag to be FALSE (S40), wherein the PES packet top flag indicates whether or not the demultiplexer 103 includes a head portion of a PES (Packetized Elementary Stream) packet and extraction of the video packet starts from the head portion.

Next, the I-picture appearance time acquisition unit 138 waits until the demultiplexer 103 extracts a video packet (S41), whereas if the video packet was extracted (Yes in S41), processing proceeds to step S42.

In step S42, the I-picture appearance time acquisition unit 138 judges whether or not the PES packet top flag is FALSE. If the PES packet top flag is FALSE (Yes in step S42), processing proceeds to step S43, whereas if the PES packet top flag is not FALSE (No in step S42), processing proceeds to step S45.

In step S43, the I-picture appearance time acquisition unit 138 analyzes a transport stream header (see FIG. 7 illustrating a schematic diagram of a transport stream header) located at a head portion of the video packet, thereby judging whether or not a parameter of the payload-unit starting indicator has a value of 1. If the parameter has a value of 1 (Yes in step S43), processing proceeds to step S44, whereas the parameter does not have a value of 1 (No in step S43), processing returns to step S41 and is repeated.

A video packet, in which the parameter of the payload-unit starting indicator has a value of 1, includes a head portion of the PES packet, and an I-picture is always placed in the head portion of the PES packet. In other words, it is possible to judge whether or not the I-picture appears by analyzing a video packet, in which the parameter of the payload-unit starting indicator has a value of 1.

In step S44, the I-picture appearance time acquisition unit 138 sets the PES packet top flag to be TRUE.

Next, the I-picture appearance time acquisition unit 138 judges whether or not the video packet includes a start code indicating a picture header (S45). The start code is a 32-bit value (0x00000100). If the start code is included (Yes in step S45), processing proceeds to step S46, whereas if the start code is not included (No in step S45), processing returns to step S41 and is repeated.

In step S46, the I-picture appearance time acquisition unit 138 obtains a picture type included in the picture header (S46).

The I-picture appearance time acquisition unit 138 judges whether or not the picture type obtained in step S46 is an I-picture (S47). If it is an I-picture (Yes in S47), processing proceeds to step S48, whereas if it is not an I-picture (No in S47), processing returns to step S40 and is repeated.

In step S48, the I-picture appearance time acquisition unit 138 reads a time from the system clock unit 132 and obtains the read time as an I-picture appearance time.

As described above, in the first embodiment, when a user of the digital broadcast receiving apparatus 100 switches a selected channel from a certain channel being viewed/listened to, to a different channel, an image of the channel being viewed/listened to is being displayed for the appearance waiting time of an I-picture (which was an image non-displaying period in conventional cases) by estimating the appearance time of the I-picture on this different channel and delaying the start of the channel-selection operation so that the appearance time of the I-picture coincides with the completion of the channel-selection operation. Therefore, it is possible to shorten the image non-displaying period.

Furthermore, by storing the first channel-selection control information table 110 in the nonvolatile flash memory 110, even when the digital broadcast receiving apparatus 100 is powered off and thereafter again powered on, the channel-selection operation can be performed according to the appearance time of I-picture even at the first channel switching. Therefore, it is possible to shorten the image non-displaying period.

Second Embodiment

Next, a second embodiment of the present invention will be described. In the second embodiment, information stored in the second channel-selection control information table 121a is updated using a TS of a channel different from a channel being viewed/listened to by the user.

Figure 8:
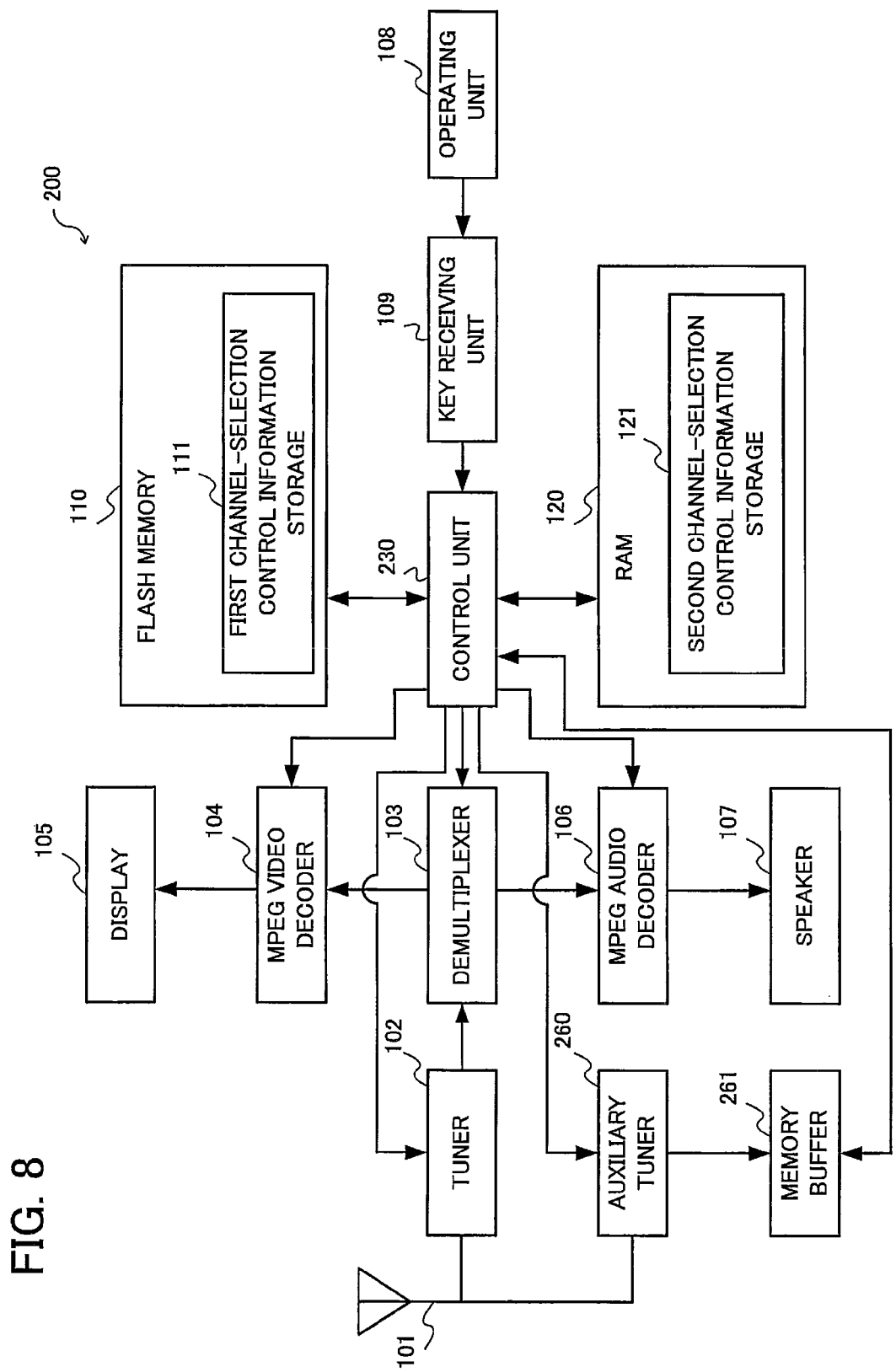
FIG. 8 is a schematic block diagram illustrating a configuration of a digital broadcast receiving apparatus according to a second embodiment.

FIG. 8 is a schematic block diagram illustrating a configuration of a digital broadcast receiving apparatus 200 according to the second embodiment. As illustrated in this figure, the digital broadcast receiving apparatus 200 includes an antenna 101, a tuner 102, a demultiplexer 103, an MPEG video decoder 104, a display 105, an MPEG audio decoder 106, a speaker 107, an operating unit 108, a key receiving unit 109, a flash memory 110, a RAM 120, a control unit 230, an auxiliary tuner 260 and a memory buffer 261, and is different from the first embodiment in the points of the control unit 230, the auxiliary tuner 260 and the memory buffer 261. Therefore, items in relation to these will be described below.

The auxiliary tuner 260 demodulates a digital broadcast signal received from the antenna 101 to generate a TS and supplies the generated TS to the memory buffer 261. It is preferable to use the auxiliary tuner 260 which has performance equivalent to that of the tuner 102.

The memory buffer 261 stores the TS supplied from the auxiliary tuner 260.

Figure 9:
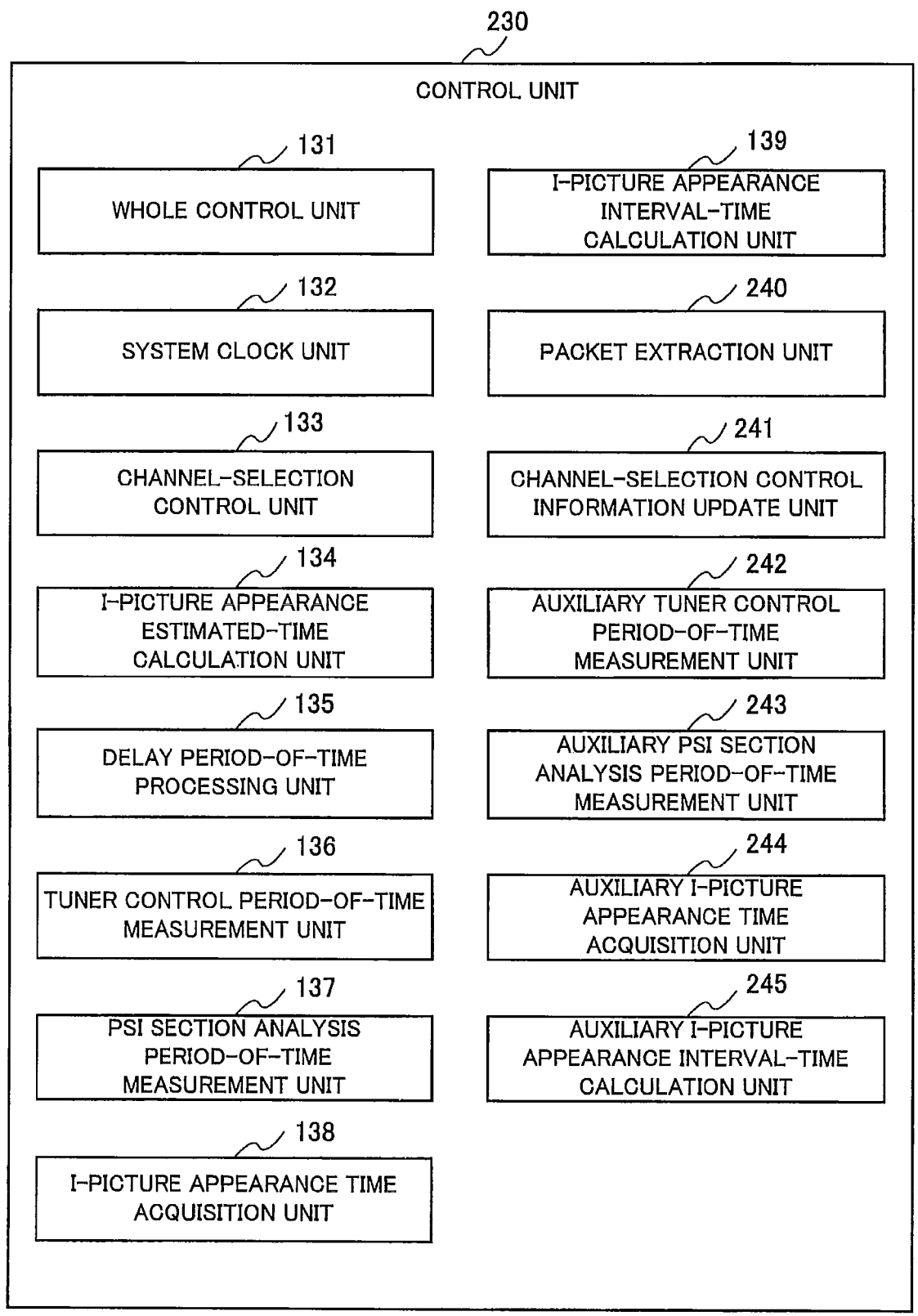
FIG. 9 is a schematic diagram of a control unit in the second embodiment.

FIG. 9 is a schematic diagram of the control unit 230 in the second embodiment. As illustrated in this figure, the control unit 230 includes a whole control unit 131, a system clock unit 132, a channel-selection control unit 133, an I-picture appearance estimated-time calculation unit 134, a delay period-of-time processing unit 135, a tuner control period-of-time measurement unit 136, a PSI-section analysis period-of-time measurement unit 137, an I-picture appearance time acquisition unit 138, an I-pictures appearance interval-time calculation unit 139, a packet extraction unit 240, a channel-selection control information update unit 241, an auxiliary tuner control period-of-time measurement unit 242, an auxiliary PSI-section analysis period-of-time measurement unit 243, an auxiliary I-picture appearance time acquisition unit 244, and an auxiliary I-pictures appearance interval-time calculation unit 245. Since the control unit 230 is different from that in the first embodiment in the points of the packet extraction unit 240, the channel-selection control information update unit 241, the auxiliary tuner control period-of-time measurement unit 242, the auxiliary PSI-section analysis period-of-time measurement unit 243, the auxiliary I-picture appearance time acquisition unit 244 and the auxiliary I-pictures appearance interval-time calculation unit 245, items in relation to these will be described below.

The packet extraction unit 240 extracts a' video packet, an audio packet and PSI section data from the TS stored in the memory buffer 261.

The channel-selection control information update unit 241 controls processing for storing a tuner control period-of-time, a PSI section analysis period-of-time, an I-picture appearance time and an I-pictures appearance interval-time calculated from the video packet, the audio packet and the PSI section data extracted by the packet extraction unit 240 in the second channel-selection control information table 121a.

The auxiliary tuner control period-of-time measurement unit 242 measures a tuner control period-of-time which is a period of time from when the auxiliary tuner 260 receives an instruction for switching a channel to when a broadcasting signal of the switched channel becomes receivable.

The auxiliary PSI-section analysis period-of-time measurement unit 243 measures a period of time required for analyzing the PSI section and obtaining the PAD of the video packet and the audio packet in the whole control unit 131 on the basis of the PSI section data extracted by the packet extraction unit 240.

If the video packet extracted by the packet extraction unit 240 is a packet including an I-picture, the auxiliary I-picture appearance time acquisition unit 244 obtains a time from the system clock unit 132 and uses it as the I-picture appearance time.

The auxiliary I-pictures appearance interval-time calculation unit 245 calculates an I-pictures appearance interval-time from a difference between an I-picture appearance time obtained by the auxiliary I-picture appearance time acquisition unit 244 and an I-picture appearance time of the corresponding channel being stored in the second channel-selection control information storage 121.

Figure 10:
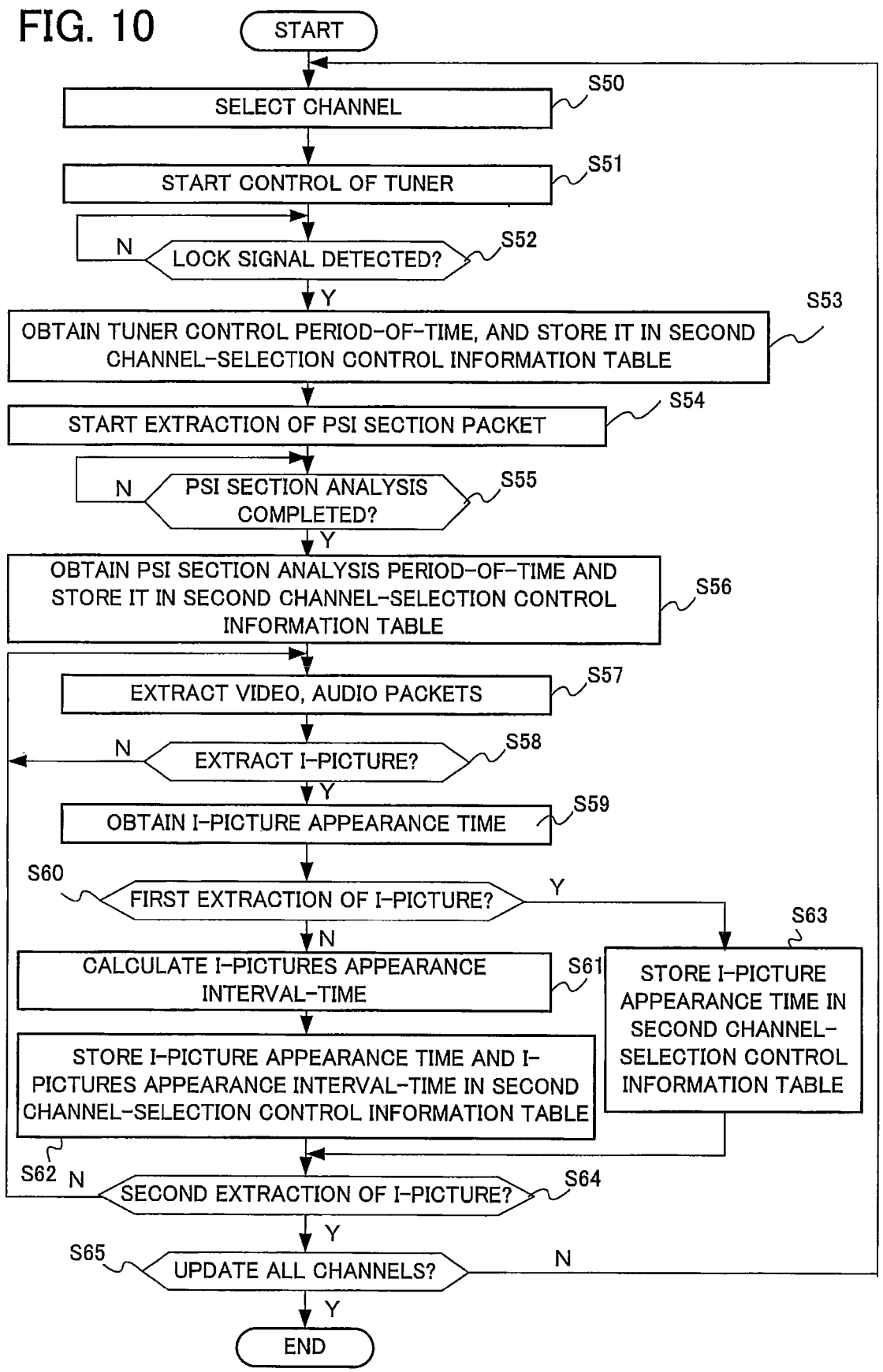
FIG. 10 is a flowchart showing processing of updating a second channel-selection control information table on the basis of a TS obtained through an auxiliary tuner in the second embodiment.

FIG. 10 is a flowchart showing processing of updating the second channel-selection control information table 121a on the basis of the TS obtained through the auxiliary tuner 260 in the second embodiment.

First, the channel-selection control information update unit 241 selects a certain channel, the second channel-selection control information table 121a of which has not yet been updated (S50). Next, the channel-selection control information update unit 241 starts the tuner control to the auxiliary tuner 260 in order to receive and demodulate a digital broadcast signal of the channel selected in step S50 (S51). In this connection, when the channel-selection control information update unit 241 starts the tuner control, the auxiliary tuner control period-of-time measurement unit 242 reads a time from the system clock unit 132 and obtains the read time as a tuner control starting time.

When starting the tuner control, the channel-selection control information update unit 241 waits until the lock signal which is generated when the auxiliary tuner 260 becomes able to receive the digital broadcast signal of the channel selected in step S50 is detected (S52), and when detecting such lock signal (Yes in S52), processing proceeds to step S53.

In step S53, the auxiliary tuner control period-of-time measurement unit 242 reads a time from the system clock unit 132 and regards it as a tuner lock time, calculates a tuner control period-of-time which is a difference value obtained by subtracting the tuner control starting time obtained in step S51 from the tuner lock time, and stores the calculated tuner control period-of-time in the second channel-selection control information table 121a corresponding to the channel selected in step S50 (S53).

When in the auxiliary tuner 260, the digital broadcast signal on channel selected in step S50 becomes a receivable state, the packet extraction unit 240 starts extracting the PSI section data from the TS that is output from the auxiliary tuner 260 and stored in the memory buffer 261 (S54). In this connection, when the extraction of the PSI section data starts, the auxiliary PSI-section analysis period-of-time measurement unit 243 reads a time from the system clock unit 132 and obtains the read time as the PSI section analysis starting time.

After that, the whole control unit 131 analyzes the PAT, then extracts and analyzes the PMT, and obtains a video PID and an audio PID required for extracting the video packet and the audio packet, and therefore the auxiliary PSI-section analysis period-of-time measurement unit 243 determines that the analysis of the PSI is completed.

When the whole control unit 131 analyzes the PMT and obtains the video PID and the audio PID (Yes in S55), the auxiliary PSI-section analysis period-of-time measurement unit 243 reads a time from the system clock unit 132 as a PSI section analysis ending time, calculates a PSI section analysis period-of-time which is a difference value obtained by subtracting the PSI section analysis starting time obtained in step S54 from the PSI section analysis ending time, and stores the calculated PSI section analysis period-of-time in the second channel-selection control information table 121a corresponding to the channel selected in step S50 (S56).

Next, the packet extraction unit 240 extracts the video packet and the audio packet from the TS output from the auxiliary tuner 260 and stored in the memory buffer 261 (S57).

When the packet extraction unit 240 starts extracting the video packet, the auxiliary I-picture appearance time acquisition unit 244 judges whether or not the video packet extracted by the packet extraction unit 240 is a packet including an I-picture (S58). If the video packet is a packet including an I-picture (Yes in step S58), processing proceeds to step S59, whereas if the video packet is not a packet including an I-picture (No in step S58), processing returns to step S57 and is repeated.

In step S59, the auxiliary I-picture appearance time acquisition unit 244 reads a time from the system clock unit 132 and obtains the read time as an I-picture appearance time. In this connection, details of processing executed by the auxiliary I-picture appearance time acquisition unit 244 are approximately the same as those in the flowchart of FIG. 6.

The auxiliary I-picture appearance time acquisition unit 244 then judges whether or not the acquisition of the I-picture appearance time in step S59 is the first one counted from the start of control of the auxiliary tuner 260 in step S51 (S60). If the acquisition of the I-picture appearance time is not the first one (No in step S60), processing proceeds to step S61, whereas if the acquisition of the I-picture appearance time is the first one (Yes in step S60), processing proceeds to step S63.

In step S61, the auxiliary I-pictures appearance interval-time calculation unit 245 obtains the I-picture appearance time corresponding to the channel selected in step S50 from the second channel-selection control information table 121a, and calculates an I-pictures appearance interval-time which is a difference value obtained by subtracting the obtained I-picture appearance time from the I-picture appearance time obtained in step S59.

The auxiliary I-picture appearance time acquisition unit 244 stores the I-picture appearance time obtained in step S59 at a section corresponding to the channel selected in step S50 in the second channel-selection control information table 121a, and the auxiliary I-pictures appearance interval-time calculation unit 245 stores the I-pictures appearance interval-time calculated in step S61 at a section corresponding to the channel selected in step S50 in the second channel-selection control information table 121a (S62).

On the other hand, in step S63, the auxiliary I-picture appearance time acquisition unit 244 stores the I-picture appearance time obtained in step S59, at a section corresponding to the channel selected in step S50 in the second channel-selection control information table 121a.

Next, the channel-selection control information update unit 241 judges whether or not the acquisition of the I-picture appearance time performed in step S59 is the second one counted from the start of control of the auxiliary tuner 260 in step S51 (S64). If the acquisition of the I-picture appearance time is not the second one (is the first one) (No in step S64), processing returns to step S57 and is repeated, whereas if the acquisition of the I-picture appearance time is the second one (Yes in step S64), processing proceeds to step S65.

In step S65, the channel-selection control information update unit 241 judges whether or not the second channel-selection control information tables 121a of all channels other than the channel selected by the tuner 102 were updated.

If the update of all channels have been finished (Yes in step S65), processing ends, whereas if the update of all channels have not been finished (No in step S65), processing returns to step S50 and is repeated.

Further, in the present flowchart, if the update of the second channel-selection control information tables 121a of all channels other than the channel selected by the tuner 102 is completed, processing ends. However, when the processing ends in this way, it is possible to assume that the update of the second channel-selection control information tables 121a of all channels other than the channel selected by the tuner 102 is not performed and the present flow starts again. Furthermore, at an arbitrary timing, for example, at specific intervals and periodically, or when a specific period of time has passed from the start of viewing/listening of the channel selected by the tuner 102, it is possible to assume that the update of the second channel-selection control information tables 121a of all channels other than the channel selected by the tuner 102 is not performed and the present flow starts again.

Furthermore, when the second channel-selection control information table 121a is updated in step S62, the channel-selection control information update unit 241 reads the second channel-selection control information table 121a from the RAM 120 and stores it as a first channel-selection control information table 111a in the first channel-selection control information storage 111 of the flash memory 110, thereby maintaining synchronization between these tables.

As described above, according to the present embodiment, the channel-selection of a channel other than the channel being viewed/listened to by the user is performed in advance using another tuner and the second channel-selection control information table 121a is updated in advance. Therefore, at the first and the subsequent channel switchings, the channel-selection can be performed according to the I-picture appearance time. Accordingly, it is possible to shorten the image non-displaying period.

Although the memory buffer 261 stores the TS in the present embodiment, the embodiment is not limited to this configuration and the RAM 120 may have an area for storing the TS.

Third Embodiment

Next, a third embodiment of the present invention will be described. In the third embodiment, in a similar manner to the second embodiment, information stored in the second channel-selection control information table 121a is updated using a TS of a channel different from a channel being viewed/listened to by the user. However, in the third embodiment, using program time information, with regard to a channel on which a new program starts, information stored in the second channel-selection control information table 121a is updated.

Figure 11:
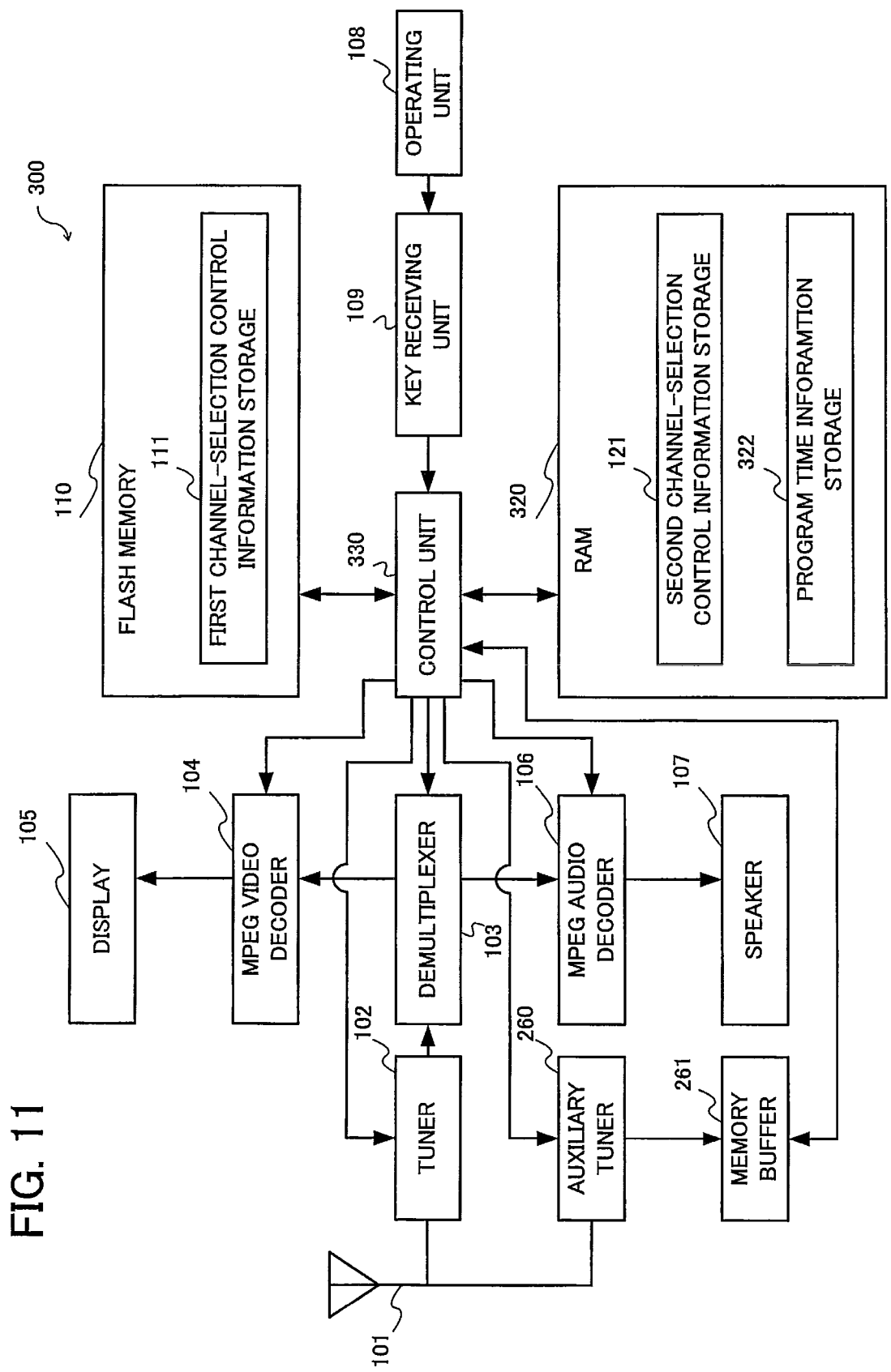
FIG. 11 is a schematic block diagram illustrating a configuration of a digital broadcast receiving apparatus according to a third embodiment.

FIG. 11 is a schematic block diagram illustrating a configuration of a digital broadcast receiving apparatus 300 according to the third embodiment. As illustrated in this figure, the digital broadcast receiving apparatus 300 includes an antenna 101, a tuner 102, a demultiplexer 103, an MPEG video decoder 104, a display 105, an MPEG audio decoder 106, a speaker 107, an operating unit 108, a key receiving unit 109, a flash memory 110, a RAM 320, a control unit 330, an auxiliary tuner 260 and a memory buffer 261, and is different from the second embodiment in the points of the RAM 320 and the control unit 330. Therefore, items in relation to these will be described below.

The RAM 320 includes a second channel-selection control information storage 121 and a program time information storage 322, and is different from that in the second embodiment in the point of the program time information storage 322. Therefore, items in relation to the program time information storage 322 will be described.

The program time information storage 322 stores the program time information specifying a time at which a program starts for each channel. The stored program time information table 322a is illustrated in FIG. 12, for example.

As illustrated in this figure, the program time information table 322a includes channel columns 322b. Information for specifying starting times of programs to be broadcast on each channel received by the digital broadcast receiving apparatus 300 is stored in the channel columns 322b.

In this connection, in the channel columns 322b, a time axis directing from top to bottom in FIG. 12 is provided, information specifying the starting time's of programs of each channel is stored on a position corresponding to the assigned time axis.

Figure 13:
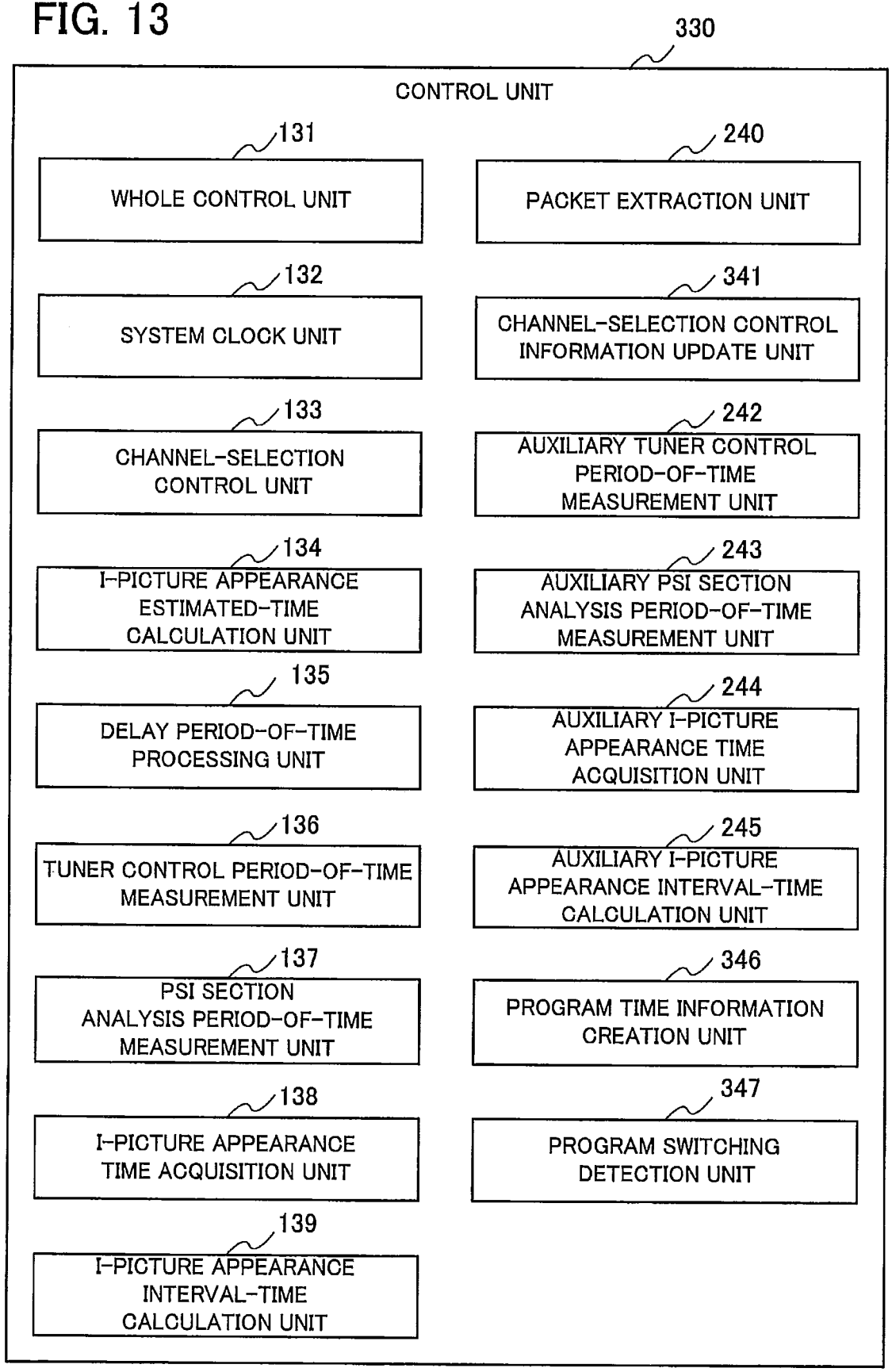
FIG. 13 is a schematic diagram of a control unit in the third embodiment.

FIG. 13 is a schematic diagram illustrating the control unit 330 according to the third embodiment. As illustrated in this figure, the control unit 330 includes a whole control unit 131, a system clock unit 132, a channel-selection control unit 133, an I-picture appearance estimated-time calculation unit 134, a delay period-of-time processing unit 135, a tuner control period-of-time measurement unit 136, a PSI-section analysis period-of-time measurement unit 137, an I-picture appearance time acquisition unit 138, an I-pictures appearance interval-time calculation unit 139, a packet extraction unit 240, a channel-selection control information update unit 341, an auxiliary tuner control period-of-time measurement unit 242, an auxiliary PSI-section analysis period-of-time measurement unit 243, an auxiliary I-picture appearance time acquisition unit 244, an auxiliary I-pictures appearance interval-time calculation unit 245, a program time information creation unit 346, and a program switching detection unit 347. Since the control unit 330 is different from that of the second embodiment in the points of the channel-selection control information update unit 341, the program time information creation unit 346 and the program switching detection unit 347, items in relation to these will be described below.

The channel-selection control information update unit 341 controls processing for storing the video packet and the audio packet extracted by the packet extraction unit 240, and the tuner control period-of-time, the PSI section analysis period-of-time, the I-picture appearance time and the I-pictures appearance interval-time calculated from the PSI section data in the second channel-selection control information table 121a. In the present embodiment, the packet extraction unit 240, the auxiliary tuner control period-of-time measurement unit 242, the auxiliary PSI-section analysis period-of-time measurement unit 243, the auxiliary I-picture appearance time acquisition unit 244 and the auxiliary I-pictures appearance interval-time calculation unit 245 are controlled so as to update the second channel-selection control information table 121a in relation to the channel, the switching of which is detected by the program switching detection unit 347.

The program time information creation unit 346 obtains information for specifying the starting times of programs to be broadcast in each channel, from the SI section data separated by the demultiplexer 103 or the SI section data extracted from the memory buffer 261 by the packet extraction unit 240, and stores the obtained information for specifying the starting times at positions corresponding to a time axis in the channel columns 322b of the program time information table 322a.

In this connection, the program time information creation unit 346 reads a time from the system clock unit 132, thereby obtaining a starting time of a future program with reference to the SI section data, and stores it in the program time information table 322a. Furthermore, the program time information creation unit 346 updates the program time information table 322a at a predetermined time (for example, periodically).

The program switching detection unit 347, at a predetermined time, reads a time from the system clock unit 132, checks whether or not a starting time of a program corresponding to the read time is present in the program time information table 322a, and if such starting time is detected, gives a notice to the channel-selection control information update unit 341.

In this connection, it is preferable that the program switching detection unit 347 detect the starting time at a predetermined cycle, for example, every one minute, every five minutes or the like.

Figure 14:
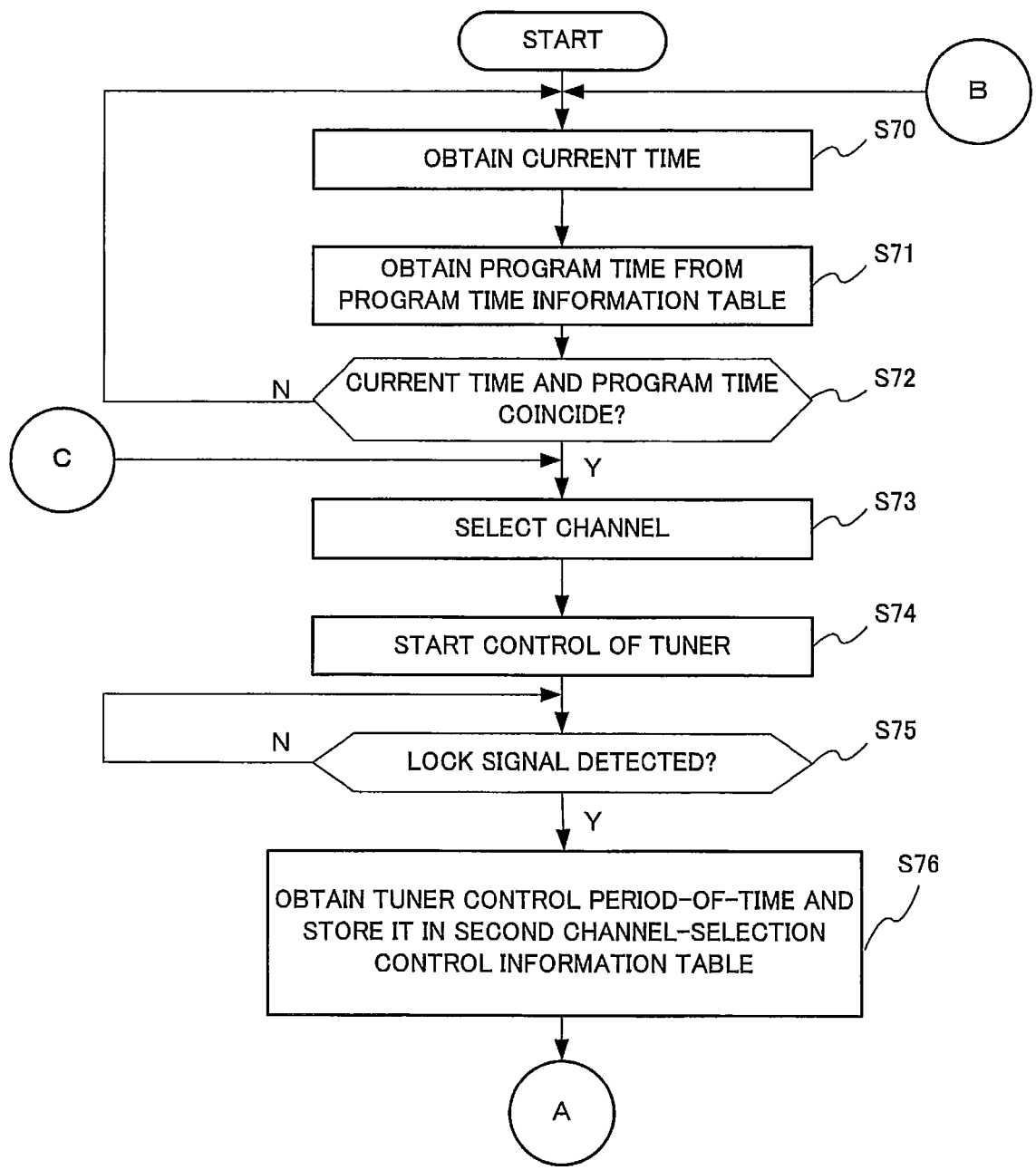
FIG. 14 is a flowchart (a first part thereof) showing processing of updating a second channel-selection control information table on the basis of a TS obtained through an auxiliary tuner in the third embodiment.
Figure 15:
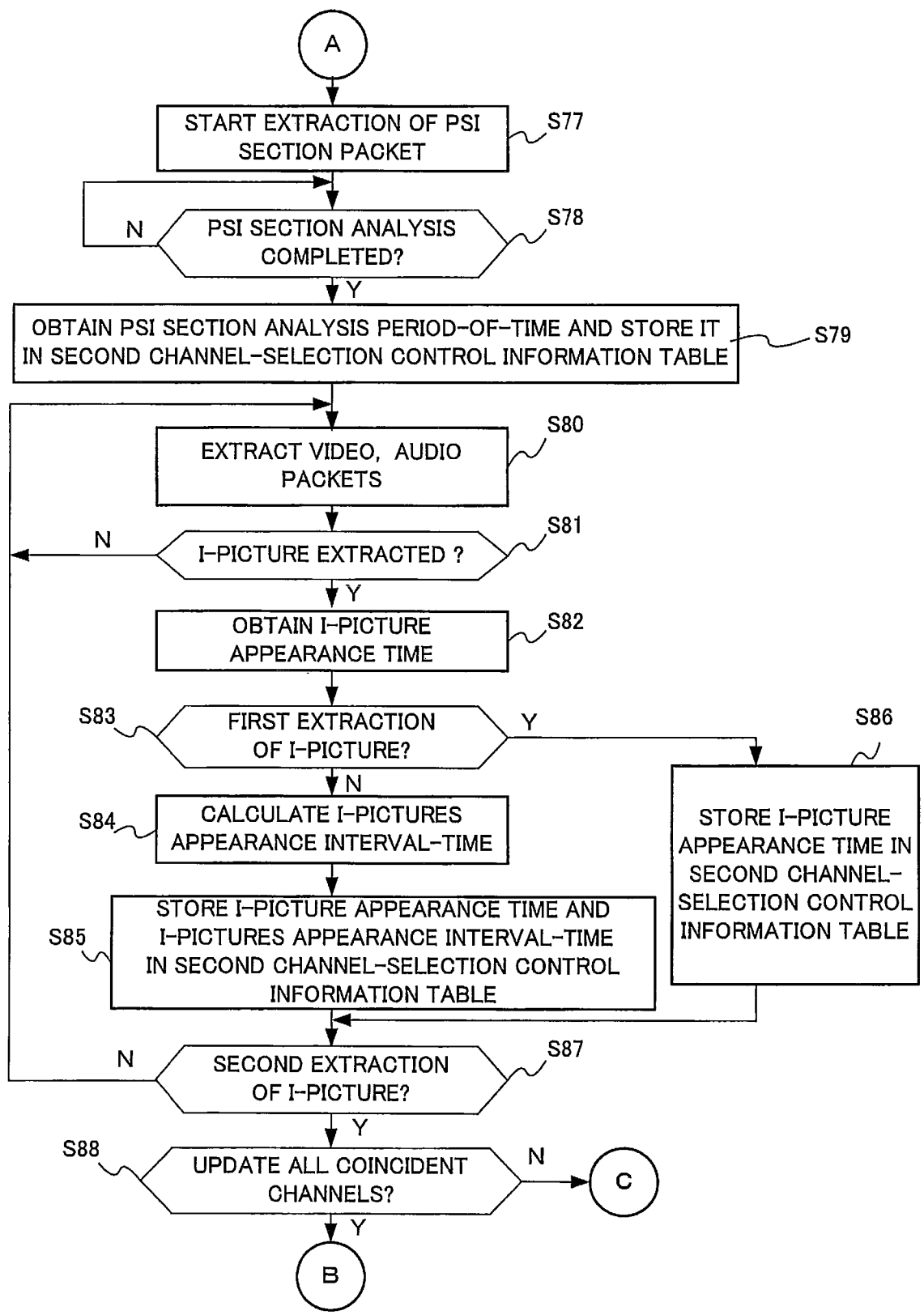
FIG. 15 is a flowchart (a second part thereof) showing processing of updating the second channel-selection control information table on the basis of the TS obtained through the auxiliary tuner in the third embodiment.

FIGS. 14 and 15 are flowcharts illustrating processing of updating the second channel-selection control information table 121a on the basis of the TS obtained through the auxiliary tuner 260 in the third embodiment. Further, in this case, the program time information table 322a is already created by the program time information creation unit 346 and stored in the program time information storage 322.

First, when the viewing/listening is started in the digital broadcast receiving apparatus 300, the program switching detection unit 347 reads a time from the system clock unit 132 (S70).

Next, the program switching detection unit 347 obtains the program time information table 322a stored in the program time information storage 322 (S71).

Then, the program switching detection unit 347 checks whether or not a starting time of a program that coincides with the time read in step S70 is present in the program time information table 322a obtained in step S71 (S72). If such starting time is absent (No in step 72), processing returns to step S70 and is repeated, whereas if such starting time is present (Yes in step S72), processing proceeds to step S73.

In step S73, the channel-selection control information update unit 341 selects one channel, the update of the second channel-selection control information table 121a of which has not yet been completed, from the channels on which the current time and the starting time of the program coincide with each other (S73).

The channel-selection control information update unit 341 starts the tuner control of the auxiliary tuner 260 in order to receive and demodulate the digital broadcast signal of the channel selected in step S73 (S74). In this connection, when the tuner control is started by the channel-selection control information update unit 341, the auxiliary tuner control period-of-time measurement unit 242 reads a time from the system clock unit 132 and obtains the read time as a tuner control starting time.

Next, the channel-selection control information update unit 341 waits until the detection of the lock signal which is generated when the auxiliary tuner 260 becomes able to receive the digital broadcast signal on the channel selected in step S50 (S75), and if such lock signal is detected (Yes in S75), processing proceeds to step S76.

In step S76, the auxiliary tuner control period-of-time measurement unit 242 reads a time from the system clock unit 132 and regards it as a tuner lock time, calculates a user control period-of-time which is a difference value obtained by subtracting the tuner control starting time obtained in step S74 from the tuner lock time, and stores the calculated tuner control period-of-time in the second channel-selection control information table 121a corresponding to the channel selected in step S73 (S76). Next, processing proceeds to step S77 in FIG. 15.

In step S77, when the digital broadcast signal of the channel selected in step S73 becomes receivable in the auxiliary tuner 260, the packet extraction unit 240 starts extracting the PSI section data from the TS output from the auxiliary tuner 260 and stored in the memory buffer 261. In this connection, when the PSI section data begins to be extracted, the auxiliary PSI-section analysis period-of-time measurement unit 243 reads a time from the system clock unit 132 and obtains the read time as a PSI section analysis starting time.

After analyzing the PAT, the whole control unit 131 extracts and analyzes the PMT. The PSI-section analysis period-of-time measurement unit 243 determines that the analysis of the PSI section is completed by obtaining a video PID and an audio PID necessary for extracting a video packet and an audio packet.

When the whole control unit 131 analyzes the PMT and obtains the video PID and the audio PID (Yes in S78), the auxiliary PSI-section analysis period-of-time measurement unit 243 reads a time from the system clock unit 132, obtains the read time as a PSI section analysis ending time, calculates a PSI section analysis period-of-time which is a difference value obtained by subtracting the PSI section analysis starting time obtained in step S77 from the PSI section analysis ending time, and stores the calculated PSI section analysis period-of-time in the second channel-selection control information table 121a corresponding to the channel selected in step S73 (S79).

Next, the packet extraction unit 240 extracts the video packet and the audio packet from the TS output from the auxiliary tuner 260 and stored in the memory buffer 261 (S80).

When the packet extraction unit 240 starts extracting the video packet, the auxiliary I-picture appearance time acquisition unit 244 judges whether or not the video packet extracted by the packet extraction unit 240 is a packet including an I-picture (S81). If the video packet is a packet including an I-picture (Yes in step S81), processing proceeds to step S82, whereas if the video packet is not a packet including an I-picture (No in step S81), processing return to step S80 and is repeated.

In step S82, the auxiliary I-picture appearance time acquisition unit 244 reads a time from the system clock unit 132, and obtains the read time as an I-picture appearance time. Further, details of processing executed by the auxiliary I-picture appearance time acquisition unit 244 are approximately the same as those in the flowchart of FIG. 6.

The auxiliary I-picture appearance time acquisition unit 244 judges whether or not the acquisition of the I-picture appearance time executed in step S82 is the first one counted from the start of control of the auxiliary tuner 260 in step S74 (S83). If the acquisition of the I-picture appearance time is not the first one (No in step S83), processing proceeds to step S84, whereas if the acquisition of the I-picture appearance time is the first one (Yes in step S83), processing proceeds to step S86.

In step S84, the auxiliary I-pictures appearance interval-time calculation unit 245 obtains the I-picture appearance time corresponding to the channel selected in step S73 from the second channel-selection control information table 121a, and calculates an I-pictures appearance interval-time which is a difference value obtained by subtracting the obtained I-picture appearance time from the I-picture appearance time obtained in step S59.

The auxiliary I-picture appearance time acquisition unit 244 stores the I-picture appearance time obtained in step S82 at a section corresponding to the channel selected in step S73 in the second channel-selection control information table 121a, and the auxiliary I-pictures appearance interval-time calculation unit 245 stores the I-pictures appearance interval-time calculated in step S84 at a section corresponding to the channel selected in step S73 in the second channel-selection control information table 121a (S85).

On the other hand, in step S86, the auxiliary I-picture appearance time acquisition unit 244 stores the I-picture appearance time obtained in step S82 at a section corresponding to the channel selected in step S73 in the second channel-selection control information table 121a.

Next, the channel-selection control information update unit 341 judges whether or not the acquisition of the I-picture appearance time performed in step S82 is the second one counted from the start of control of the auxiliary tuner 260 in step S74 (S87). If the acquisition of the I-picture appearance time is not the second one (is the first one) (No in step S87), processing returns to step S80 and is repeated, whereas if the acquisition of the I-picture appearance time is the second one (Yes in step S87), processing proceeds to step S88

In step S88, the channel-selection control information update unit 341 judges whether or not the second channel-selection control information tables 121a of all channels, in which it is determined that the current time and the starting time of the program coincide with each other in step S72, have been updated. If the update of the second channel-selection control information tables 121a of all channels have been finished (Yes in step S88), processing returns to step S70 in FIG. 14 and is repeated, whereas if the update of the second channel-selection control information tables 121a of all channels have not been finished (No in step S88), processing returns to step S73 and is repeated.

As described above, according to the present embodiment, even if the appearance timing of I-pictures changes due to the program switching, the channel-selection control information can be obtained at timing of the channel switching. Therefore, it is possible to shorten the image non-displaying period.

Fourth Embodiment

Next, a digital broadcast receiving apparatus according to a fourth embodiment of the present invention will be described. The digital broadcast receiving apparatuses according to the first to third embodiments handle the digital broadcasting as a subject, in which a stream format is a TS and a video encoding method is MPEG-2-VIDEO. Therefore, the above embodiments can be adapted to the digital broadcasting standard such as ISDB-T (Integrated Services Digital Broadcasting-Terrestrial) and the like, in which a stream format is a TS and the video encoding method is MPEG-2-VIDEO. However, the above embodiments cannot be adapted to the digital broadcasting standard such as CMMB (China Multimedia Mobile Broadcasting) or ATSC-M/H (Advanced Television SystemsCommittee-Mobile/Handheld) or T-DMB (Terrestrial-Digital Media Broadcasting) or DVB-H (Digital Video Broadcasting-Handheld) or DVB-T2 (Digital Video Broadcasting-Terrestrial 2), in which a different stream format and a different video encoding method are used.

Figure 16:
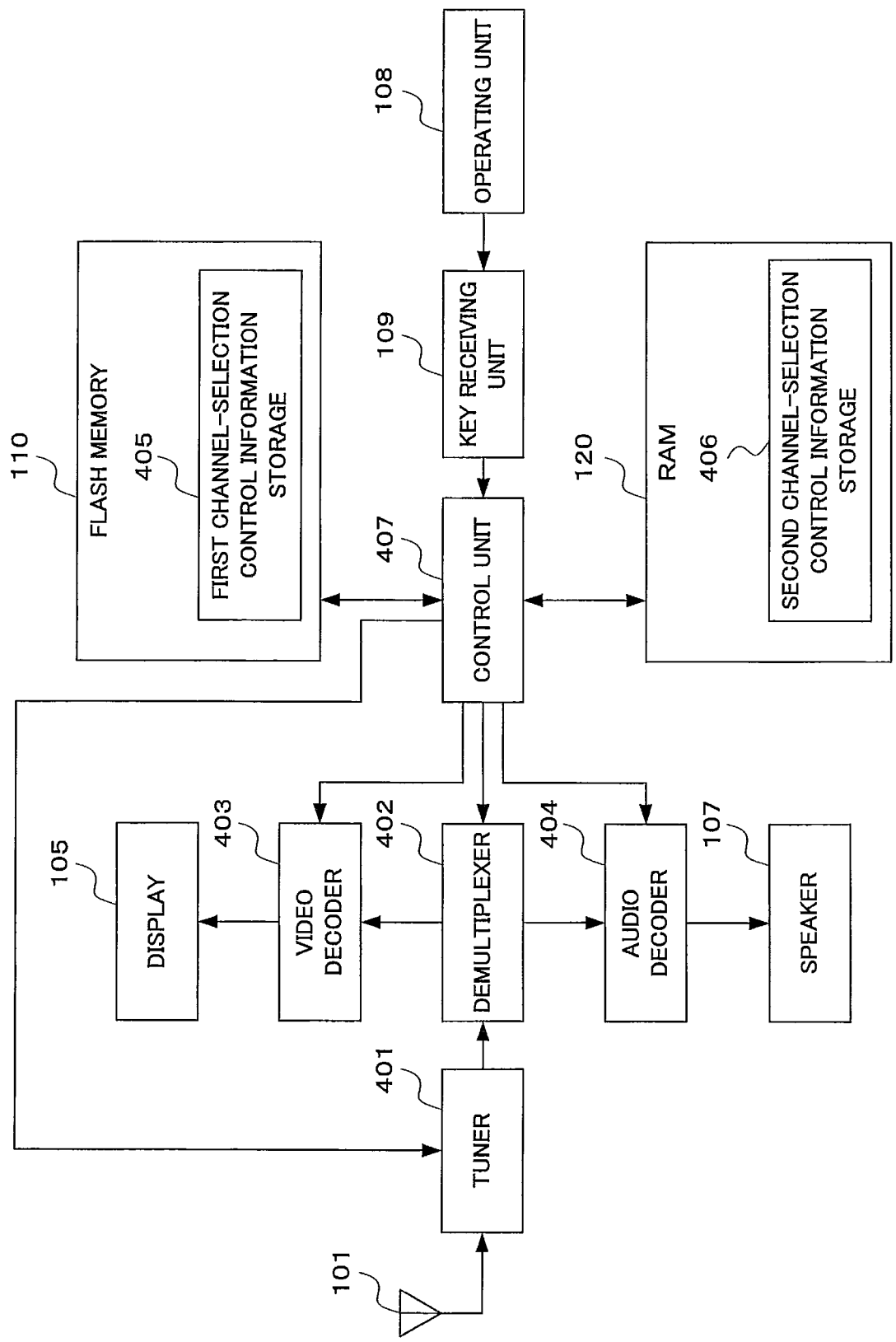
FIG. 16 is a schematic block diagram illustrating a configuration of a digital broadcast receiving apparatus according to a fourth embodiment.

In the digital broadcast receiving apparatus according to the present embodiment, the format of the stream as a subject is MFS (Multiplex Frame Structure) used in the digital broadcasting of the CMMB standard and the encoding method of video as a subject is H.264, and an image non-displaying period is reduced in the digital broadcasting of CMMB standard. FIG. 16 is a schematic block diagram illustrating a configuration of the digital broadcast receiving apparatus according to the present embodiment. As illustrated in this figure, the digital broadcast receiving apparatus includes an antenna 101, a tuner 401, a demultiplexer 402, a video decoder 403, a display 105, an audio decoder 404, a speaker 107, an operating unit 108, a key receiving unit 109, a flash memory 110, a RAM 120 and a control unit 407. Among these, the antenna 101, the display 105 and the speaker 107 are equivalent to those in the digital broadcast receiving apparatuses according to the first to third embodiments, and therefore a description about them is omitted.

The tuner 401 demodulates a digital broadcast signal of CMMB standard received from the antenna 101 to generate an MFS format stream and supplies the generated stream to the demultiplexer 402.

The demultiplexer 402 separates a video stream, an audio stream and program-specific-information from the CMMB standard stream received from the tuner 401. The separated video stream is converted into data of one picture of video picture and then is output to the video decoder 403. The separated audio stream is converted into one frame of audio frame and then is output to the audio decoder 404. Furthermore, the separated program-specific-information is output to the control unit 407.

In this connection, the program-specific-information is information containing the video extraction information and the audio extraction information, and its concrete example is a CMCT (Continual Service Multiplex Configuration Table) of a stream of MFS format.

Further, the video extraction information is information necessary for extracting a video picture from a stream, and is concretely information of a combination of MF_ID (Multiplex Frame Identifier) and MSF_ID (Multiplex Sub Frame Identifier) of MSF (Multiplex Sub Frame) including data of a video picture of an MFS format stream.

Furthermore, the audio extraction information is information necessary for extracting an audio frame from a stream, and is concretely information of a combination of MF_ID and MSF_ID of MSF including data of an audio frame of an MFS format stream. Hereafter, a combination of the video extraction information and the audio extraction information is referred to as viewing/listening start information.

The video decoder 403 decodes an H.264 format video picture received from the demultiplexer 402, thereby generating video data, and supplies the generated video data to the display 105.

The audio decoder 404 decodes an audio frame of MPEG-4-AAC (Moving Picture Experts Group 4-Advanced Audio Coding) format received from the demultiplexer 402, thereby generating audio data, and supplies the generated audio data to the speaker 107.

Figures 17, 18:
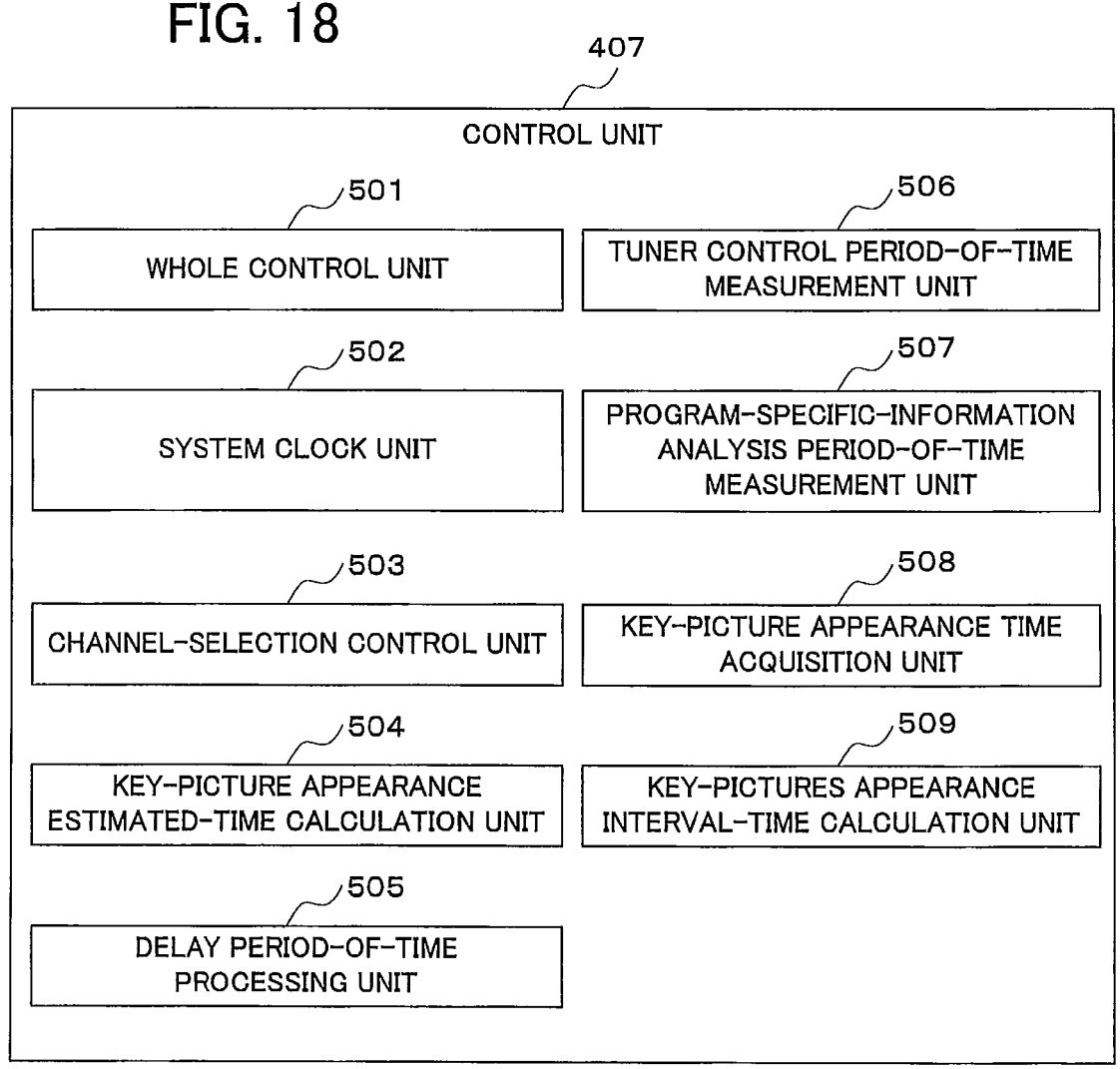
FIG. 17 is a diagram of a data format of channel-selection control information stored in a first channel-selection control information storage in the digital broadcast receiving apparatus according to the fourth embodiment.
FIG. 18 is a schematic diagram of a control unit in the digital broadcast receiving apparatus according to the fourth embodiment.

The flash memory 110 which stores application programs for realizing processing executed by the digital broadcast receiving apparatus has a first channel-selection control information storage 405 in the present embodiment. Data format of the channel-selection control information stored in the first channel-selection control information storage 405 is illustrated in FIG. 17. The first channel-selection control information storage 405 for each channel stores a tuner control period-of-time, a program-specific-information analysis period-of-time, a key-picture appearance time and a key-pictures appearance interval-time. Here, the program-specific-information analysis period-of-time is a period of time from when the control unit 407 receives the program-specific-information from the demultiplexer 402 to when the program-specific-information is analyzed and the viewing/listening start information is obtained, and is concretely is a period of time from when the control unit 407 receives the CMCT from the demultiplexer 402 to when the control unit 407 analyzes the CMCT and obtains the viewing/listening start information.

Furthermore, the key-picture is a picture which is encoded without using a prediction between pictures and is also encoded so that a later picture which is reproduced at later than the key-picture does not refer to an earlier picture which is reproduced at earlier than the key-picture, and is concretely an IDR picture (Instantaneous Decoder Refresh picture) of H.264.

The key-picture appearance time is a time when the video decoder 403 obtained the key-picture lastly. Furthermore, the key-pictures appearance interval-time is an interval between key-picture appearance times when the video decoder 403 obtains the key-pictures successively.

Further, in the digital broadcast receiving apparatus according to the present embodiment, although initial values 0are stored as values of the tuner control period-of-time, the program-specific-information analysis period-of-time, the key-picture appearance time and the key-pictures appearance interval-time at factory shipment, these values are not limited to such example.

The RAM 120, which stores data necessary for processing executed in the digital broadcast receiving apparatus, has a second channel-selection control information storage 406 in the present embodiment. The second channel-selection control information storage 406 stores similar contents to those in the first channel-selection control information storage 405.

FIG. 18 is a schematic diagram illustrating the control unit 407 in the digital broadcast receiving apparatus according to the present embodiment. As illustrated in this figure, the control unit 407 includes a whole control unit 501, a system clock unit 502, a channel-selection control unit 503, a key-picture appearance estimated-time calculation unit 504, a delay period-of-time processing unit 505, a tuner control period-of-time measurement unit 506, a program-specific-information analysis period-of-time calculation unit 507, a key-picture appearance time acquisition unit 508 and a key-pictures appearance interval-time calculation unit 509.

The whole control unit 501 controls the whole processing in the digital broadcast receiving apparatus. The system clock unit 502 performs a clocking operation to calculate a time. The system clock unit 502 is a unit for calculating a time.

When the channel selection is operated through the operating unit 108, the channel-selection control unit 503 executes channel switchover processing such as tuning the tuner 401 to a frequency band of the selected channel. Details of the channel switchover processing will be described with reference to a below-described flowchart of FIG. 20. Further, the channel switchover processing in the digital broadcast receiving apparatus according to the present embodiment corresponds to the channel-selection operation processing illustrated in FIG. 5 in the digital broadcast receiving apparatus according to the first embodiment.

The key-picture appearance estimated-time calculation unit 504 calculates a key-picture appearance estimated-time at the future nearest to the current time by adding a value obtained from a key-pictures appearance interval-time multiplied by a certain value to the key-picture appearance time.

The delay period-of-time processing unit 505 subtracts the tuner control period-of-time, the program-specific-information analysis period-of-time and the current time from the key-picture appearance estimated-time calculated by the key-picture appearance estimated-time calculation unit 504, thereby calculating a delay period-of-time, by which a starting time of the channel switchover processing is delayed.

The tuner control period-of-time measurement unit 506 measures a tuner control period-of-time from when the tuner 401 receives a channel switching instruction to when a broadcasting signal of the switched channel becomes receivable.

The program-specific-information analysis period-of-time calculation unit 507 measures a period of time from when the demultiplexer 402 starts extracting the program-specific-information to when the channel-selection control unit 503 receives the program-specific-information and analyzes the viewing/listening start information from the program-specific-information.

If the video picture output by the demultiplexer 402 is a key-picture, the key-picture appearance time acquisition unit 508 uses a time read from the system clock unit 502 as a key-picture appearance time.

The key-pictures appearance interval-time calculation unit 509 calculates a key-pictures appearance interval-time based on a difference between a key-picture appearance time obtained by the key-picture appearance time acquisition unit 508 and a key-picture appearance time of corresponding channel stored in the second channel-selection control information storage 406.

Figure 19:
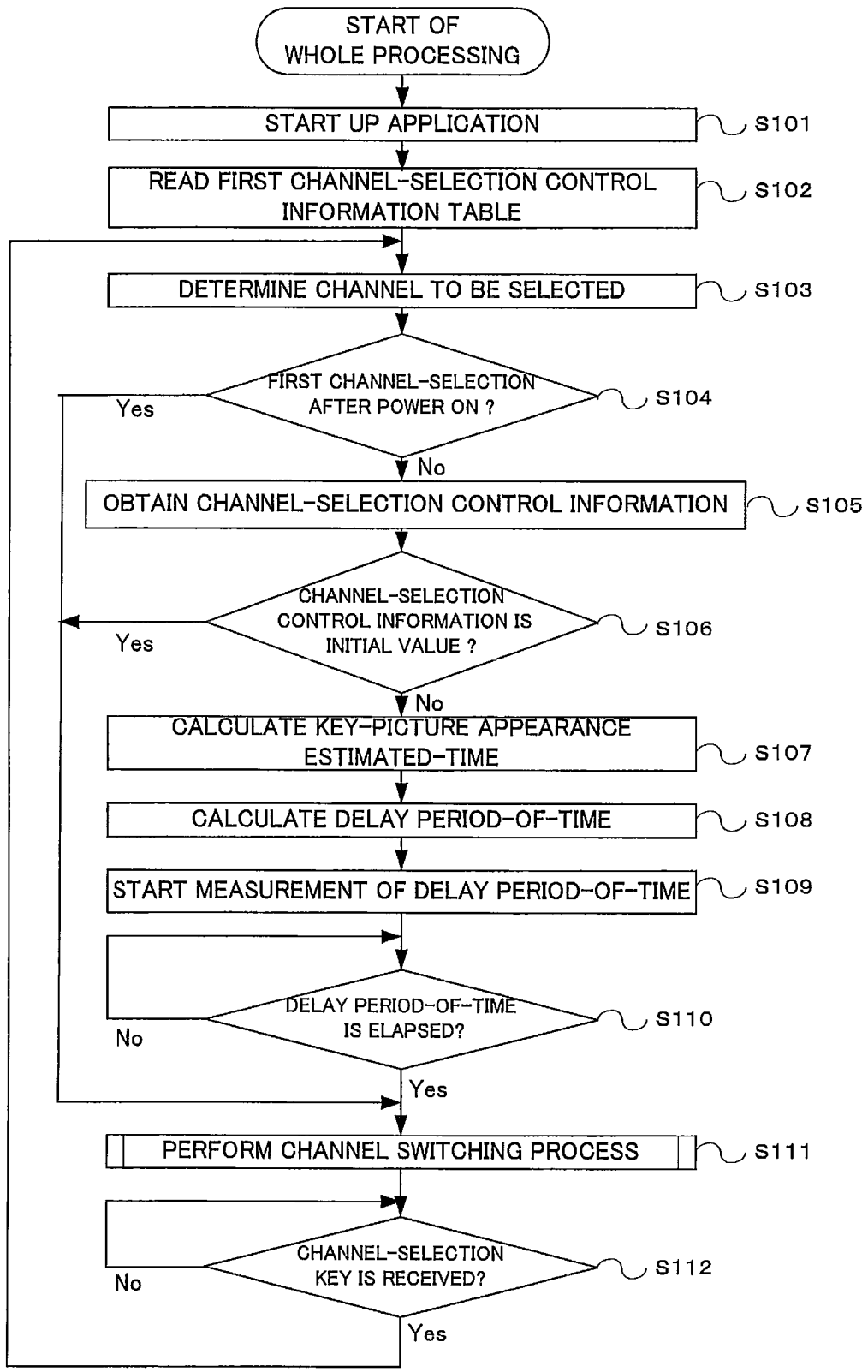
FIG. 19 is a flowchart showing the whole processing in the digital broadcast receiving apparatus according to the fourth embodiment.

FIG. 19 is a flowchart showing the whole processing in the digital broadcast receiving apparatus according to the present embodiment. The flowchart of FIG. 19 shows a procedure, in which the channel switchover processing is executed without delay processing, when the channel-selection is the first one after the digital broadcast receiving apparatus is powered ON or when a value of the channel-selection control information of the selected channel is an initial value and the key-picture appearance estimated-time cannot be calculated, and another procedure, in which the channel switchover processing is executed after the delay processing, when the channel-selection is the second one after the digital broadcast receiving apparatus is powered ON and a value of the channel-selection control information of the selected channel is not an initial value and the key-picture appearance estimated-time can be calculated. Operation in the flowchart of FIG. 19 will be described in detail.

At a point in time when power of the digital broadcast receiving apparatus is turned on, the whole processing starts and then processing proceeds to step S101.

In step S101, the whole control unit 501 in the control unit 407 starts up an application stored in the flash memory 110 and then processing proceeds to step S102.

In step S102, the whole control unit 501 in the control unit 407 reads channel-selection control information stored in the first channel-selection control information storage 405 of the flash memory 110, stores the read channel-selection control information in the second channel-selection control information storage 406 of the RAM 120, and then processing proceeds to step S103.

In step S103, the whole control unit 501 in the control unit 407 determines a channel to be selected and then processing proceeds to step S104. The channel to be selected is determined as follows, for example. First, at the first channel-selection after the power ON, the channel that was viewed/listened to lastly before the power OFF is tuned. Furthermore, at the channel-selection after the first channel-selection, the channel that is instructed by the user is tuned.

In step S104, the whole control unit 501 in the control unit 407 judges whether or not the channel-selection is the first one after the power ON. If it is the first channel-selection after the power ON, processing proceeds to step S111, whereas if it is the second or higher channel-selection after the power ON, processing proceeds to step S105.

In step S105, the key-picture appearance estimated-time calculation unit 504 in the control unit 407 obtains the channel-selection control information of the channel to be selected from the second channel-selection control information storage 406 and then processing proceeds to step S106.

In step S106, the key-picture appearance estimated-time calculation unit 504 in the control unit 407 checks whether or not the tuner control period-of-time, the program-specific-information analysis period-of-time, the key-picture appearance time, and the key-pictures appearance interval-time of the channel-selection control information obtained in step S105 have initial values. In the present embodiment, although a value of 0 is used as the initial values of the tuner control period-of-time, the program-specific-information analysis period-of-time, the key-picture appearance time and the key-pictures appearance interval-time, these initial values are not limited to these examples. If all of the channel-selection control information has values other than the initial values, processing proceeds to step S107, whereas if at least one of the channel-selection control information has the initial value, processing proceeds to step S111.

In step S107, the key-picture appearance estimated-time calculation unit 504 in the control unit 407 calculates the key-picture appearance estimated-time and then processing proceeds to step S108. The key-picture appearance estimated-time is calculated, for example, as follows:
First, a time T is obtained from the system clock unit 502 as a current time, an integer N satisfying the following equation (5) is calculated using the key-picture appearance time F and the key-pictures appearance interval-time G obtained in step S105.

$$0 < F + G \times N - T \le G \quad (5)$$

Then, the key-picture appearance estimated-time calculation unit 504 calculates a key-picture appearance estimated-time R from equation (6) using the integer N calculated by equation (5).

$$R = F + G \times N \quad (6)$$

In step S108, the delay period-of-time processing unit 505 in the control unit 407 calculates a delay period-of-time, by which the channel-selection control unit 503 in the control unit 407 delays the start of the channel switchover processing, and then processing proceeds to step S109. The delay period-of-time is calculated, for example, as follows:
The delay period-of-time L is calculated by the following equation (7) using the key-picture appearance estimated-time R calculated in step S106, the tuner control period-of-time A obtained in step S103, the program-specific-information analysis period-of-time E, a program-specific-information transmission period H, and the current time T.

$$L = R - A - E - H - T \quad (7)$$

Further, the program-specific-information transmission period H is determined in advance by the digital broadcast signal standard, and in the present embodiment, it is 1 (sec) as a transmission period of CMCT of a stream in CMMB standard.

When the calculated delay period-of-time L is less than a value of 0, even if the channel-selection processing starts, the channel-selection processing is not completed until the I-picture appearance estimated-time R and the image non-displaying period is increased by the next I-picture appearance waiting time. Therefore, in the delay period-of-time processing unit 505 in the control unit 407, the delay period-of-time L is set to a value obtained by adding the key-pictures appearance interval-time D multiplied by a certain value to the calculated delay period-of-time L so that the delay period-of-time L calculated by equation (7), becomes the minimum value of positive values.

In step S109, the delay period-of-time processing unit 505 in the control unit 407 starts time measurement of the delay period-of-time L calculated in step S108 and waits until a lapse of the delay period-of-time L, and then processing proceeds to step S110.

In step S110, the delay period-of-time processing unit 505 in the control unit 407 judges whether or not the delay period-of-time L calculated in step S108 has elapsed. If the delay period-of-time L has elapsed, processing proceed to step S111, whereas if the delay period-of-time L has not elapsed, processing proceeds to step S110.

In step S111, the channel-selection control unit 503 in the control unit 407 executes the channel switchover processing and then processing proceeds to step S112. The detail of the channel switchover processing will be described using a flowchart of FIG. 20 to be described below.

In step S112, the whole control unit 501 in the control unit 407 judges whether or not the channel-selection key was received from a user. If the channel-selection key is received, processing proceeds to step S103, whereas if the channel-selection key is not received, processing proceeds to step S112.

Figure 20:
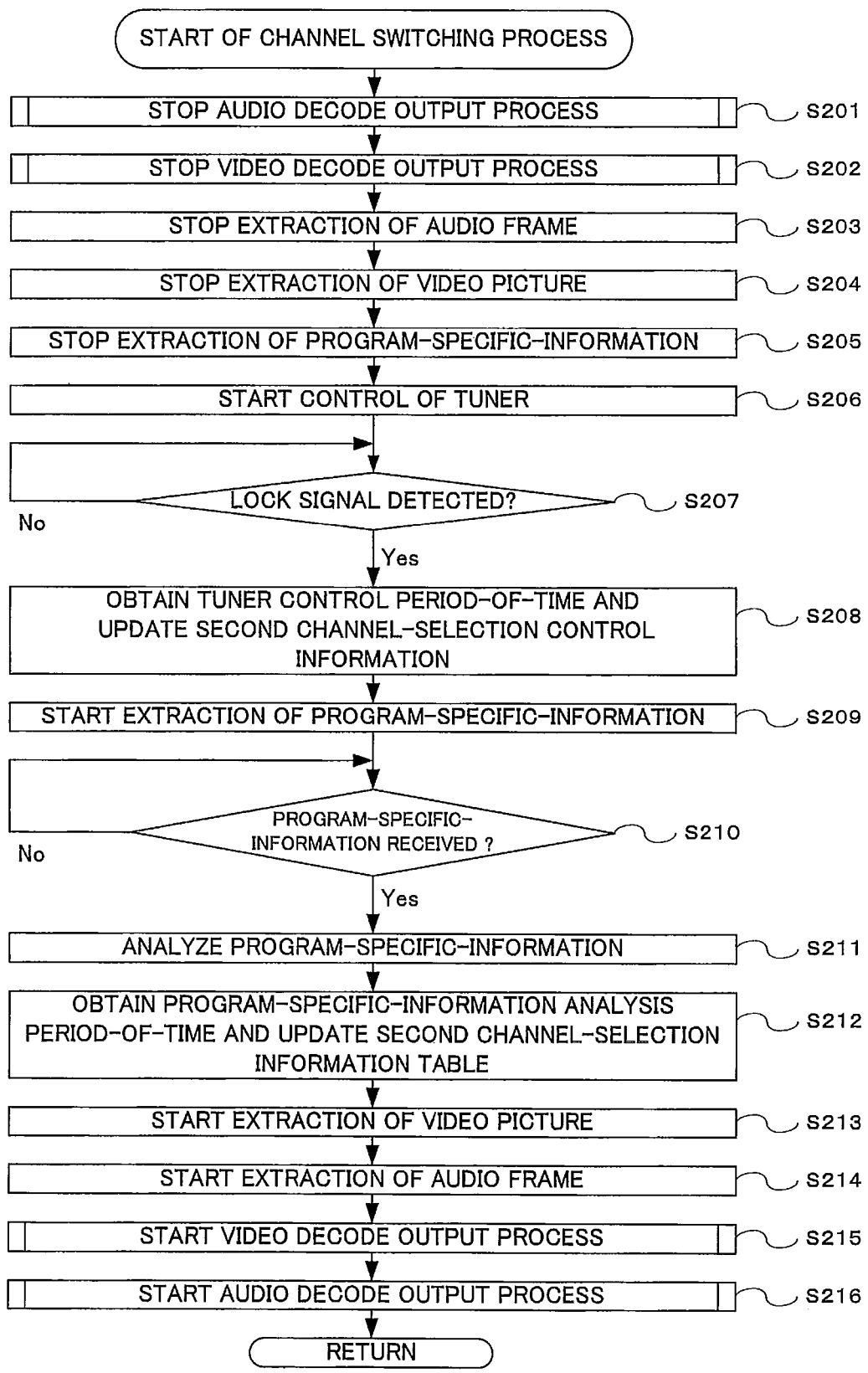
FIG. 20 is a flowchart showing channel switchover processing in the digital broadcast receiving apparatus according to the fourth embodiment.

FIG. 20 is a flowchart showing the channel switchover processing in the digital broadcast receiving apparatus according to the present embodiment. In the channel switchover processing, operation for starting reproducing a video and an audio of the selected channel is performed, and the tuner control period-of-time and the program-specific-information analysis period-of-time of the channel-selection control information of the channel to be selected are updated. When the channel switchover processing in step S111 of the flowchart of FIG. 19 is executed, operation of the flowchart of FIG. 20 starts and then processing proceeds to step S201.

In step S201, the channel-selection control unit 503 in the control unit 407 stops the audio decode output processing, and then processing proceeds to step S202. Details of the audio decode output processing will be described with reference to the below described flowchart of FIG. 22.

In step S202, the channel-selection control unit 503 in the control unit 407 stops the video decode output processing, and then processing proceeds to step S203. Details of the video decode output processing will be described with reference to the below described flowchart of FIG. 22.

In step S203, the channel-selection control unit 503 in the control unit 407 instructs the demultiplexer 402 to stop extracting an audio frame, and then processing proceeds to step S204.

In step S204, the channel-selection control unit 503 in the control unit 407 instructs the demultiplexer 402 to stop extracting the video picture, and then processing proceeds to step S205.

In step S205, the channel-selection control unit 503 in the control unit 407 instructs the demultiplexer 402 to stop extracting the program-specific-information, and then processing proceeds to step S206.

In step S206, the channel-selection control unit 503 in the control unit 407 controls the tuner 401 to tune to a frequency band of a channel to be selected. Further, the tuner control period-of-time measurement unit 506 in the control unit 407 reads a time from the system clock unit 502 in the control unit 407, obtains the read time as a tuner control starting time, and then processing proceeds to step S207.

In step S207, the channel-selection control unit 503 in the control unit 407 judges whether or not the tuner 401 detects a lock signal of the digital signal at the frequency band selected in step S206. If the lock signal is detected, processing proceeds to step S208, whereas if the lock signal is not detected, processing proceeds to step S207.

In step S208, the tuner control period-of-time measurement unit 506 in the control unit 407 reads a time from the system clock unit 502 in the control unit 407 and regards it as a tuner lock time, and calculates a tuner control period-of-time which is a difference value obtained by subtracting the tuner control starting time obtained in step S206 from the tuner lock time. The tuner control period-of-time measurement unit 506 in the control unit 407 updates the tuner control period-of-time of the selected channel stored in the second channel-selection control information storage 406 of the RAM 120 using the calculated tuner control period-of-time, and then processing proceeds to step S209. When a value of the calculated tuner control period-of-time is larger than a value of the tuner control period-of-time of the selected channel stored in the second channel-selection control information storage 406, the update of the tuner control period-of-time is performed, for example, by overwriting the calculated tuner control period-of-time on a section of the tuner control period-of-time of the selected channel stored in the second channel-selection control information storage 406. Further, after updating the second channel-selection control information storage 406 of the RAM 120, the tuner control period-of-time measurement unit 506 in the control unit 407 may store a value of the second channel-selection control information storage 406 in the first channel-selection control information storage 405 of the flash memory 110.

In step S209, the channel-selection control unit 503 in the control unit 407 instructs the demultiplexer 402 to start extracting the program-specific-information of a channel to be selected, and then processing proceeds to step S210.

In step S210, the channel-selection control unit 503 in the control unit 407 judges whether or not it receives the program-specific-information from the demultiplexer 402. If the program-specific-information is received, processing proceeds to step S211, whereas if the program-specific-information is not received, processing proceeds to step S210.

In step S211, the program-specific-information analysis period-of-time calculation unit 507 in the control unit 407 reads a time from the system clock unit 502 in the control unit 407 and obtains the read time as a program-specific-information analysis starting time. Thereafter, the channel-selection control unit 503 in the control unit 407 analyzes the received program information, obtains the viewing/listening start information, and then processing proceeds to step S212.

In step S212, the program-specific-information analysis period-of-time calculation unit 507 in the control unit 407 reads a time from the system clock unit 502 in the control unit 407 and regards it as a program-specific-information analysis completion time, and calculates the program-specific-information analysis period-of-time which has a value obtained by subtracting the program-specific-information analysis starting time obtained in step S211 from the program-specific-information analysis completion time. Thereafter, the program-specific-information analysis period-of-time calculation unit 507 in the control unit 407 updates the program-specific-information analysis period-of-time of the selected channel stored in the second channel-selection control information storage 406 of the RAM 120 using the calculated program-specific-information analysis period-of-time, and then processing proceeds to step S213. When a value of the calculated program-specific-information analysis period-of-time is larger than a value of the program-specific-information analysis period-of-time of the selected channel stored in the second channel-selection control information storage 406, the update of the program-specific-information analysis period-of-time is performed, for example, by overwriting the calculated program-specific-information analysis period-of-time on a section of the program-specific-information analysis period-of-time of the selected channel stored in the second channel-selection control information storage 406. Further, after updating the second channel-selection control information storage 406 of the RAM 120, the program-specific-information analysis period-of-time calculation unit 507 in the control unit 407 may store a value of the second channel-selection control information storage 406 in the first channel-selection control information storage 405 of the flash memory 110.

In step S213, the channel-selection control unit 503 in the control unit 407 instructs the demultiplexer 402 to extract a video picture, and then processing proceeds to step S214.

In step S214, the channel-selection control unit 503 in the control unit 407 instructs the demultiplexer 402 to start extracting an audio frame, and then processing proceeds to step S215.

In step S215, the channel-selection control unit 503 in the control unit 407 starts the video decode output processing and then processing proceeds to step S216. Details of the video decode output processing will be explained with reference to the below-described flowchart of FIG. 21.

In step S216, the channel-selection control unit 503 in the control unit 407 starts the audio decode output processing, and then processing ends. Details of the audio decode output processing will be explained with reference to the below-described flowchart of FIG. 22.

Figure 21:
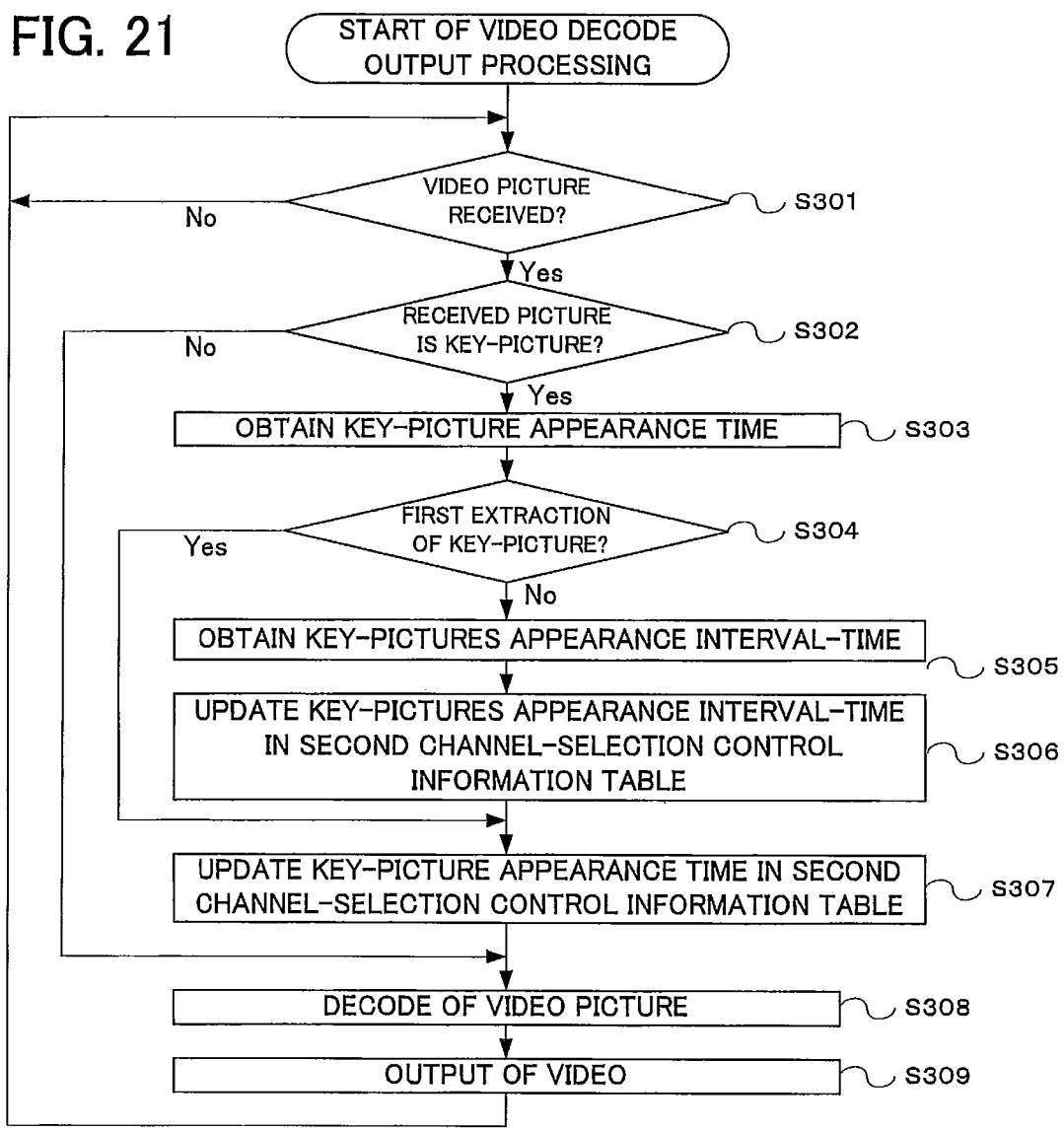
FIG. 21 is a flowchart of video decode output processing in the digital broadcast receiving apparatus according to the fourth embodiment.

FIG. 21 is a flowchart showing video decode output processing in the digital broadcast receiving apparatus according to the present embodiment. In the video decode output processing, the video picture received from the demultiplexer 402 shown in FIG. 16 is decoded by the video decoder 403, the decoded video picture is output to the display 105, and these are repeated. Furthermore, when the video decoder 403 receives the key-picture, the key-picture appearance time acquisition unit 508 of the control unit 407 obtains the key-picture appearance time and thereafter updates the second channel-selection control information storage 406, and the key-pictures appearance interval-time calculation unit 509 of the control unit 407 calculates the key-pictures appearance interval-time and thereafter updates the second channel-selection control information storage 406. Operation of the flowchart of FIG. 21 starts when the video decode output processing in step S215 of the flowchart of FIG. 20 starts, and then processing proceeds to step S301. Furthermore, operation of the flowchart of FIG. 21 ends when the video decode output processing in step S202 of the flowchart of FIG. 20 is stopped.

In step S301, the channel-selection control unit 503 in the control unit 407 judges whether or not the video decoder 403 has received the video picture from the demultiplexer 402. If the video picture is received, processing proceeds to step S302, whereas if the video picture is not received, processing proceeds to step S301.

In step S302, the channel-selection control unit 503 in the control unit 407 judges whether or not the video picture received by the video decoder 403 is a key-picture. If it is a key-picture, processing proceeds to step S303, whereas if it is not a key-picture, processing proceeds to step S308.

In step S303, the key-picture appearance time acquisition unit 508 in the control unit 407 reads a time from the system clock unit 502, obtains the read time as a key-picture appearance time, and then processing proceeds to step S304.

In step S304, the key-picture appearance time acquisition unit 508 in the control unit 407 judges whether or not the acquisition of the key-picture appearance time executed in step S303 is the first one counted from the start of operation of the flowchart of FIG. 21. If it is the first one, processing proceeds to step S307, whereas if it is not the first one, processing proceeds to step S305.

In step S305, the key-pictures appearance interval-time calculation unit 509 of the control unit 407 obtains the key-picture appearance time of a channel to be selected from the second channel-selection control information unit 406 and calculates the key-pictures appearance interval-time according to the difference value obtained by subtracting the obtained key-picture appearance time from key-picture appearance time obtained in step S304, and then processing proceeds to step S306.

In step S306, the key-pictures appearance interval-time calculation unit 509 in the control unit 407 replaces the key-pictures appearance interval-time of the selected channel stored in the second channel-selection control information storage unit 406 by the key-pictures appearance interval-time calculated in step S305, and then processing proceeds to step S307. Further, after replacing the second channel-selection control information storage 406 in the RAM 120, a value of the second channel-selection control information storage 406 may be stored in the first channel-selection control information storage 405 in the flash memory 110.

In step S307, the control unit 407 replaces the key-picture appearance time of the selected channel stored in the second channel-selection key-picture appearance time acquisition unit 508 of the control information storage 406 by the key-picture appearance time obtained in step S304, and then processing proceeds to step S308. Further, after replacing the second channel-selection control information storage 406 in the RAM 120, a value of the second channel-selection control information storage 406 may be stored in the first channel-selection control information storage 405 of the flash memory 110

In step S308, the channel-selection control unit 503 in the control unit 407 instructs the video decoder 403 to decode the received video picture, and then processing proceeds to step S309.

In step S309, the channel-selection control unit 503 in the control unit 407 instructs to output the video picture decoded in step 308 to the display 105, and then processing proceeds to step S301.

Figure 22:
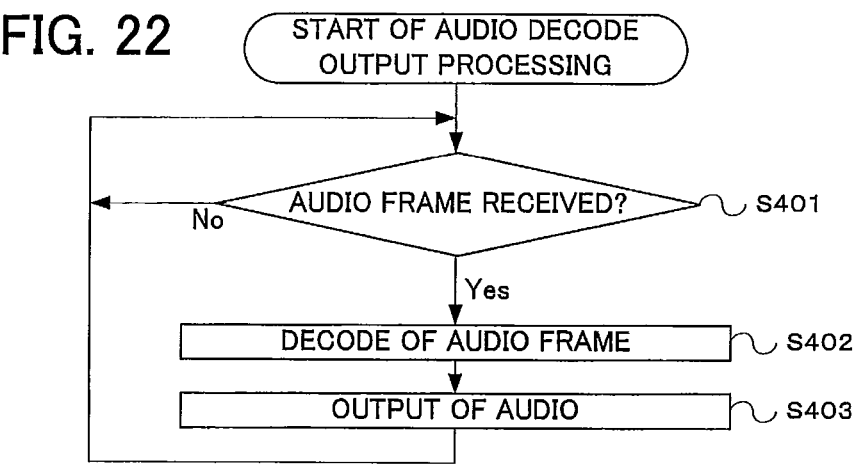
FIG. 22 is a flowchart of audio decode output processing in the digital broadcast receiving apparatus according to the fourth embodiment.

FIG. 22 is a flowchart showing the audio decode output processing in the digital broadcast receiving apparatus according to the present embodiment. In the audio decode output processing, an audio frame is received from the demultiplexer 402 is decoded by the audio decoder 404, the decoded audio frame is output to the speaker 107, and these are repeated. Operation of the flowchart in FIG. 22 starts at a time when the audio decode output processing in step S216 in the flowchart in FIG. 20 starts, and then processing proceeds to step S401. Furthermore, operation of the flowchart in FIG. 21 ends at a time when the audio decode output processing of step S201 in FIG. 20 stops.

In step S401, the channel-selection control unit 503 in the control unit 407 judges whether or not the audio decoder 404 has received the audio frame from the demultiplexer 402. If the audio frame is received, processing proceeds to step S402, whereas if the audio frame is received, processing proceeds to step S401.

In step S402, the channel-selection control unit 503 in the control unit 407 instructs the audio decoder unit 404 to decode the received audio frame, and then processing proceeds to step S403.

In step S403, the channel-selection control unit 503 in the control unit 407 instructs to output the audio frame decoded in step S403 to the speaker 107, and then processing proceeds to step S401.

In the digital broadcast receiving apparatus according to the present embodiment having above configurations, as shown in the operation in the flowchart of FIG. 19, if the channel-selection is the second or higher one counted from the power ON as well as a value of the channel-selection control information of a channel to be selected is not an initial value and a key-picture appearance estimated-time can be calculated, the apparatus predicts a key-picture appearance time and executes the channel switchover processing after the delay processing is executed. Since the decode output processing of a video and an audio is not stopped while the delay processing before the channel switchover processing is being executed, a video and an audio of the channel before the channel switchover can be output. On the other hands, if the delay processing is not executed before the channel switchover processing, when the channel-selection key is received from the user, the channel switchover processing is executed and the video and audio decode output processing is stopped. Accordingly, the digital broadcast receiving apparatus according to the present embodiment can make a displaying period of an image and an audio of a channel before the channel switchover longer at the maximum by the key-pictures appearance interval-time, in comparison with a case where a delay before the channel switchover processing is not adopted. Furthermore, since the digital broadcast receiving apparatus according to the present embodiment executes the delay processing in synchronization with an appearance time of a key-picture of a channel after channel switchover, it can receive the key-picture of the channel after channel switchover at the same timing as the case where the delay before the channel switchover is not adopted. Accordingly, in the digital broadcast receiving apparatus according to the present embodiment, at the same timing as a case without the delay processing, an image of the channel after the channel switching can be displayed.

From the above description, the digital broadcast receiving apparatus according to the present embodiment can shorten the image non-displaying period at the channel selection at maximum by the key-pictures appearance interval-time in comparison with a case where the delay before the channel switchover is not adopted. Further, in the digital broadcasting of CMMB standard, which is not covered by the digital broadcast receiving apparatuses according to the first to third embodiments, it is possible to shorten the image non-displaying period at the channel-selection. Furthermore, if the tuner 401, the demultiplexer 402, the video decoder 403 and the audio decoder 404 are formed so as to cover the digital broadcasting of ATSC-M/H standard, or the digital broadcasting of T-DMB standard, or the digital broadcasting of DVB-H standard, or the digital broadcasting of DVB-T2 standard, or the digital broadcasting of ISDB-T standard, it is also possible to shorten the image non-displaying period at the channel-selection in the digital broadcasting of these standards.

Further, although the present embodiment describes the operation of the digital broadcast receiving apparatus that receives the digital broadcast signal of CMMB standard, the present embodiment can be adapted to other cases where the digital broadcast signal of other standard, such as the digital broadcasting of ATSC-M/H standard, the digital broadcasting of T-DMB standard, the digital broadcasting of DVB-H standard, the digital broadcasting of DVB-T2 standard, or the digital broadcasting of ISDB-T standard, is received. In these cases, the tuner 401 generates a stream that is a stream of each broadcasting standard. Furthermore, the demultiplexer 402 receives a stream of each broadcasting standard and outputs a video picture, an audio frame, and program-specific-information.

Furthermore, in place of the CMCT, the program-specific-information may be the SMT (Service Map Table) in the case of a stream of ATSC-M/H standard; a combination of FIG (Fast Information Group), PAT, PMT and OD (Object Description) Stream in the case of a stream of T-DMB standard; a combination of NIT (Network Information Table), PAT, PMT, INT (IP/MAC Notification Table) and SDP (Section Description Protocol) included in the ESG (Electric Service Guide) data in the case of a stream of DVB-H standard; a combination of L1(Layer 1) Signaling, PAT and PMT in the case of a stream of DVB-T2 standard; or a combination of PAT and PMT in the case of a stream of ISDB-T standard.

Moreover, in place of MF_ID and MSF_ID, the video extraction information may be information of a combination of an IP address and UDP port number of a packet including data of a video picture in the case of a stream of ATSC-M/H standard; information of a combination of a SubChId (Sub Channel Identifier), a video PID and an OD Stream PID of a packet including data of a video picture in the case of a stream of T-DMB standard; information of a combination of an PID, an IP address and UDP port number of a packet including data of a video picture in the case of a stream of DVB-H standard; information of a combination of an PLP_ID (Physical Layer Pipe Identifier) and a video PID of a packet including data of a video picture in the case of a stream of DVB-T2 standard; or a video PID in the case of a stream of ISDB-T standard.

Furthermore, in place of MF_ID and MSF_ID, the audio extraction information may be information of a combination of an IP address and UDP port number of a packet including data of an audio frame in the case of a stream of ATSC-M/H standard; information of a combination of a SubChId, an audio PID and a PID IP of OD Stream address, and UDP port number of a packet including data of an audio frame in the case of a stream of T-DMB standard; information of a combination of a PID, an IP address and UDP port number of a packet including data of an audio frame in the case of a stream of DVB-H standard; information of a combination of a PLP_ID and an audio PID of a packet including data of an audio frame in the case of a stream of DVB-T2 standard; or an audio PID in the case of a stream of ISDB-T standard.

Although the Video decoder 403 is a unit that can decode the video picture of H.264 format, another unit that can decode the video picture of MPEG-2-VIDEO format or the video picture of AVS (Advanced Audio Video Coding Standard in Information Technology) format, may be used.

Furthermore, although the audio decoder 404 is a unit that can decode an audio frame of MPEG4-AAC format, another unit that can decode the audio frame of MPEG-2-AAC format or the audio frame of Dolby AC3 (Audio Code number 3) format, may be used.

In the present embodiment, although a case where the program-specific-information transmission period is a transmission period of CMCT in a stream of CMMB standard has been described, the program-specific-information transmission period can be set according to each standard in the case of the digital broadcast signal of other standard. For example, the program-specific-information transmission period H may be a transmission period of SMT of a stream in the case of ATSC-M/H standard; a transmission period satisfying "type=0 and Eextension=2" of FIG of a stream in the case of T-DMB standard; a transmission period of L1 Signaling NIT of a stream in the case of DVB-H standard; transmission period of NIT of a stream in the case of DVB-H standard; a transmission period of L1 Signaling of a stream in the case of DVB-T2standard; or a transmission period of PAT of a stream in the case of ISDB-T standard.

Furthermore, in the present embodiment, although a case where the program-specific-information analysis period-of-time is a period of time from when the control unit receives CMCT to when the control unit analyzes CMCT and obtains the viewing/listening start information has been described, the program-specific-information analysis period-of-time can be set according to each standard in the case of the digital broadcast signal of other standard. For example, the program-specific-information analysis period-of-time may be a period of time from when SMT of a stream is received to when the viewing/listening start information is obtained in the case of ATSC-M/H standard; a period of time from when a stream satisfying "type=0 and Eextension=2" of FIG to when the viewing/listening start information is obtained in the case of T-DMB standard; a period of time from when L1 Signaling of a stream is received to when the viewing/listening start information is obtained in the case of DVB-T2 format; or a period of time from when PAT of a stream is received to when the viewing/listening start information is obtained in the case of TS format.

Moreover, in the present embodiment, a case where the key-picture is an IDR picture of H.264 has been described, I-picture may be used as a key-picture in the case of MPEG-2-VIDEO stream format.

Fifth Embodiment

Next, a digital broadcast receiving apparatus according to a fifth embodiment of the present invention will be described. In some cases, the stream of the digital broadcasting is scrambled. In order to reproduce a video and an audio from the scrambled stream, it is necessary to execute descramble processing, extract a video picture and an audio frame from the descrambled stream, and execute decoding and outputting. In this descramble processing, in some cases, it takes some time from when descramble processing starts to when the output of the descrambled stream is started. Hereafter, a period of time from when descramble processing starts to when the output of the descrambled stream starts is referred to as a descramble startup period-of-time. In the digital broadcast receiving apparatus according to the first to fourth embodiments, when the delay period-of-time before the channel switchover processing is calculated, the descramble startup period-of-time is not taken into consideration. If the delay period-of-time is calculated without taking the descramble startup period-of-time into consideration, the delay processing is executed, and thereafter the channel-selection is performed, the key-picture is received immediately after the start of receipt of the video picture. However, at this time, in some cases, the descrambling of the video picture is not executed. Since the video picture which is not descrambled cannot be decoded, as a result of this, the decoding of the key-picture is delayed and therefore the image non-displaying period appearing during the channel-selection becomes long in some cases.

Figure 23:
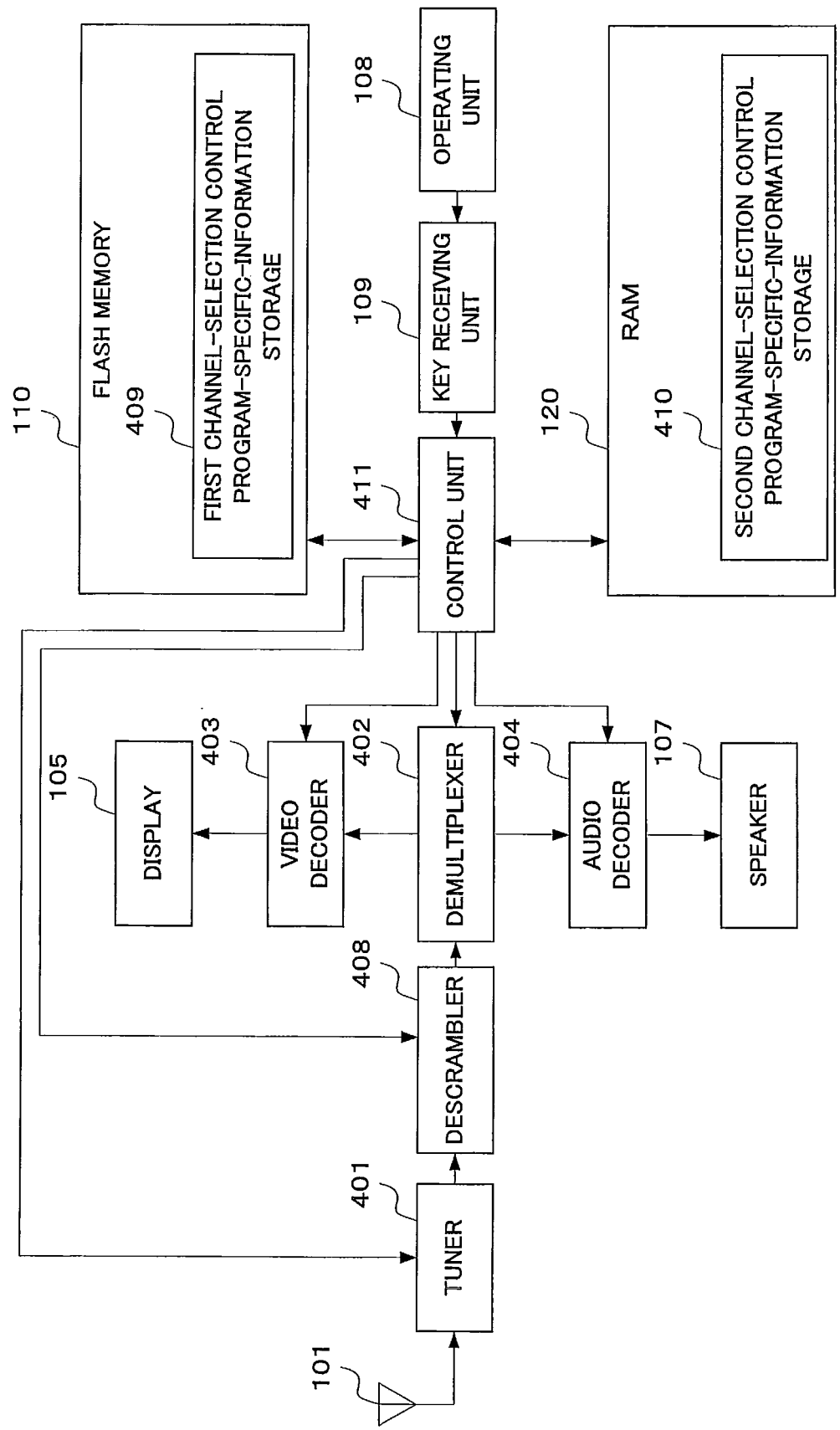
FIG. 23 is a schematic block diagram illustrating a configuration of a digital broadcast receiving apparatus according to a fifth embodiment.

The digital broadcast receiving apparatus according to the present embodiment can prevent the image non-displaying period at the channel-selection from becoming long by calculating the delay period-of-time before the channel switchover processing with consideration given to the descramble startup period-of-time. FIG. 23 is a schematic block diagram illustrating a configuration of the digital broadcast receiving apparatus according to the present embodiment. Although the configuration of the digital broadcast receiving apparatus according to the present embodiment is approximately the same as the digital broadcast receiving apparatus according to the fourth embodiment, there is different points that the descrambler 408 is provided, different data are stored in the first channel-selection control information storage 409 and second channel-selection control information storage 410, and the control unit 411 has a different configuration.

When receiving an instruction for starting the descramble processing from, the descrambler 408 executes the descramble processing of a stream received from the tuner 401 and outputs the descrambled stream to the demultiplexer 402. On the other hand, when the descramble processing is suspended, a stream received from the tuner 401 is not changed and is output to the demultiplexer 402. Further, in this case, in the stream output from the tuner 401, the video stream and the audio stream are scrambled, whereas the program-specific-information is not scrambled. Therefore, even when the descrambler 408 suspends the descramble processing, the analysis of the program-specific-information can be executed.

Figures 24, 25:
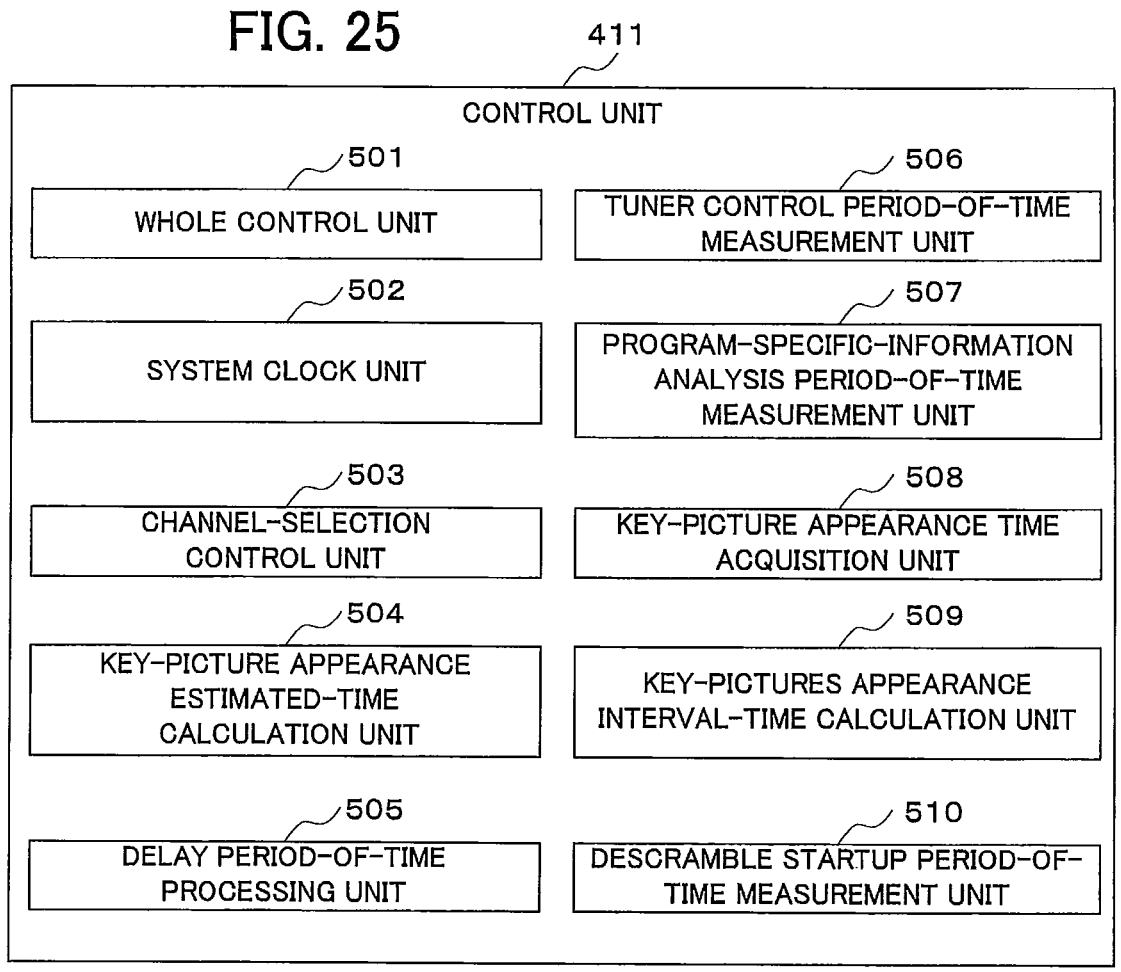
FIG. 24 is a diagram of a data format of channel-selection control information stored in first channel-selection control information storage in the digital broadcast receiving apparatus according to the fifth embodiment.
FIG. 25 is a schematic diagram of a control unit in the digital broadcast receiving apparatus according to the fifth embodiment.

FIG. 24 is a diagram illustrating data format of the channel-selection control information stored in the first channel-selection control information storage 409 and the second channel-selection control information storage 410 in the digital broadcast receiving apparatus according to the present embodiment. The first channel-selection control information storage 409 and the second channel-selection control information storage 410 in the digital broadcast receiving apparatus according to the present embodiment store the descramble startup period-of-time for each channel in addition to the tuner control period-of-time, the program-specific-information analysis period-of-time, the key-picture appearance time and the key-pictures appearance interval-time.

FIG. 25 is a schematic diagram illustrating the control unit 411 in the digital broadcast receiving apparatus according to the present embodiment. Although the configuration of the control unit 411 is approximately the same as the control unit 407 in the digital broadcast receiving apparatus according to the fourth embodiment, there is a difference that the descramble startup period-of-time measurement unit 510 is provided.

Further, in the digital broadcast receiving apparatus according to the present embodiment, although initial values 0are stored as values of the tuner control period-of-time, the program-specific-information analysis period-of-time, the key-picture appearance time, the key-pictures appearance interval-time and the descramble startup period-of-time at factory shipment, values are not limited to such example.

The descramble time measurement unit 510 measures the descramble startup period-of-time which is a period of time from when an instruction for starting descrambling is received to when the descrambled stream begins to be output.

Although processing executed by the digital broadcast receiving apparatus according to the present embodiment is approximately the same as processing executed by the digital broadcast receiving apparatus according to the fourth embodiment, there is a difference in the points of part of the whole processing and part of the channel switchover processing.

The whole processing in the digital broadcast receiving apparatus according to the present embodiment is different from the whole processing in the digital broadcast receiving apparatus according to the fourth embodiment in a point that in the delay period-of-time calculation process in step S108 of FIG. 19, the delay period-of-time is calculated in consideration of the descramble startup period-of-time. A description will be made as to the processing in step S108, which is a difference between the whole processing in the present embodiment and the whole processing in the fourth embodiment.

In the digital broadcast receiving apparatus according to the present embodiment, the delay period-of-time calculation processing of step S108 is executed, for example, as follows: The delay period-of-time L is calculated from the following equation (8) using the key-picture appearance estimated-time R calculated in step S106, the tuner control period-of-time A obtained in step S103, the program-specific-information analysis period-of-time E, the program-specific-information transmission period H, the descramble startup period-of-time I, and the current time T.

$$L = R - A - E - H - I - T \qquad (8)$$

Further, when delay period-of-time L calculated by the delay period-of-time processing unit 505 in the control unit 411 is less than a value of 0, even if the channel selection operation starts, the channel selection operation is not completed until the key-picture appearance estimated-time R. Therefore, the image non-displaying period increases during the appearance waiting time of the next key-picture. For this reason, in the delay period-of-time processing unit 505 in the control unit 411, the delay period-of-time L is a value obtained by adding the I-pictures appearance interval-time D multiplied by a certain value so that the delay period-of-time L calculated by equation (8) becomes the minimum value of positive values.

Figure 26:
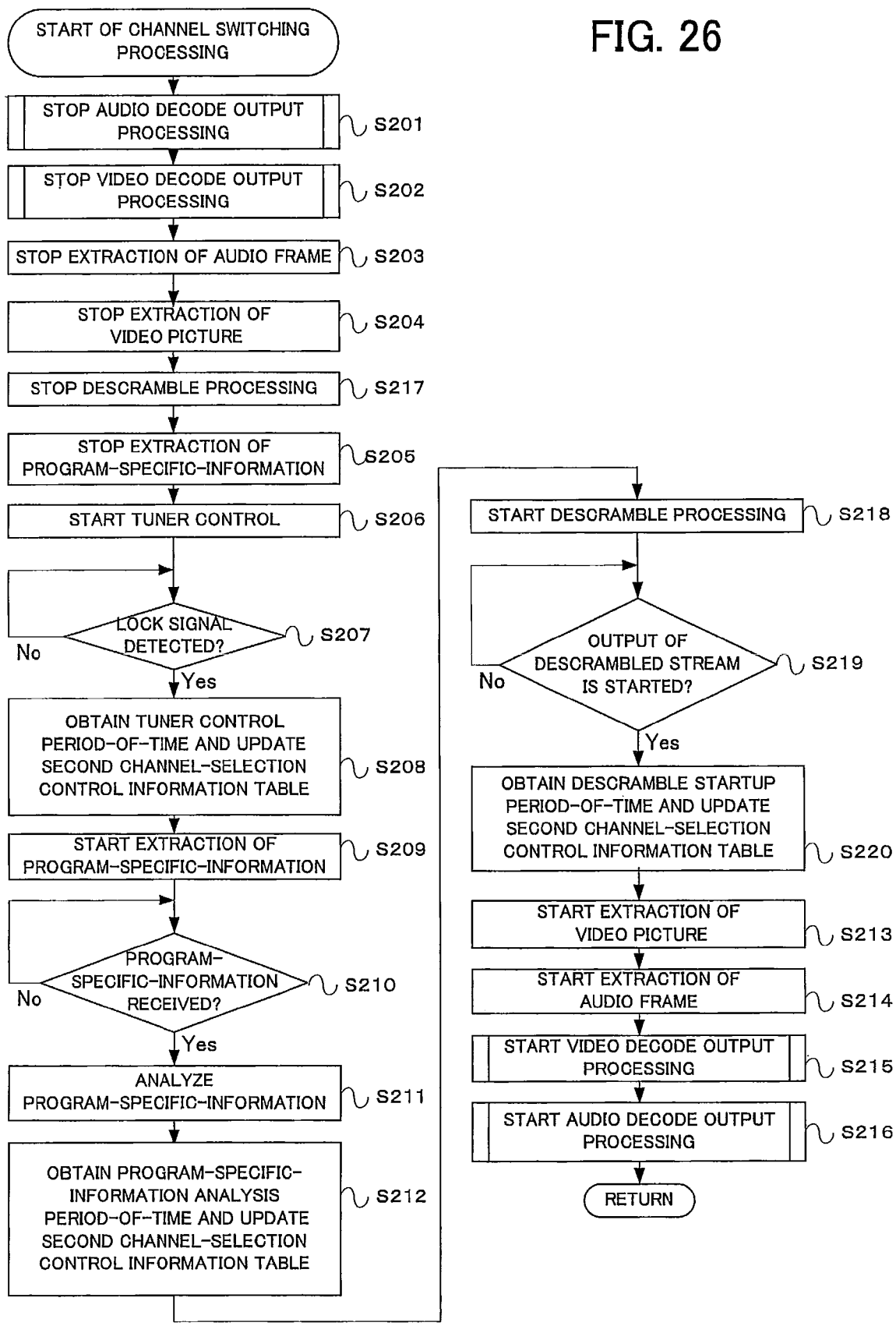
FIG. 26 is a flowchart showing channel switchover processing in the digital broadcast receiving apparatus according to the fifth embodiment.

FIG. 26 is a flowchart showing the channel switchover processing in the digital broadcast receiving apparatus according to the present embodiment. Although the flowchart showing the channel switchover processing in the digital broadcast receiving apparatus according to the present embodiment is approximately the same as the flowchart of FIG. 20 illustrating the channel switchover processing in the digital broadcast receiving apparatus according to the fourth embodiment, there are differences that the descramble stop processing is provided between the processing in step S204 and the processing in step S205, and the descramble start processing and the measuring processing of the descramble startup period-of-time of step S218 to step S220 are provided between the processing in step S212 and the processing in step S213. The following description will be made as to the differences between the channel switchover processing in the present embodiment and the channel switchover processing in the fourth embodiment, which are processing from step S217 to step S220.

In step S217, the channel-selection control unit 503 in the control unit 411 instructs the descrambler 408 to stop the descramble processing, and then processing proceeds to step S205.

In step S218, the channel-selection control unit 503 in the control unit 411 instructs the descrambler 408 to start the descramble processing. Thereafter, the descramble startup period-of-time measurement unit 510 in the control unit 411 reads a time from the system clock unit 502 in the control unit 411, obtains the read time as a descramble startup period-of-time, and processing proceeds to step S219.

In step S219, the channel-selection control unit 503 in the control unit 411 judges whether or not the descrambled stream starts to be output. If the descrambled stream starts to be output, processing proceeds to step S220, whereas if the descrambled stream is not being output, processing proceeds to step S219.

In step S220, the descramble startup period-of-time measurement unit 510 in the control unit 411 reads a time from the system clock unit 502 in the control unit 411 and regards it as a descramble startup completion time, and calculates the descramble startup period-of-time which is a difference value obtained by subtracting the descramble starting time obtained in step S218 from the descramble startup completion time. Thereafter, the descramble startup period-of-time of the selected channel stored in the second channel-selection control information storage 410 in the RAM 120 is updated using the calculated descramble startup period-of-time, and then processing proceeds to step S213. When a value of the calculated descramble startup period-of-time is larger than a value of the descramble startup period-of-time of the selected channel stored in the second channel-selection control information storage 406, the update of the descramble startup period-of-time is performed, for example, by overwriting the calculated descramble startup period-of-time on a section of the descramble startup period-of-time of the selected channel stored in the second channel-selection control information storage 406. Further, after updating the second channel-selection control information storage 410 of the RAM 120, the descramble startup period-of-time measurement unit 510 in the control unit 411 may store a value of the second channel-selection control information storage 410 in the first channel-selection control information storage 409 of the flash memory 110.

As described above, the digital broadcast receiving apparatus according to the present embodiment sets the delay period-of-time before the channel switchover processing to be shorter by the descramble startup period-of-time than that of the digital broadcast receiving apparatus according to the fourth embodiment. For this reason, a time when the video picture begins to be received after tuning is earlier than a time when the key-picture is received by the descramble startup period-of-time. Therefore, at the time when the key-picture is received, the descrambled key-picture can be received. Accordingly, even in the case using scrambling, the digital broadcast receiving apparatus according to the present embodiment can be reduce the picture non-display period at the time of tuning.

Further, as has been described in the fourth embodiment, the present embodiment can be adapted to the case where digital broadcast signal of another standard is received. For example, when the tuner 401, the demultiplexer 402, the video decoder 403, the audio decoder 404 and the descrambler 408 are formed so as to conforming to digital broadcasting of ATSC-M/H standard, digital broadcasting of T-DMB standard, digital broadcasting of DVB-H standard, digital broadcasting of DVB-T2standard, or digital broadcasting of ISDB-T standard, the image non-displaying period can be reduced at the tuning even if the digital broadcast signal is scrambled according to those standards.

Sixth Embodiment

Next, a digital broadcast receiving apparatus according to a sixth embodiment of the present invention will be described. In the digital broadcast receiving apparatus according to the first to fifth embodiments, when a channel-selection key is received from a user, during a delay process being performed before channel switchover processing, a video and an audio before the channel switching are being displayed. Therefore, in spite of the user's pressing of the channel-selection key, in some cases, the user misunderstands that the digital broadcast receiving apparatus does not receive an instruction for channel-selection.

Figure 27:
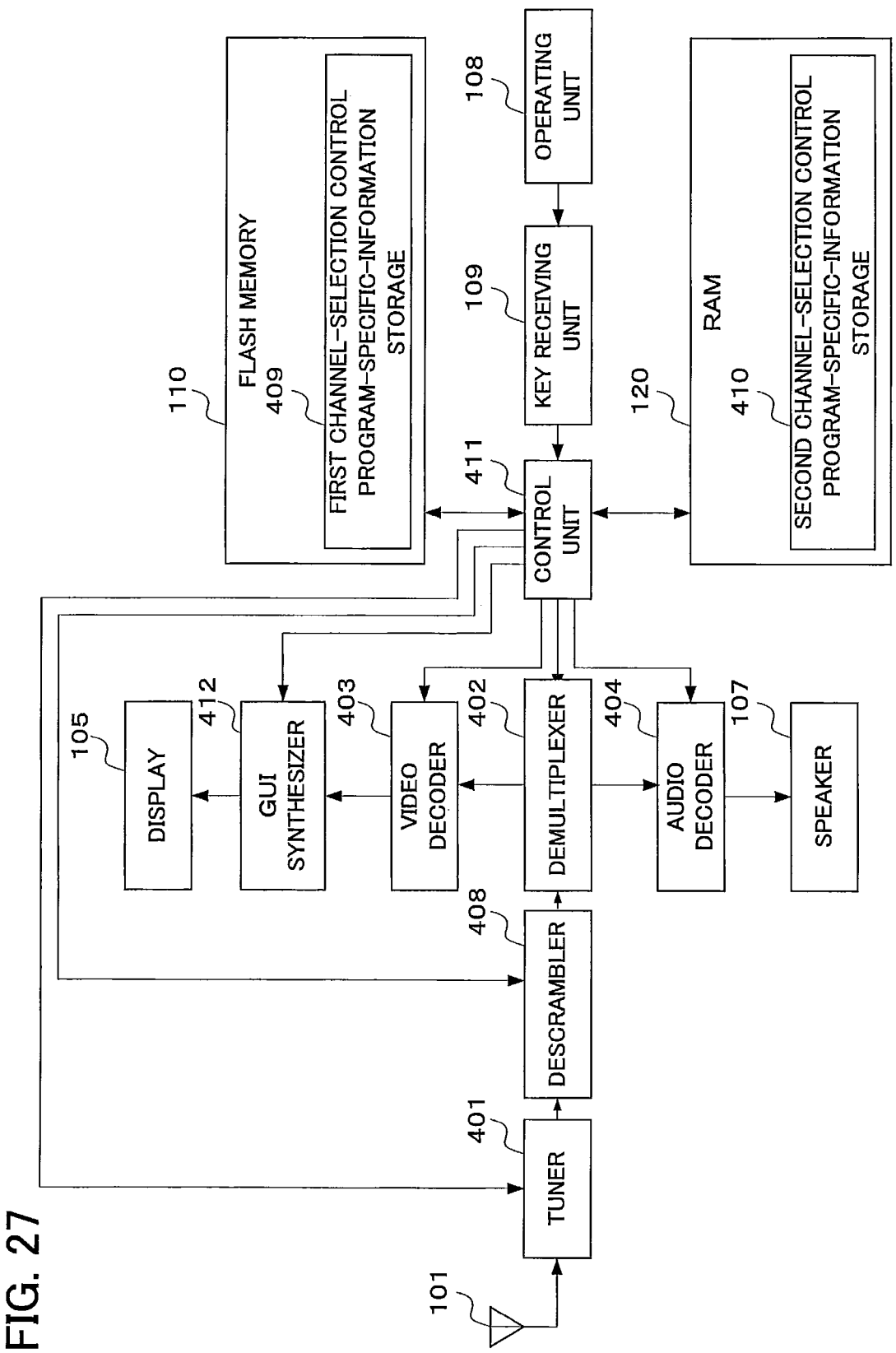
FIG. 27 is a schematic block diagram illustrating a configuration of a digital broadcast receiving apparatus according to a sixth embodiment.

The digital broadcast receiving apparatus according to the present embodiment, during the delay processing being executed before channel switchover processing, adds a GUI (Graphical User Interface) indicating receipt of user's instruction for the channel-selection to an image before channel switchover and displays them, thereby giving notice of receipt of user's instruction for the channel-selection to the user while a video and an audio of the channel before channel switchover is being output. The GUI indicating receipt of user's instruction for the channel-selection is, for example, a rectangle figure data, in which character string of "DURING TUNING" is described. FIG. 27 is a schematic block diagram illustrating a configuration of the digital broadcast receiving apparatus according to the present embodiment. Although the configuration of the digital broadcast receiving apparatus according to the present embodiment is approximately the same as the digital broadcast receiving apparatus according to the fifth embodiment, there is a difference that GUI synthesizer unit 412 is provided.

The GUI synthesizer 412 synthesizes the decoded video picture output from the video decoder 403 with the GUI and output to the display 105.

Processing executed by the digital broadcast receiving apparatus according to the present embodiment is substantially the same as that in the digital broadcast receiving apparatus according to the fifth embodiment, and is different in the points of part of the whole processing and part of the video decode output processing.

Figure 28:
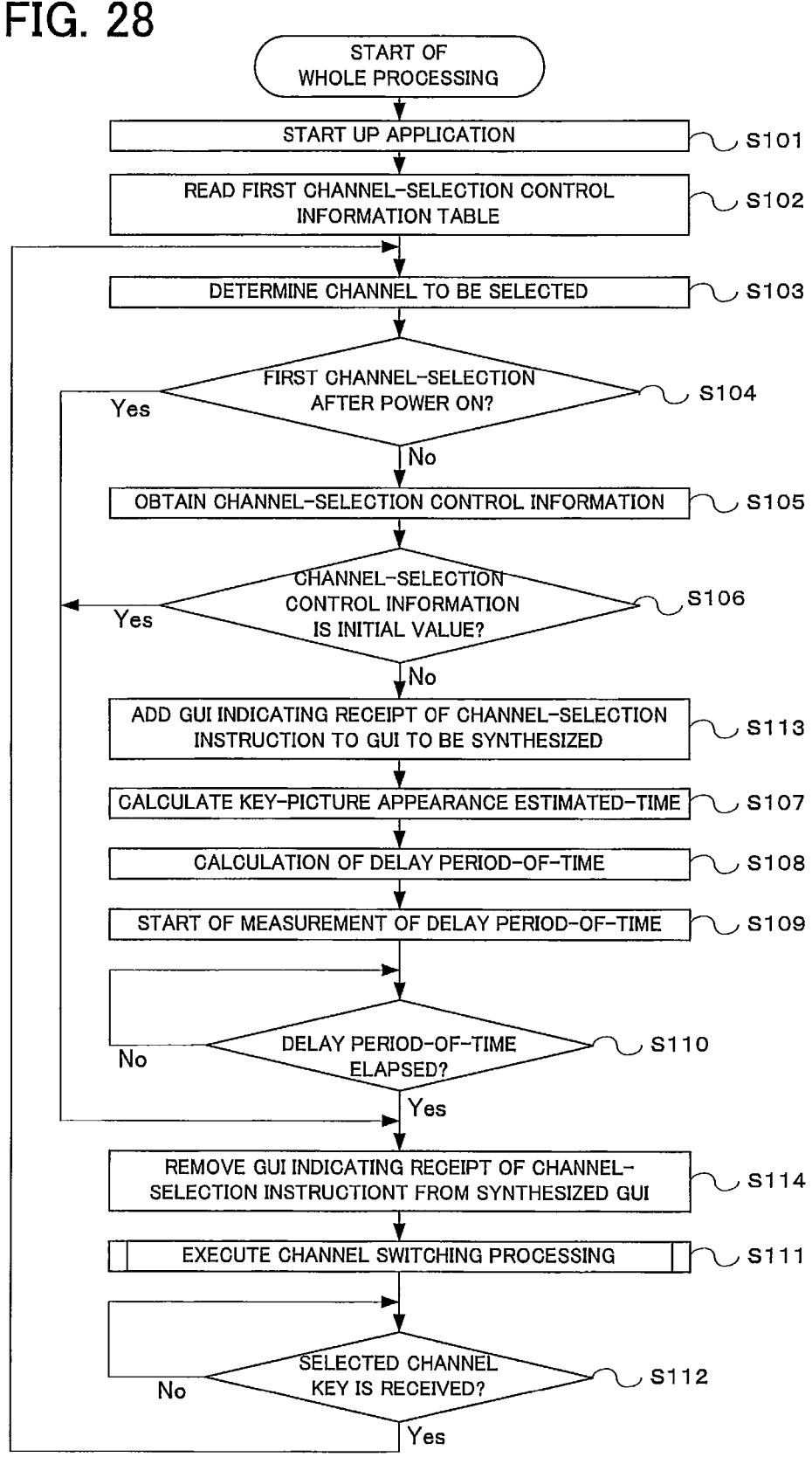
FIG. 28 is a flowchart showing the whole processing in the digital broadcast receiving apparatus according to the sixth embodiment.

FIG. 28 is a flowchart showing the whole processing in the digital broadcast receiving apparatus according to the present embodiment. Although the flowchart showing the whole processing in the digital broadcast receiving apparatus according to the present embodiment is approximately the same as the flowchart of FIG. 19 illustrating the whole processing in the digital broadcast receiving apparatuses according to the fourth and fifth embodiments, there is a difference that synthesizing start processing of a GUI indicating receipt of the instruction for the channel switchover of step S113 is provided between the steps S106 and S107 and synthesizing stop processing of a GUI indicating receipt of the instruction for the channel switchover of step S114 is provided between the steps S110 and S111, in order to display the GUI indicating receipt of user's instruction for the channel-selection during the delay processing being executed before channel switchover processing. Processing in steps S113 and S114 that shows a difference between the whole processing in the present embodiment and the whole processing in the fourth and fifth embodiments will be described below.

In step S113, the channel-selection control unit 503 in the control unit 411 instructs the GUI synthesizer 412 to add a GUI indicating receipt of the channel-selection instruction to a GUI to be synthesized, and then processing proceeds to step S107. Furthermore, it is possible to add not only a GUI indicating receipt of the channel-selection instruction but also a GUI indicating information of the channel to be selected (such as a channel number, a service name, a program name and the like) to a GUI to be synthesized.

In step S114, the channel-selection control unit 503 in the control unit 411 instructs the GUI synthesizer 412 to remove the GUI indicating receipt of the channel-selection instruction from the GUI to be synthesized, and then processing proceeds to step S111.

Figure 29:
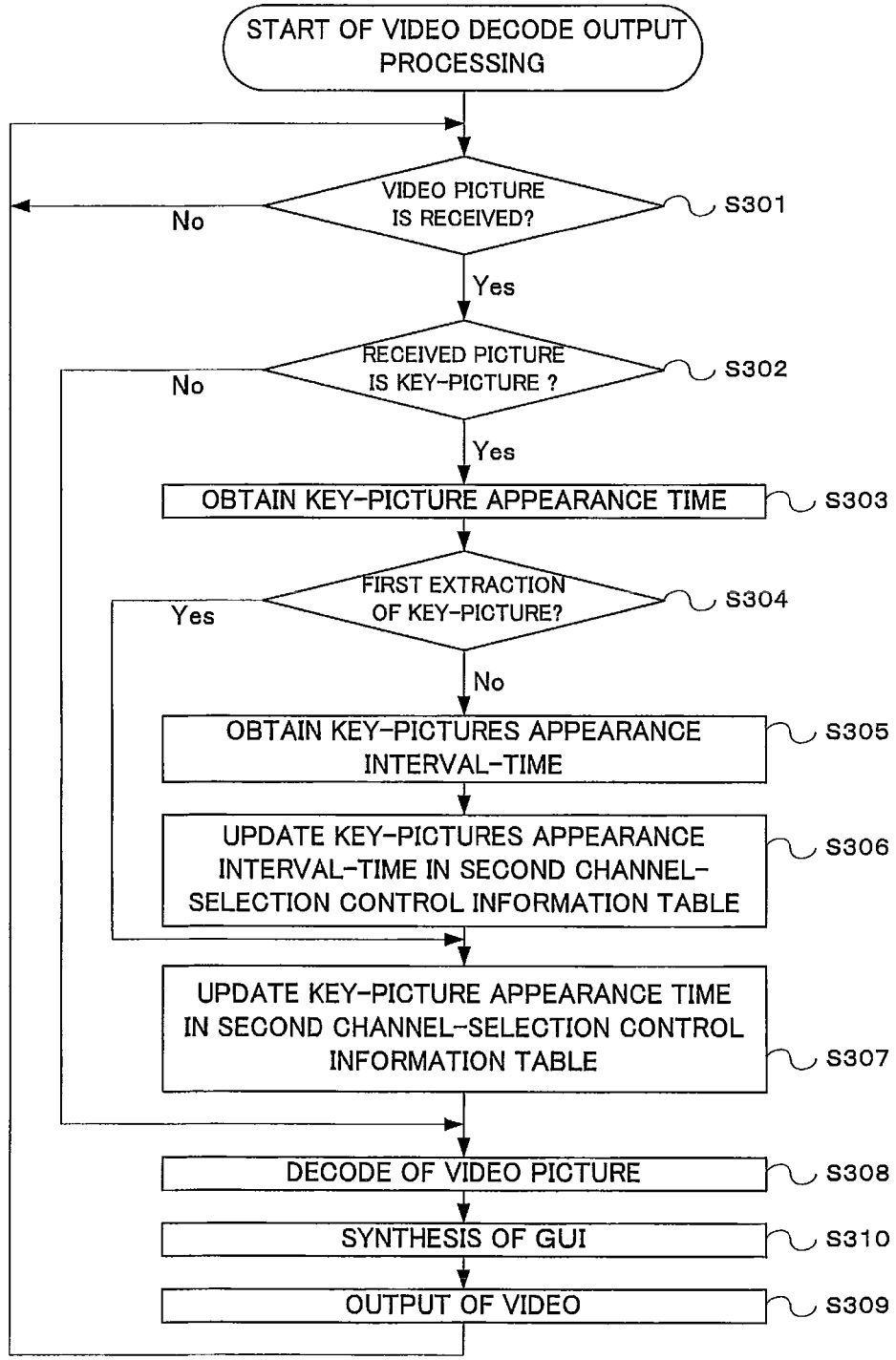
FIG. 29 is a flowchart of video decode output processing in the digital broadcast receiving apparatus according to the sixth embodiment.

FIG. 29 is a flowchart showing video decode output processing in the digital broadcast receiving apparatus according to the present embodiment. Although the flowchart showing the video decode output processing in the digital broadcast receiving apparatus according to the present embodiment is approximately the same as that in the digital broadcast receiving apparatus according to the fourth and fifth embodiments, there is a difference that step S310 as synthesizing processing of a GUI is provided between processing in step S308 and processing in step S309. The following description will be made as to the processing in step S310 which is a difference between the whole processing in the present embodiment and the whole processing in the fourth and fifth embodiments.

In step S310, the channel-selection control unit 503 in the control unit 411 instructs the GUI synthesizer 412 to synthesize a decoded video picture output from the video decoder 403 and a GUI, and then processing proceeds to step S309. The GUI to be synthesized changes based on a result of comparison between a time when processing in step S113 of FIG. 28 was executed lastly and a time when processing in step S114 was executed lastly. For example, if the time when processing in step S113 was executed lastly is nearer to the current time than the time when processing in step S114 was executed lastly, a GUI indicating that an instruction for the channel-selection is received is synthesized. Further, for example, if the time when processing in step S114 was executed lastly is nearer to the current time than the time when processing in step S113 was executed lastly, a GUI indicating that an instruction for the channel-selection is received is not synthesized. Furthermore, for example, if both of processing of step S113 and processing of step S114 has not been executed yet since the digital broadcast receiving apparatus is powered ON, a GUI indicating that an instruction for the channel-selection is received is not synthesized.

As described above, the digital broadcast receiving apparatus according to the present embodiment can display the GUI indicating that a user's instruction for the channel-selection is received while a video and an audio of the channel before channel switching is being output during the delay processing before the channel switchover processing. Therefore, at a period of time from when the user instructs the channel switching to when the channel switchover processing is executed, it can prevent the user from misunderstanding that the digital broadcast receiving apparatus does not receive an instruction for a channel switchover.

Further, as has been described in the fourth embodiment, the present embodiment can adapt to a case where the digital broadcast signal of different standard is received. For example, if the tuner 401, the demultiplexer 402, the video decoder 403, the audio decoder 404 and the descrambler 408 are formed so as to adapt to the digital broadcasting of ATSC-M/H standard, the digital broadcasting of T-DMB standard, the digital broadcasting of DVB-H standard, the digital broadcasting of DVB-T2 standard, or the digital broadcasting of ISDB-T standard, it is possible to prevent user's misunderstanding that the digital broadcast receiving apparatus fails to receive an instruction for the channel switchover during a period of time from when the user instructs channel switchover to when the channel switchover processing is executed.

Seventh Embodiment

Next, a digital broadcast receiving apparatus according to a seventh embodiment of the present invention will be described. The digital broadcast receiving apparatuses according to the first, fourth, fifth and sixth embodiments do not check the update of the channel-selection control information of channels not being viewed/listened to. Therefore, in some cases, if the channel-selection control information of channels not being viewed/listened to is updated, a key-picture appearance time cannot be predicted accurately and as a result of this, receipt of the key-picture is delayed and an image non-display period appearing during the channel selection is elongated. Furthermore, in the digital broadcast receiving apparatus according to the second embodiment, the update of the channel-selection control information of channels not being viewing/listening to is executed only immediately after power ON. For this reason, when the channel-selection control information is updated after the power is turned on and the update processing of the channel-selection control information not being viewed/listened to in FIG. 10 is finished, the key-picture appearance time cannot be predicted accurately in some cases. Furthermore, in the digital broadcast receiving apparatus according to the third embodiment, the update of the channel-selection control information of the channel not being viewed/listened to is executed only on a time band of program change between programs. Therefore, if channel-selection control information is updated at timing other than the time band of program change between programs, the key-picture appearance time cannot be predicted accurately in some cases.

Figure 30:
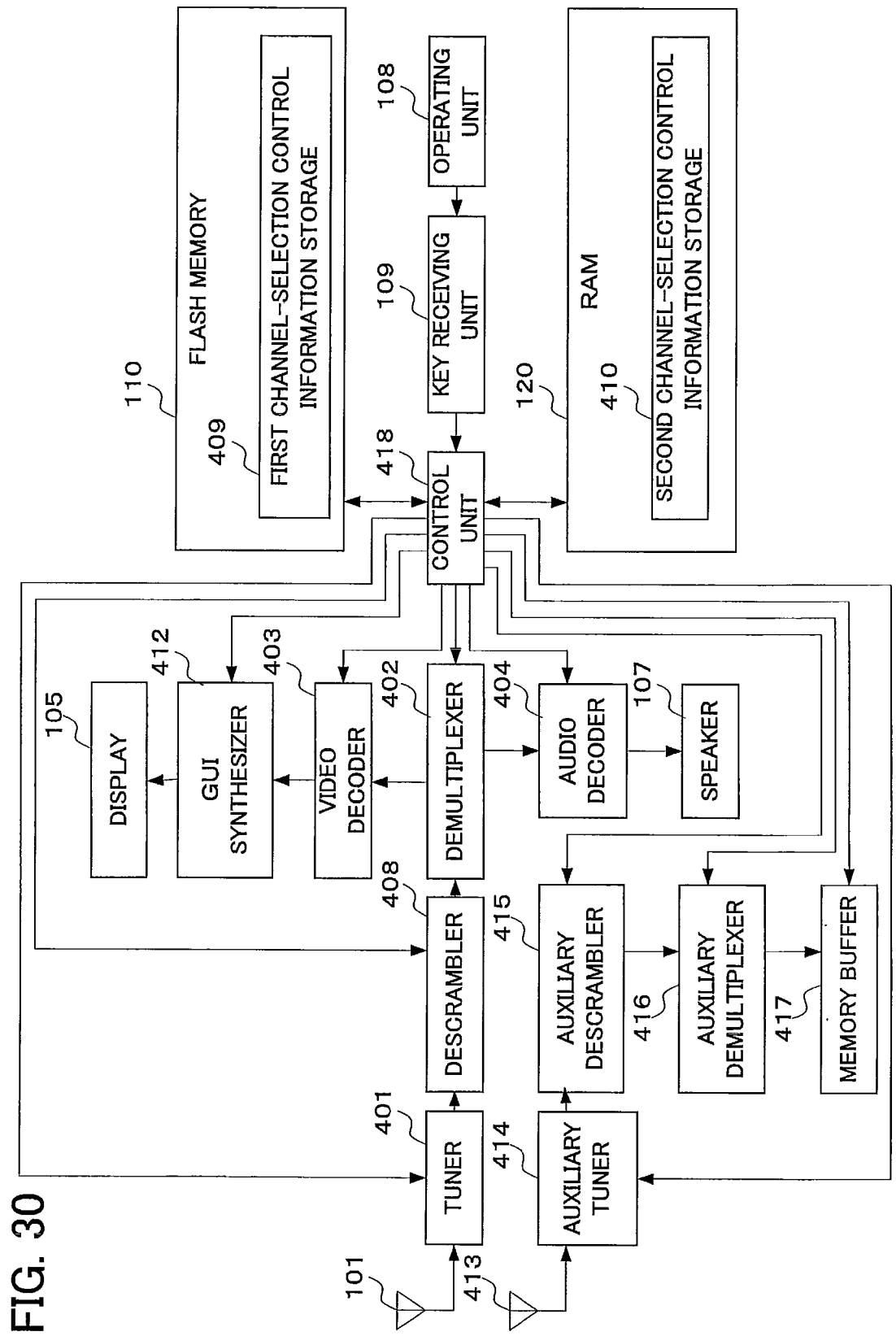
FIG. 30 is a schematic block diagram illustrating a configuration of a digital broadcast receiving apparatus according to a seventh embodiment.

The digital broadcast receiving apparatus according to the present embodiment makes it possible to predict a key-picture appearance time accurately by always updating the channel-selection control information of channels not being viewed/listened to even if the channel-selection control information not viewed/listened to is updated. FIG. 30 is a schematic block diagram illustrating a configuration of the digital broadcast receiving apparatus according to the present embodiment. The configuration of the digital broadcast receiving apparatus according to the present embodiment is approximately the same as the digital broadcast receiving apparatus according to the sixth embodiment, and there is a difference that the auxiliary antenna 413 is provided, the auxiliary tuner 414 is provided, the auxiliary descrambler 415 is provided, the auxiliary demultiplexer 416 is provided, a memory buffer 417 is provided, the control unit 418 has a different configuration.

The auxiliary antenna 413 receives a digital broadcast signal and supplies the received digital broadcast signal to the auxiliary tuner 414. It is preferable to use the auxiliary antenna 413 having performance equivalent to that of the antenna 101.

The auxiliary tuner 414 demodulates the digital broadcast signal received from the auxiliary antenna 413 to generate a stream and supplies the generated stream to the auxiliary descrambler 415. The format of the generated stream format may be TS, and may be other format. It is preferable to use the auxiliary tuner 414 which has performance equivalent to that of the tuner 401.

The auxiliary descrambler 415, after the start of the descramble processing, performs descramble processing of a stream received by the auxiliary tuner 414, and outputs the descrambled stream to the auxiliary demultiplexer 416. On the other hand, if the descramble processing is at a suspend state, a stream received from the auxiliary tuner 414 is output to the auxiliary demultiplexer 416 as it is. Further, a stream output from the auxiliary tuner 414 is partially scrambled at a part of a video and an audio, and the program-specific-information is not scrambled. Therefore, even when the auxiliary descrambler 415 stops the descramble processing, the program-specific-information can be analyzed. Furthermore, it is desirable that the auxiliary descrambler 415 have the same performance as the descrambler 408. Furthermore, a set of the descrambler 408 and auxiliary descrambler 415 may be realized by a single device.

The auxiliary demultiplexer 416 separates video stream and program-specific-information from the stream received from the auxiliary descrambler 415. The separated video stream is assembled into on picture of video picture data and then is output to the memory buffer 417. The program-specific-information is outputted to the control unit 418. Further, a set of the demultiplexer 402 and the auxiliary demultiplexer 416 may be realized by a single device.

The memory buffer 417 stores a video picture output from the auxiliary demultiplexer 416.

Figure 31:
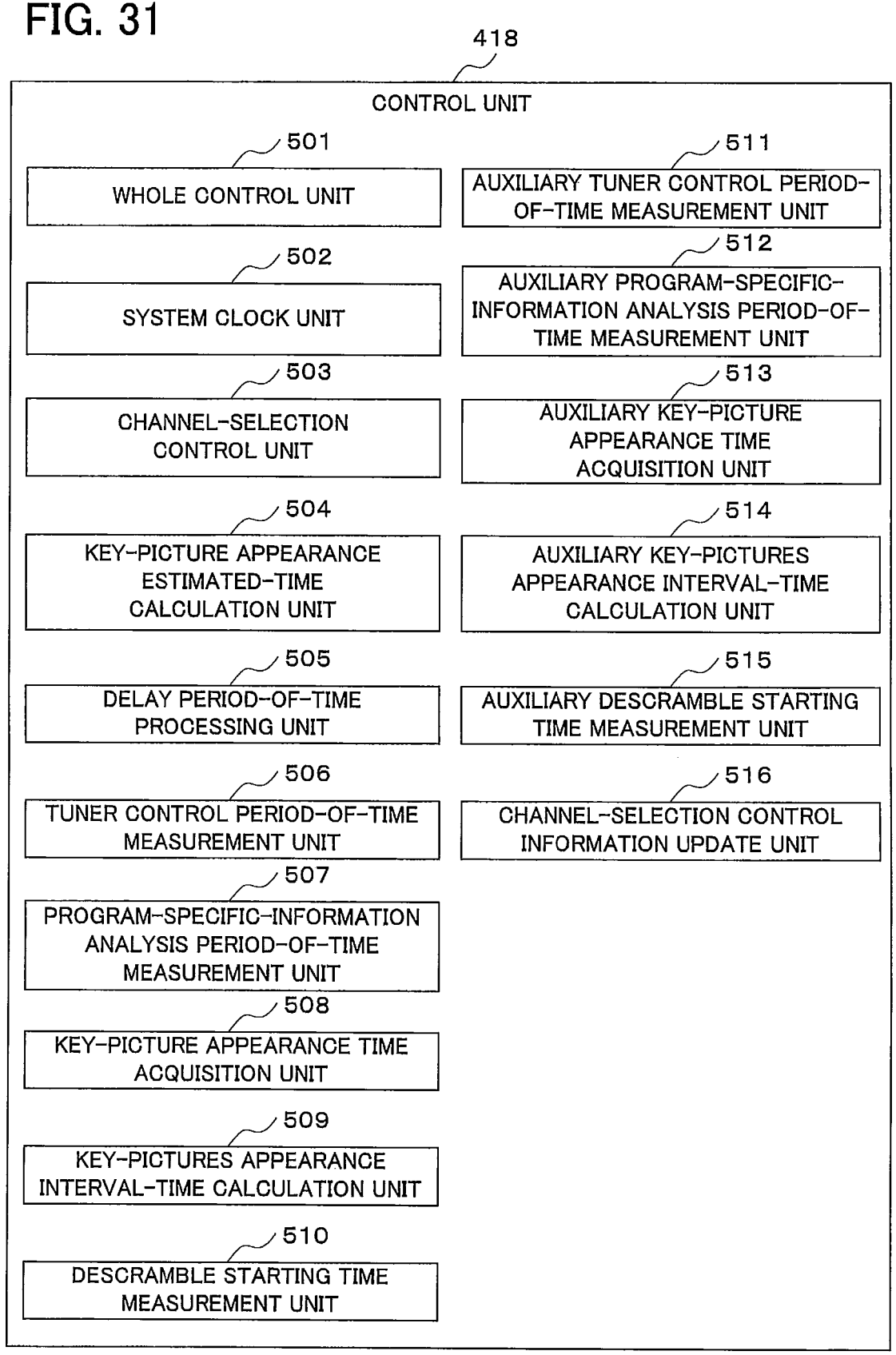
FIG. 31 is a schematic diagram of a control unit in the digital broadcast receiving apparatus according to the seventh embodiment.

FIG. 31 is a schematic diagram illustrating the control unit 418 according to the digital broadcast receiving apparatus according to the present embodiment. As illustrated in the figure, the control unit 418 is different from the control unit 411 in the digital broadcast receiving apparatus according to the fifth embodiment in points that it includes an auxiliary tuner control period-of-time measurement unit 511, an auxiliary program-specific-information analysis period-of-time calculation unit 512, an auxiliary key-picture appearance time acquisition unit 513, an auxiliary key-pictures appearance interval-time calculation unit 514, an auxiliary descramble startup period-of-time measurement unit 515 and a channel-selection control information update unit 516.

The auxiliary tuner control period-of-time measurement unit 511 measures a tuner control period-of-time from when the auxiliary tuner 414 receives an instruction for switching the channel to when the broadcasting signal of the switched channel becomes receivable.

The auxiliary program-specific-information analysis period-of-time calculation unit 512 measures a period of time from when extracting the program-specific-information in the auxiliary demultiplexer 416 starts to when the channel-selection control unit 503 receives the program-specific-information and analyzes the viewing/listening start information from the program-specific-information.

If the video picture output from the auxiliary demultiplexer 416 is a key-picture, the auxiliary key-picture appearance time acquisition unit 513 sets the time read from the system clock unit 502 to be a key-picture appearance time.

The auxiliary key-pictures appearance interval-time calculation unit 514 calculates a key-pictures appearance interval-time based on a difference between a key-picture appearance time obtained by the auxiliary key-picture appearance time acquisition unit 513 and a key-picture appearance time of corresponding channel stored in the second channel-selection control information storage 410.

The auxiliary descramble time measurement unit 515 measures a descramble startup period-of-time from when the auxiliary descrambler 415 receives an instruction for starting descramble processing to when the auxiliary descrambler 415 starts outputting a descrambled stream.

The channel-selection control information update unit 516 controls processing for storing a tuner control period-of-time measured by the auxiliary tuner control period-of-time measurement unit 511, a program-specific-information analysis period-of-time measured by the auxiliary program-specific-information analysis period-of-time calculation unit 512, a key-picture appearance time obtained by the auxiliary key-picture appearance time acquisition unit, a key-pictures appearance interval-time calculated by the auxiliary key-pictures appearance interval-time calculation unit, and a descramble startup period-of-time measured by the auxiliary descramble startup period-of-time measurement unit 515 in the second channel-selection control information storage 410.

Figure 32:
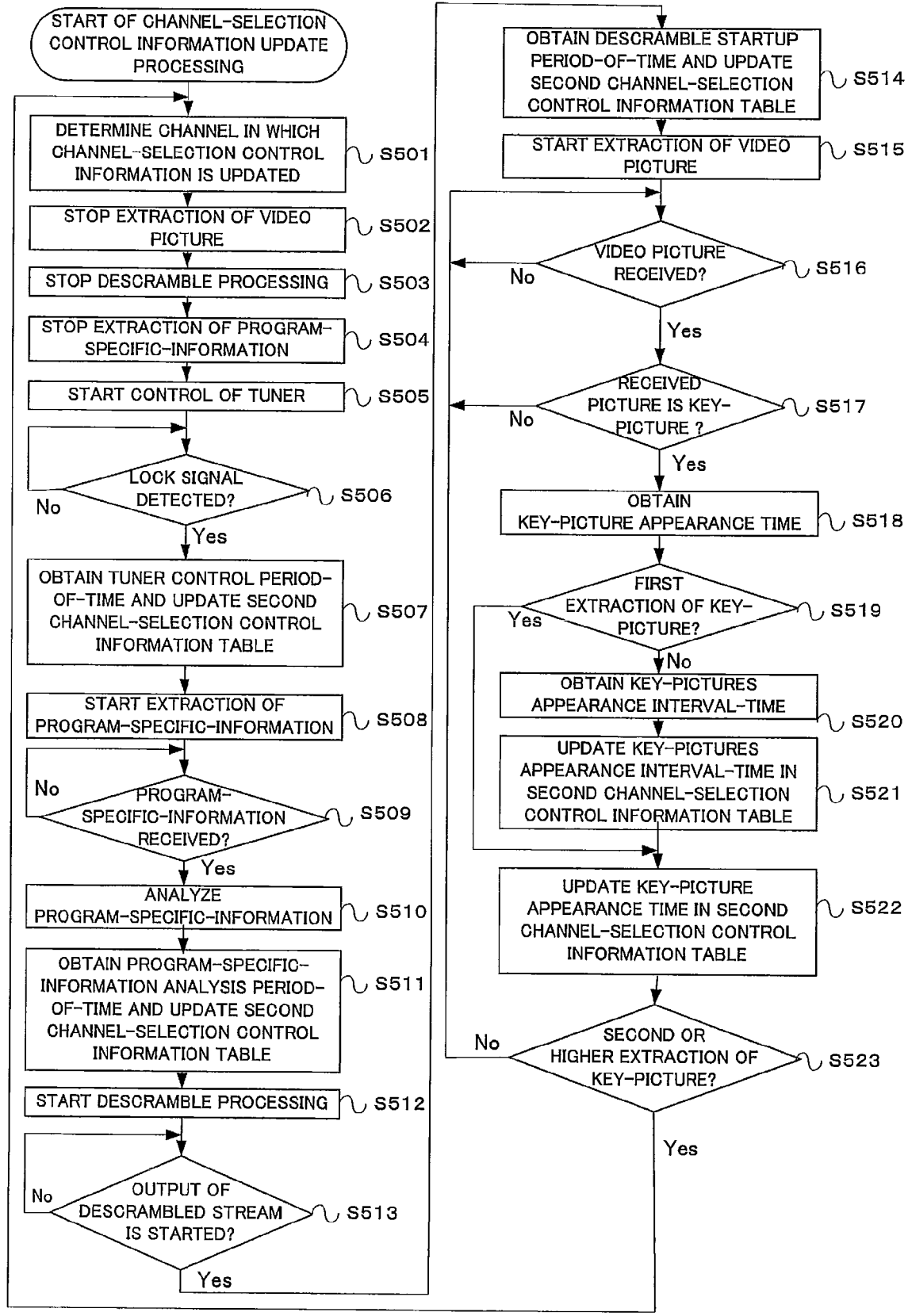
FIG. 32 is a flowchart of processing of updating channel-selection control information in the digital broadcast receiving apparatus according to the seventh embodiment.

The digital broadcast receiving apparatus according to the present embodiment executes the whole processing, channel switchover processing, video decode output processing and audio decode output processing using an antenna 101, a tuner 401, a descrambler 408, a demultiplexer 402, a video decoder 403, a display 105, an audio decoder 404 and a speaker 107, in a similar manner to the digital broadcast receiving apparatus according to the sixth embodiment. On the other hand, the digital broadcast receiving apparatus according to the present embodiment executes the update processing of the channel-selection control information, using an auxiliary antenna 413, an auxiliary tuner 414, an auxiliary descrambler 415, an auxiliary demultiplexer 416 and the memory buffer. FIG. 32 is a flowchart showing channel-selection control information update processing in the digital broadcast receiving apparatus according to the present embodiment. The channel-selection control information update processing illustrated in the flowchart of FIG. 32 starts at a time when startup processing in step S101 of FIG. 28 is completed, and then processing proceeds to step S501.

In step S501, the whole control unit 501 in the control unit 418 determines a channel, the channel-selection control information of which is to be updated, among the channel-selection control information stored in second channel-selection control information storage 410, and then processing proceeds to step S502. The order of channels of the channel-selection control information to be updated is determined, for example, in the order from a small physical channel toward larger one among the channels stored in the channel-selection control information storage 410. The update of the channel-selection control information of all channels stored in the second channel-selection control information storage 410 is finished, and then the update starts again in the order from the small physical channel.

In step S502, the channel-selection control unit 503 in the control unit 418 instructs the auxiliary demultiplexer 416 to stop extracting the video picture, and then processing proceeds to step S503.

In step S503, the channel-selection control unit 503 in the control unit 418 instructs the auxiliary descrambler 415 to stop descramble processing, and then processing proceeds to step S504.

In step S504, the channel-selection control unit 503 in the control unit 418 instructs the auxiliary demultiplexer 416 to stop extracting the program-specific-information, and then processing proceeds to step S505.

In step S505, the channel-selection control unit 503 in the control unit 418 controls the auxiliary tuner 414 so as to select a frequency band of a channel, the channel-selection control information of which is to be updated. The auxiliary tuner control period-of-time measurement unit 511 in the control unit 418 reads a time from the system clock unit 502 in the control unit 418, obtains the read time as a tuner control starting time, and then processing proceeds to step S506.

In step S506, the channel-selection control unit 503 in the control unit 418 judges whether or not the auxiliary tuner 414 detects a lock signal of a digital signal at a frequency band selected in step S505. If the lock signal is detected, processing proceeds to step S507, whereas if the lock signal is not detected, processing proceeds to step S506.

In step S507, the auxiliary tuner control period-of-time measurement unit 511 in the control unit 418 reads a time from the system clock unit 502 in the control unit 418 and regards it as a tuner lock time, and calculates a tuner control period-of-time which is a difference value obtained by subtracting the tuner control starting time obtained in step S506 from the tuner lock time. Thereafter, the channel-selection control information update unit 516 in the control unit 418 updates the tuner control period-of-time stored in the second channel-selection control information storage 410 of the RAM 120, for the channel whose channel-selection control information is to be updated, using the calculated tuner control period-of-time, and then processing proceeds to step S508. When a value of the calculated tuner control period-of-time is larger than a value of the tuner control period-of-time of the selected channel stored in the second channel-selection control information storage 410, the update of the tuner control period-of-time is performed, for example, by overwriting the calculated tuner control period-of-time on a section of the tuner control period-of-time of the selected channel stored in the second channel-selection control information storage 410. Further, after updating the second channel-selection control information storage 410 of the RAM 120, the auxiliary tuner control period-of-time measurement unit 511 in the control unit 418 may store a value of the second channel-selection control information storage 410 in the first channel-selection control information storage 409 of the flash memory 110.

In step S508, the channel-selection control 503 in the control unit 418 instructs the auxiliary demultiplexer 416 to start extracting the program-specific-information of the channel to be selected, and then processing proceeds to step S509.

In step S509, the channel-selection control unit 503 in the control unit 418 judges whether or not the program-specific-information is received from the auxiliary demultiplexer 416. If the program-specific-information is received, processing proceeds to step S510, whereas if the program-specific-information is not received, processing proceeds to step S509.

In step S510, the auxiliary program-specific-information analysis period-of-time calculation unit 512 in the control unit 418 reads a time from the system clock unit 502 in the control unit 418 and obtains the read time as a program-specific-information analysis starting time. Then, the channel-selection control unit 503 in the control unit 418 analyzes the received program information, obtains the viewing/listening start information, and then processing proceeds to step S511.

In step S511, the auxiliary program-specific-information analysis period-of-time calculation unit 512 in the control unit 418 reads a time from the system clock unit 502 in the control unit 418 and regards it as a program-specific-information analysis completion time, and calculates a program-specific-information analysis period-of-time which is a value obtained by subtracting the program-specific-information analysis starting time obtained in step S510 from the program-specific-information analysis completion time. Thereafter, the update of the program-specific-information analysis period-of-time stored in the second channel-selection control information storage 410 of the RAM 120, for the channel whose channel-selection control information is to be updated, using the calculated program-specific-information analysis period-of-time, is performed using the calculated program-specific-information analysis period-of-time, and then processing proceeds to step S512. When a value of the calculated program-specific-information analysis period-of-time is larger than a value of the program-specific-information analysis period-of-time of the selected channel stored in the second channel-selection control information storage 410, for the channel whose channel-selection control information is to be updated, the update of the program-specific-information analysis period-of-time is performed, for example, by overwriting the calculated program-specific-information analysis period-of-time on a section of the program-specific-information analysis period-of-time of the channel to be updated, stored in the second channel-selection control information storage 410. Furthermore, after updating the second channel-selection control information storage 410 of the RAM 120, the auxiliary program-specific-information analysis period-of-time calculation unit 512 in the control unit 418 may store a value of the second channel-selection control information storage 410 in the first channel-selection control information storage 409 in the flash memory 110.

In step S512, the channel-selection control unit 503 in the control unit 418 instructs the auxiliary descrambler 415 to start the descramble processing. Then, the auxiliary descramble startup period-of-time measurement unit 515 in the control unit 418 reads a time from the system clock unit 502 in the control unit 418, obtains the read time as a descramble startup period-of-time, and then processing proceeds to step S513.

In step S513, the channel-selection control unit 503 in the control unit 418 judges whether the descrambled stream starts to be output. If the descrambled stream starts to be output, processing proceeds to step S514, whereas if the descrambled stream does not start to be output, processing proceeds to step S513.

In step S514, the auxiliary descramble startup period-of-time measurement unit 515 in the control unit 418 reads a time from the system clock unit 502 in the control unit 418 and regards it as a descramble startup completion time, and calculates the descramble startup period-of-time which is a difference value obtained by subtracting the descramble startup period-of-time obtained in step S512 from the descramble startup completion time. Thereafter, the update of the descramble startup period-of-time stored in the second channel-selection control information storage 410 of the RAM 120, for the channel whose channel-selection control information is to be updated, using the calculated descramble startup period-of-time, is performed using the calculated descramble startup period-of-time, and then processing proceeds to step S515. When a value of the calculated descramble startup period-of-time is larger than a value of the descramble startup period-of-time of the selected channel stored in the second channel-selection control information storage 406, for the channel whose channel-selection control information is to be updated, the update of the descramble startup period-of-time is performed, for example, by overwriting the calculated descramble startup period-of-time on a section of the descramble startup period-of-time of the channel to be updated, stored in the second channel-selection control information storage 406. Furthermore, after updating the second channel-selection control information storage 410 of the RAM 120, the auxiliary descramble startup period-of-time measurement unit 515 in the control unit 418 may store a value of the second channel-selection control information storage 410 in the first channel-selection control information storage 409 in the flash memory 110.

In step S515, the channel-selection control unit 503 in the control unit 418 instructs the auxiliary demultiplexer 416 to start extracting the video picture, and then processing proceeds to step S516.

In step S516, the channel-selection control unit 503 in the control unit 418 judges whether or not the memory buffer 417 receives a video picture from the auxiliary demultiplexer 416. If the video picture is received, processing proceeds to step S517, whereas if the video picture is not received, processing proceeds to step S516.

In step S517, the channel-selection control unit 503 in the control unit 418 judges whether or not a video picture received by the memory buffer 417 is a key-picture. If it is a key-picture, processing proceeds to step S518, whereas if it is not a key-picture, processing proceeds to step S516.

In step S518, the auxiliary key-picture appearance time acquisition unit 513 in the control unit 418 reads a time from the system clock unit 502 and obtains the read time as a key-picture appearance time, and then processing proceeds to step S519.

In step S519, the auxiliary key-picture appearance time acquisition unit 513 in the control unit 418 judges whether or not the acquisition of the key-picture appearance time executed in step S518 is the first one counted from video picture extraction startup processing in step S515 is performed. If it is the first one, processing proceeds to step S522, whereas if it is not the first one, processing proceeds to step S520.

In step S520, the auxiliary key-pictures appearance interval-time calculation unit 514 in the control unit 418 obtains a key-picture appearance time of the channel whose channel-selection control information is to be updated, from the second channel-selection control information storage 410 and calculates a key-pictures appearance interval-time which is a difference value obtained by subtracting the obtained key-picture appearance time from the key-picture appearance time obtained in step S518, and then processing proceeds to step S521.

In step S521, the auxiliary key-pictures appearance interval-time calculation unit 514 in the control unit 418 updates the key-pictures appearance interval-time stored in the second channel-selection control information storage 410, for the channel whose channel-selection control information is updated, by the key-pictures appearance interval-time calculated in step S520, and then processing proceeds to step S307. Further, after updating the second channel-selection control information storage 410 of the RAM 120, the auxiliary key-pictures appearance interval-time calculation unit 514 in the control unit 418 may store a value of the second channel-selection control information storage 410 in the first channel-selection control information storage 409 in the flash memory 110.

In step S522, the auxiliary key-picture appearance time acquisition unit 513 in the control unit 418 updates the key-picture appearance time stored in the second channel-selection control information storage 410, for the channel whose channel-selection control information is to be updated by the key-picture appearance time obtained in step S518, and then processing proceeds to step S523. After updating the second channel-selection control information storage 410 of the RAM 120, the auxiliary key-picture appearance time acquisition unit 513 in the control unit 418 may store a value of the second channel-selection control information storage 410 in the first channel-selection control information storage 409 of the flash memory 110.

In step S523, the auxiliary key-picture appearance time acquisition unit 513 in the control unit 418 judges whether or not the acquisition of the key-picture appearance time performed in step S518 is the second one or higher since the video picture extraction startup processing is executed. If it is the second one or higher, processing proceeds to step S501, whereas if it is not the second one or higher, processing proceeds to step S516.

As described above, in the digital broadcast receiving apparatus according to the present embodiment, since the channel-selection control information of the channel not being viewed/listened to, is usually updated, even if the channel-selection control information of the channel not being viewed/listened to, is updated, the key-picture appearance time can be predicted exactly. Therefore, even if the channel-selection control information of the channel not being viewed/listened to, is updated, an image non-display period at the channel selection can be shortened.

Furthermore, as has been described in the fourth embodiment, the present embodiment can adapt to a case where the digital broadcast signal of other standard is received. For example, the multiplexer 402, the video decoder 403, the audio decoder 404, the descrambler 408, the auxiliary tuner 414, the auxiliary descrambler 415 and the auxiliary demultiplexer 416 may be formed so as to adapt to the digital broadcasting of ATSC-M/H standard, the digital broadcasting of T-DMB standard, the digital broadcasting of DVB-H standard, the digital broadcasting of DVB-T2 standard, or the digital broadcasting of ISDB-T standard. In this case, in the digital broadcasting of these standards, even if the channel-selection control information of the channel not being viewed/listened to, is updated, an image non-display period can be shortened during the channel-selection.

What is claimed is:

1. A digital broadcast receiving apparatus comprising:
    a tuner for receiving and demodulating a digital broadcast signal;
    a volatile storage for storing channel-selection control information for each channel, the channel-selection control information including information for specifying an I-picture appearance time which is a time when a packet including an I-picture on a channel in question is received and information for specifying an I-pictures appearance interval-time which is an interval between times when a packet including an I-picture on the channel in question is received;
    a control unit comprising:
        an I-picture appearance estimated-time calculation unit for obtaining, after an input of switching of the channel-selection is received, the I-picture appearance time and the I-pictures appearance interval-time corresponding to the switched channel from the channel-selection control information, and for adding the obtained I-pictures appearance interval-time to the obtained I-picture appearance time, thereby calculating an I-picture appearance estimated-time which is a time when a packet including an I-picture is obtained subsequently, and
        a delay period-of-time processing unit for delaying a channel switchover in the tuner until a time earlier than the I-picture appearance estimated-time calculated by the I-picture appearance estimated-time calculation unit by a switchover period-of-time required for the switching of the channel-selection;
    a system clock unit for performing a clocking operation and calculating a time; and
    a non-volatile storage,
    wherein the control unit updates the channel-section control information corresponding to a switched channel in the volatile storage, and causes the updated channel-section control information to be transferred from the volatile storage to the non-volatile storage, the control unit performing the updating based on at least one of:
        a tuner control period of time measured by the control unit as a period of time from when an instruction for switching the channel is supplied to the tuner to when the digital broadcast signal of the channel switched by the tuner becomes receivable;
        a PSI section analysis period-of-time measured by the control unit as a period of time from when the control unit obtains PSI section data extracted by a demultiplexer to when the control unit extracts a PID from the obtained PSI section data;

an I-picture appearance time obtained by the control unit from the system clock unit when a video packet extracted by the demultiplexer is judged by the control unit to include an I-picture; and an I-pictures appearance interval-time calculated by the control unit as a difference between an I-picture appearance time obtained by the control unit from the system clock and an I-picture appearance time of the channel-selection control information, and wherein the delay period-of-time processing unit calculates a delay period-of-time which is a time interval from a time received from the system clock unit to a time earlier than the I-picture appearance estimated-time by the switchover period-of-time and, when the calculated delay period-of-time has elapsed, causes the tuner to start the channel switchover.

2. The digital broadcast receiving apparatus according to claim 1, wherein the switchover period-of-time is obtained by adding a period of time required for a tuning process when the channel-selection is switched and a period of time required for obtaining PSI section data and extracting PID from the PSI section data.

3. The digital broadcast receiving apparatus according to claim 1, wherein:

the channel-selection control information includes information for specifying a tuner control period-of-time which is a period of time required for a tuning process when the channel-selection is switched and information for specifying a PSI section analysis period-of-time which is a period of time required for extracting the PID from the PSI section data; and the delay period-of-time processing unit obtains the tuner control period-of-time corresponding to the switched channel and the PSI section analysis period-of-time from the channel-selection control information, and adds the obtained tuner control period-of-time, the obtained PSI section analysis period-of-time and a predetermined transmission interval-time of the PSI section data, thereby calculating the switchover period-of-time.

4. The digital broadcast receiving apparatus according to claim 1, further comprising:

a tuner control period-of-time measurement unit for measuring a period of time from when an instruction for switching the channel is supplied to the tuner to when the digital broadcast signal of the channel switched by the tuner becomes receivable, thereby measuring the tuner control period-of-time, and updates the tuner control period-of-time of the channel-selection control information corresponding to the switched channel according to the measured tuner control period-of-time.

5. A digital broadcast receiving apparatus comprising:

a tuner for receiving and demodulating a digital broadcast signal;

a storage for storing channel-selection control information for each channel, the channel-selection control information including information for specifying an I-picture appearance time which is a time when a packet including an I-picture on a channel in question is received and information for specifying an I-pictures appearance interval-time which is an interval between times when a packet including an I-picture on the channel in question is received;

an I-picture appearance estimated-time calculation unit for obtaining, after an input of switching of the channel-selection is received, the I-picture appearance time and the I-pictures appearance interval-time corresponding to the switched channel from the channel-selection control information, and for adding the obtained I-pictures appearance interval-time to the obtained I-picture appearance time, thereby calculating an I-picture appearance estimated-time which is a time when a packet including an I-picture is obtained subsequently;

a delay period-of-time processing unit for delaying a channel switchover in the tuner until a time earlier than the I-picture appearance estimated-time calculated by the I-picture appearance estimated-time calculation unit by a switchover period-of-time required for the switching of the channel-selection; and a system clock unit for performing a clocking operation and calculating a time, wherein the delay period-of-time processing unit calculates a delay period-of-time which is a time interval from a time received from the system clock unit to a time earlier than the I-picture appearance estimated-time by the switchover period-of-time and, when the calculated delay period-of-time has elapsed, causes the tuner to start the channel switchover, the channel-selection control information includes information for specifying a tuner control period-of-time which is a period of time required for a tuning process when the channel-selection is switched and information for specifying a PSI section analysis period-of-time which is a period of time required for extracting the PID from the PSI section data, the delay period-of-time processing unit obtains the tuner control period-of-time corresponding to the switched channel and the PSI section analysis period-of-time from the channel-selection control information, and adds the obtained tuner control period-of-time, the obtained PSI section analysis period-of-time and a predetermined transmission interval-time of the PSI section data, thereby calculating the switchover period-of-time, and the digital broadcast receiving apparatus further comprises:

a demultiplexer for extracting the PSI section data from a transport stream demodulated by the tuner;

a control unit for obtaining the PSI section data extracted by the demultiplexer and extracting the PID from the obtained PSI section data; and a PSI section analysis period-of-time measurement unit for measuring a period of time from when the control unit obtains the PSI section data extracted by the demultiplexer to when the control unit extracts the PID from the obtained PSI section data, thereby measuring the PSI section analysis period-of-time, and for updating the PSI section analysis period-of-time of the channel-selection control information corresponding to a channel to be received by the tuner according to the measured PSI section analysis period-of-time.

6. The digital broadcast receiving apparatus according to claim 1, comprising:

a demultiplexer for extracting a video packet from the transport stream demodulated by the tuner; and an I-picture appearance time acquisition unit for judging whether or not a video packet extracted by the demultiplexer includes an I-picture, for obtaining, if the video packet includes the I-picture, an I-picture appearance time which is the time obtained from the system clock unit, and for updating the I-picture appearance time of the channel-selection control information corresponding to the channel to be received by the tuner according to the obtained I-picture appearance time.

7. The digital broadcast receiving apparatus according to claim 6, further comprising:
an I-pictures appearance interval-time calculation unit for calculating an I-pictures appearance interval-time from a difference between the I-picture appearance times obtained by the I-picture appearance time acquisition unit and an I-picture appearance time of the channel-selection control information corresponding to the channel received by the tuner, and for updating the I-pictures appearance interval-time of the channel-selection control information corresponding to the channel to be received by the tuner according to the calculated I-pictures appearance interval-time.

8. The digital broadcast receiving apparatus according to claim 3, comprising:
an auxiliary tuner for receiving and demodulating the digital broadcast signal; and
an auxiliary tuner control period-of-time measurement unit for measuring a period of time from when an instruction for a channel switchover is supplied to the auxiliary tuner to when the digital broadcast signal from the switched channel becomes is receivable by the auxiliary tuner, thereby measuring a tuner control period-of-time, and for replacing the tuner control period-of-time of the channel-selection control information corresponding to the switched channel by the measured tuner control period-of-time.

9. The digital broadcast receiving apparatus according to claim 8, further comprising:
a packet extraction unit for extracting PSI section data from a transport stream demodulated by the auxiliary tuner;
a control unit for obtaining the PSI section data extracted by the packet extraction unit and extracting PID from the obtained PSI section data; and
an auxiliary PSI-section analysis period-of-time measurement unit for measuring a period of time from when the control unit obtains the PSI section data extracted by the packet extraction unit to when the control unit extracts the PID from the obtained PSI section data, thereby measuring a PSI section analysis period-of-time, and for replacing the PSI section analysis period-of-time of the channel-selection control information corresponding to the channel to be received by the auxiliary tuner, by the measured PSI section analysis period-of-time.

10. A digital broadcast receiving apparatus comprising:
a tuner for receiving and demodulating a digital broadcast signal;
a storage for storing channel-selection control information for each channel, the channel-selection control information including information for specifying an I-picture appearance time which is a time when a packet including an I-picture on a channel in question is received and information for specifying an I-pictures appearance interval-time which is an interval between times when a packet including an I-picture on the channel in question is received;
an I-picture appearance estimated-time calculation unit for obtaining, after an input of switching of the channel-selection is received, the I-picture appearance time and the I-pictures appearance interval-time corresponding to the switched channel from the channel-selection control information, and for adding the obtained I-pictures appearance interval-time to the obtained I-picture appearance time, thereby calculating an I-picture appearance estimated-time which is a time when a packet including an I-picture is obtained subsequently;
a delay period-of-time processing unit for delaying a channel switchover in the tuner until a time earlier than the I-picture appearance estimated-time calculated by the I-picture appearance estimated-time calculation unit by a switchover period-of-time required for the switching of the channel-selection; and
a system clock unit for performing a clocking operation and calculating a time,
wherein the delay period-of-time processing unit calculates a delay period-of-time which is a time interval from a time received from the system clock unit to a time earlier than the I-picture appearance estimated-time by the switchover period-of-time and, when the calculated delay period-of-time has elapsed, causes the tuner to start the channel switchover, and
wherein the digital broadcast receiving apparatus further comprises:
an auxiliary tuner for receiving and demodulating the digital broadcast signal:,
an auxiliary tuner control period-of-time measurement unit for measuring a period of time from when an instruction for a channel switchover is supplied to the auxiliary tuner to when the digital broadcast signal from the switched channel becomes is receivable by the auxiliary tuner, thereby measuring a tuner control period-of-time, and for replacing the tuner control period-of-time of the channel-selection control information corresponding to the switched channel by the measured tuner control period-of-time;
a packet extraction unit for extracting a video packet from a transport stream demodulated by the auxiliary tuner; and
an auxiliary I-picture appearance time acquisition unit for judging whether or not the video packet extracted by the packet extraction unit includes an I-picture, for obtaining, if the video packet includes the I-picture, a time obtained from the system clock unit as an I-picture appearance time, and for replacing an I-picture appearance time of the channel-selection control information corresponding to the channel to be received by the auxiliary tuner, by the obtained I-picture appearance time.

11. The digital broadcast receiving apparatus according to claim 10, further comprising:
an auxiliary I-pictures appearance interval-time calculation unit for calculating an I-pictures appearance interval-time from a difference between the I-picture appearance times obtained by the auxiliary I-picture appearance time acquisition unit and the I-picture appearance time corresponding to the channel to be received by the auxiliary tuner, and for replacing the I-pictures appearance interval-time of the channel-selection control information corresponding to the channel to be received by the auxiliary tuner, by the calculated I-pictures appearance interval-time.

12. The digital broadcast receiving apparatus according to claim 11, wherein the storage for each channel stores program time information including information specifying a starting time of a program to be broadcast on the channel in question;
the apparatus further comprising:
a channel-selection control information update unit for causing the auxiliary tuner control period-of-time measurement unit, the auxiliary PSI-section analysis period-of-time measurement unit, the auxiliary I-picture appearance time acquisition unit or the auxiliary I-pictures appearance interval-time calculation unit to update the channel-selection control information corresponding to the channel, on which the program that reaches a starting time is to be broadcast.

* * * * *